US011860786B2

(12) United States Patent
Wallach

(10) Patent No.: US 11,860,786 B2
(45) Date of Patent: *Jan. 2, 2024

(54) DATA DEFINED CACHES FOR SPECULATIVE AND NORMAL EXECUTIONS

(71) Applicant: Micron Technology, Inc., Boise, ID (US)

(72) Inventor: Steven Jeffrey Wallach, Dallas, TX (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/549,397

(22) Filed: Dec. 13, 2021

(65) Prior Publication Data

US 2022/0100657 A1 Mar. 31, 2022

Related U.S. Application Data

(63) Continuation of application No. 16/528,471, filed on Jul. 31, 2019, now Pat. No. 11,200,166.

(51) Int. Cl.
*G06F 12/0806* (2016.01)
*G06F 9/38* (2018.01)
*G06F 13/36* (2006.01)

(52) U.S. Cl.
CPC ........ *G06F 12/0806* (2013.01); *G06F 9/3842* (2013.01); *G06F 13/36* (2013.01); *G06F 2212/60* (2013.01); *G06F 2213/40* (2013.01)

(58) Field of Classification Search
CPC .... G06F 12/0806; G06F 9/3842; G06F 13/36; G06F 2212/60; G06F 2213/40
See application file for complete search history.

(56) References Cited

U.S. PATENT DOCUMENTS

| 4,646,233 A | 2/1987 | Weatherford et al. |
| 5,671,444 A | 9/1997 | Akkary et al. |
| 5,822,755 A | 10/1998 | Shippy |

(Continued)

FOREIGN PATENT DOCUMENTS

WO 2019138206 7/2019

OTHER PUBLICATIONS

CPU cache, Wikipedia, printed on Oct. 22, 2018.
(Continued)

*Primary Examiner* — Nanci N Wong
(74) *Attorney, Agent, or Firm* — Greenberg Traurig

(57) ABSTRACT

A cache system, having: a first cache; a second cache; a configurable data bit; and a logic circuit coupled to a processor to control the caches based on the configurable bit. When the configurable bit is in a first state, the logic circuit is configured to: implement commands for accessing a memory system via the first cache, when an execution type is a first type; and implement commands for accessing the memory system via the second cache, when the execution type is a second type. When the configurable data bit is in a second state, the logic circuit is configured to: implement commands for accessing the memory system via the second cache, when the execution type is the first type; and implement commands for accessing the memory system via the first cache, when the execution type is the second type.

20 Claims, 26 Drawing Sheets

(56) References Cited

U.S. PATENT DOCUMENTS

| | | |
|---|---|---|
| 6,490,658 B1 | 12/2002 | Ahmed et al. |
| 6,542,965 B2 | 4/2003 | Lesartre |
| 6,604,171 B1 | 8/2003 | Sade |
| 7,216,202 B1 | 5/2007 | Chaudhry et al. |
| 7,287,123 B2 | 10/2007 | Yoshioka |
| 7,315,921 B2 | 1/2008 | Henry et al. |
| 7,600,078 B1 | 10/2009 | Cen et al. |
| 7,966,457 B2 | 6/2011 | Pesavento et al. |
| 8,024,522 B1 | 9/2011 | Favor et al. |
| 8,370,609 B1 | 2/2013 | Favor et al. |
| 9,507,647 B2 | 11/2016 | Blumrich et al. |
| 10,067,713 B2 | 9/2018 | Frey et al. |
| 10,162,758 B2 | 12/2018 | Sasanka |
| 10,324,726 B1 | 6/2019 | Geary et al. |
| 10,394,716 B1 | 8/2019 | Piry et al. |
| 10,642,744 B2 | 5/2020 | Boggs et al. |
| 10,908,915 B1 | 2/2021 | Wallach |
| 10,915,326 B1 | 2/2021 | Wallach |
| 10,949,210 B2 | 3/2021 | Wallach |
| 11,010,288 B2 | 5/2021 | Wallach |
| 11,048,636 B2 | 6/2021 | Wallach |
| 11,200,166 B2 | 12/2021 | Wallach |
| 2002/0174301 A1 | 11/2002 | Conway et al. |
| 2003/0037201 A1 | 2/2003 | Henry et al. |
| 2004/0088491 A1 | 5/2004 | Jouppi et al. |
| 2005/0086464 A1 | 4/2005 | Lee |
| 2005/0251629 A1 | 11/2005 | Fahs et al. |
| 2006/0020757 A1 | 1/2006 | Chaudhry et al. |
| 2007/0083783 A1 | 4/2007 | Ishihara et al. |
| 2007/0094664 A1 | 4/2007 | So et al. |
| 2007/0113050 A1 | 5/2007 | Knoth |
| 2007/0192540 A1* | 8/2007 | Gara .................. G06F 9/528 711/E12.043 |
| 2009/0019231 A1 | 1/2009 | Cypher et al. |
| 2010/0017580 A1 | 1/2010 | Greenhalgh et al. |
| 2010/0169532 A1* | 7/2010 | Sutou .................. G06F 13/28 710/308 |
| 2011/0047334 A1 | 2/2011 | Eichenberger et al. |
| 2011/0055489 A1 | 3/2011 | Reddy et al. |
| 2013/0346696 A1 | 12/2013 | Park et al. |
| 2014/0075166 A1 | 3/2014 | Haskins, Jr. |
| 2014/0082284 A1 | 3/2014 | Abella Ferrer et al. |
| 2014/0344522 A1 | 11/2014 | Fan et al. |
| 2015/0242307 A1 | 8/2015 | Busaba et al. |
| 2016/0019157 A1 | 1/2016 | Palacharla et al. |
| 2016/0019158 A1 | 1/2016 | Palacharla et al. |
| 2016/0055004 A1 | 2/2016 | Grochowski et al. |
| 2016/0179679 A1* | 6/2016 | Morris ............... G06F 12/0884 711/137 |
| 2016/0313994 A1* | 10/2016 | Scott .................. G06F 12/0862 |
| 2017/0083315 A1 | 3/2017 | Burger et al. |
| 2017/0091096 A1 | 3/2017 | Mccarthy |
| 2017/0091111 A1 | 3/2017 | Emma |
| 2018/0052605 A1 | 2/2018 | Williams et al. |
| 2018/0052609 A1 | 2/2018 | Guthrie et al. |
| 2018/0052687 A1 | 2/2018 | Frey et al. |
| 2018/0267801 A1 | 9/2018 | Avudaiyappan et al. |
| 2018/0357180 A1 | 12/2018 | Grant |
| 2019/0018780 A1 | 1/2019 | Jacobi et al. |
| 2019/0044828 A1 | 2/2019 | Gasparakis et al. |
| 2019/0138720 A1 | 5/2019 | Grewal et al. |
| 2019/0332384 A1 | 10/2019 | Calhoun et al. |
| 2019/0339975 A1 | 11/2019 | Wallach |
| 2019/0339978 A1 | 11/2019 | Wallach |
| 2020/0219430 A1* | 7/2020 | Malnar .................. G09G 5/393 |
| 2021/0034366 A1 | 2/2021 | Wallach |
| 2021/0034367 A1 | 2/2021 | Wallach |
| 2021/0034368 A1 | 2/2021 | Wallach |
| 2021/0034369 A1 | 2/2021 | Wallach |
| 2021/0034521 A1 | 2/2021 | Wallach |
| 2021/0034531 A1 | 2/2021 | Wallach |
| 2021/0149675 A1 | 5/2021 | Wallach |
| 2021/0157599 A1 | 5/2021 | Wallach |
| 2021/0208892 A1 | 7/2021 | Wallach |
| 2021/0263843 A1 | 8/2021 | Wallach |
| 2021/0326264 A1 | 10/2021 | Wallach |

OTHER PUBLICATIONS

Cache (computing), Wikipedia, printed on Oct. 19, 2018.
Howard Huang, "Cache Introduction", https://courses.cs.washington.edu/courses/cse378/09wi/lectures/lec15.pdf, Feb. 9, 2009.
International Search Report and Written Opinion, PCT/US2020/042167, dated Oct. 15, 2020.
International Search Report and Written Opinion, PCT/US2020/042164, dated Oct. 20, 2020.
International Search Report and Written Opinion, PCT/US2020/042168, dated Oct. 26, 2020.
International Search Report and Written Opinion, PCT/US2020/042852, dated Oct. 30, 2020.
International Search Report and Written Opinion, PCT/US2020/042853, dated Oct. 30, 2020.
International Search Report and Written Opinion, PCT/US2020/042855, dated Oct. 30, 2020.
Page cache, Wikipedia, printed on Apr. 18, 2018.

* cited by examiner

DATA DEFINED CACHES FOR SPECULATIVE AND NORMAL EXECUTIONS

RELATED APPLICATIONS

The present application is a continuation application of U.S. patent application Ser. No. 16/528,471 filed Jul. 31, 2019 and entitled "DATA DEFINED CACHES FOR SPECULATIVE AND NORMAL EXECUTIONS", issued as U.S. Pat. No. 11,200,166 on Dec. 14, 2021, the entire disclosures of which applications are hereby incorporated herein by reference.

FIELD OF THE TECHNOLOGY

At least some embodiments disclosed herein relate generally to cache architecture and more specifically, but not limited to, cache architecture for main and speculative executions by computer processors.

BACKGROUND

A cache is a memory component that stores data closer to a processor than the main memory so that data stored in the cache can be accessed by the processor. Data can be stored in the cache as the result of an earlier computation or an earlier access to the data in the main memory. A cache hit occurs when the data requested by the processor using a memory address can be found in the cache, while a cache miss occurs when it cannot.

In general, a cache is memory which holds data recently used by a processor. A block of memory placed in a cache is restricted to a cache line accordingly to a placement policy. There are three generally known placement policies: direct mapped, fully associative, and set associative. In a direct mapped cache structure, the cache is organized into multiple sets with a single cache line per set. Based on the address of a memory block, a block of memory can only occupy a single cache line. With direct mapped caches, a cache can be designed as a (n*1) column matrix. In a fully associative cache structure, the cache is organized into a single cache set with multiple cache lines. A block of memory can occupy any of the cache lines in the single cache set. The cache with fully associative structure can be designed as a (1*m) row matrix.

A set associative cache is an intermediately designed cache with a structure that is a middle ground between a direct mapped cache and a fully associative cache. A set associative cache can be designed as a (n*m) matrix, where neither the n nor the m is 1. The cache is divided into n cache sets and each set contains m cache lines. A memory block can be mapped to a cache set and then placed into any cache line of the set. Set associative caches can include the range of caches from direct mapped to fully associative when considering a continuum of levels of set associativity. For example, a direct mapped cache can also be described as a one-way set associative cache and a fully associative cache with m blocks can be described as a m-way set associative cache. Directed mapped caches, two-way set associative caches, and four-way set associative caches are commonplace in cache systems.

Speculative execution is a computing technique where a processor executes one or more instructions based on the speculation that such instructions need to be executed under some conditions, before the determination result is available as to whether such instructions should be executed or not.

A memory address in a computing system identifies a memory location in the computing system. Memory addresses are fixed-length sequences of digits conventionally displayed and manipulated as unsigned integers. The length of the sequences of digits or bits can be considered the width of the memory addresses. Memory addresses can be used in certain structures of central processing units (CPUs), such as instruction pointers (or program counters) and memory address registers. The size or width of such structures of a CPU typically determines the length of memory addresses used in such a CPU.

BRIEF DESCRIPTION OF THE DRAWINGS

The embodiments are illustrated by way of example and not limitation in the figures of the accompanying drawings in which like references indicate similar elements.

DETAILED DESCRIPTION

Figure 1A:
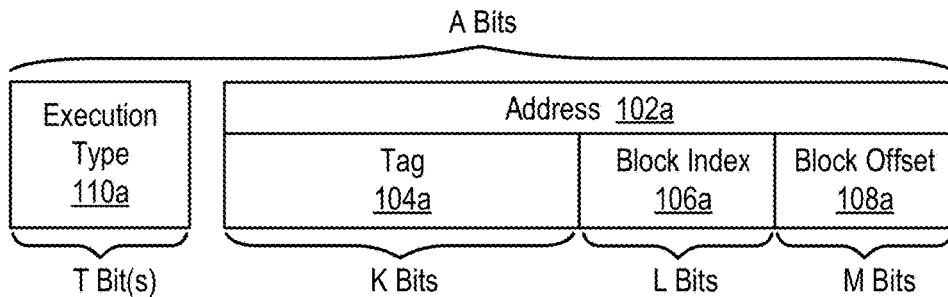
FIGS. 1A to 1E shows various ways to partition a memory address into multiple parts that can be used with an execution type to control the operations of a cache, in accordance with some embodiments of the present disclosure.

The present disclosure includes techniques to use multiple caches or cache sets of a cache interchangeably with different types of executions by a connected processor. The types of executions can include speculative and non-speculative execution threads. Non-speculative execution can be referred to as main execution or normal execution.

For enhanced security, when a processor performs conditional speculative execution of instructions, the processor can be configured to use a shadow cache during the speculative execution of the instructions, where the shadow cache is separate from the main cache that is used during the main execution or normal execution of instructions. Some techniques of using a shadow cache to improve security can be found in U.S. patent application Ser. No. 16/028,930, filed Jul. 6, 2018 and entitled "Shadow Cache for Securing Conditional Speculative Instruction Execution," the entire disclosure of which is here by incorporated herein by reference. The present disclosure includes techniques to allow a cache to be configured dynamically as a shadow cache or a main cache; a unified set of cache resources can be dynamically allocated for the shadow cache or for the main cache; and the allocation can be changed during the execution of instructions.

In some embodiments, a system can include a memory system (e.g., including main memory), a processor, and a cache system coupled between the processor and memory system. The cache system can have a set of caches. And, a cache of the set of caches can be designed in multiple ways. For instance, a cache in the set of caches can include cache sets through cache set associativity (which can include physical or logical cache set associativity).

In some embodiments, caches of the system can be changeable between being configured for use in a first type of execution of instructions by the processor and being configured for use in a second type of execution of instructions by the processor. The first type can be a non-speculative execution of instructions by the processor. The second type can be a speculative execution of instructions by the processor.

In some embodiments, cache sets of a cache can be changeable between being configured for use in a first type of execution of instructions by the processor and being configured for use in a second type of execution of instructions by the processor. The first type can be a non-speculative execution of instructions by the processor. And, the second type can be a speculative execution of instructions by the processor.

In some embodiments, speculative execution is where the processor executes one or more instructions based on a speculation that such instructions need to be executed under some conditions, before the determination result is available as to whether such instructions should be executed or not. Non-speculative execution (or main execution, or normal execution) is where instructions are executed in an order according to the program sequence of the instructions.

In some embodiments, the set of caches of the system can include at least a first cache and a second cache. In such examples, the system can include a command bus, configured to receive a read command or a write command from the processor. The system can also include an address bus, configured to receive a memory address from the processor for accessing memory for a read command or a write command. And, a data bus can be included that is configured to: communicate data to the processor for the processor to read; and receive data from the processor to be written in memory. The memory access requests from the processor can be defined by the command bus, the address bus, and the data bus.

In some embodiments, a common command and address bus can replace the command and address buses described herein. Also, in such embodiments, a common connection to the common command and address bus can replace the respective connections to command and address buses described herein.

The system can also include an execution-type signal line that is configured to receive an execution type from the processor. The execution type can be either an indication of a normal or non-speculative execution or an indication of a speculative execution.

The system can also include a configurable data bit that is configured to be set to a first state (e.g., "0") or a second state (e.g., "1") to change the uses of the first cache and the second cache with respect to non-speculative execution and speculative execution.

The system can also include a logic circuit that is configured to select the first cache for a memory access request from the processor, when the configurable data bit is set to the first state and the execution-type signal line receives an indication of non-speculative execution. The logic circuit can also be configured to select the second cache for a memory access request from the processor, when the configurable data bit is set to the first state and the execution-type signal line receives an indication of speculative execution. The logic circuit can also be configured to select the second cache for a memory access request from the processor, when the configurable data bit is set to the second state and the execution-type signal line receives an indication of a non-speculative execution. The logic circuit can also be configured to select the first cache for a memory access request from the processor, when the configurable data bit is set to the second state and the execution-type signal line receives an indication of a speculative execution.

The system can also include a speculation-status signal line that is configured to receive speculation status from the processor. The speculation status can be either a confirmation or a rejection of a condition with nested instructions that are executed initially by a speculative execution and subsequently by a non-speculative execution when the speculation status is the confirmation of the condition.

The logic circuit can also be configured to select the second cache as identified by the first state of the configurable data bit and restrict the first cache from use or change as identified by the first state of the configurable data bit, when the signal received by the execution-type signal line changes from an indication of a non-speculative execution to an indication of a speculative execution.

Also, the logic circuit can be configured to change the configurable data bit from the first state to the second state and select the second cache for a memory access request when the execution-type signal line receives an indication of a non-speculative execution. This can occur when the signal received by the execution-type signal line changes from the indication of the speculative execution to the indication of the non-speculative execution and when the speculation status received by the speculation-status signal line is the confirmation of the condition.

The logic circuit can also be configured to maintain the first state of the configurable data bit and select the first cache for a memory access request when the execution-type signal line receives an indication of a non-speculative execution. This can occur when the signal received by the execution-type signal line changes from the indication of the speculative execution to the indication of the non-speculative execution and when the speculation status received by the speculation-status signal line is the rejection of the condition. Also, the logic circuit can be configured to invalidate and discard the contents of the second cache, when the signal received by the execution-type signal line changes from the indication of the speculative execution to the indication of the non-speculative execution and when the speculation status received by the speculation-status signal line is the rejection of the condition.

The system can also include a second command bus, configured to communicate a read command or a write command to a main memory connected to the cache system. The read command or the write command can be received from the processor by the cache system. The system can also include a second address bus, configured to communicate a memory address to the main memory. The memory address can be received from the processor by the cache system. The system can also include a second data bus, configured to communicate data to the main memory to be written in memory, and receive data from the main memory to be communicated to the processor to be read by the processor. Memory access requests to the main memory from the cache system can be defined by the second command bus, the second address bus, and the second data bus.

As mentioned, a cache of the set of caches can be designed in multiple ways, and one of those ways includes a cache of a set divided into cache sets through cache set associativity (which can include physical or logical cache set associativity). A benefit of cache design through set associativity is that a single cache with set associativity can have multiple cache sets within the single cache, and thus, different parts of the single cache can be allocated for use by the processor without allocating the entire cache. Therefore, the single cache can be used more efficiently. This is especially the case when the processor executes multiple types of threads or has multiple execution types. For instance, the cache sets within a single cache can be used interchangeably with different execution types instead of the use of interchangeable caches. Common examples of cache division include having two, four, or eight cache sets within a cache.

Figure 7A:
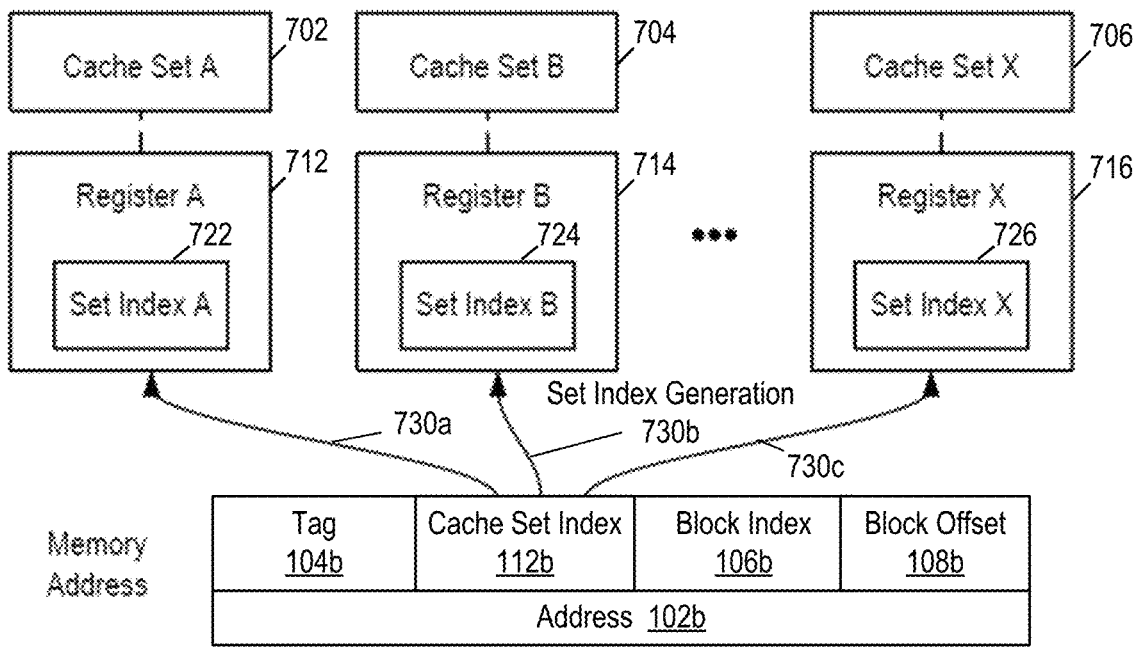

Also, set associativity cache design is advantageous over other common cache designs when the processor executes main and speculative threads. Since a speculative execution may use less additional cache capacity than the normal or non-speculative execution, the selection mechanism can be implemented at a cache set level and thus reserve less space than an entire cache (i.e., a fraction of a cache) for speculative execution. Cache with set associativity can have multiple cache sets within a set (e.g., division of two, four, or eight cache sets within a cache). For instance, as shown in FIG. 7A, there are a least four cache sets in a cache of a cache system (e.g., see cache sets 702, 704, and 706). The normal or non-speculative execution, which usually demands most of cache capacity can have a larger numbers of cache sets delegated to it. And, the speculative execution with modifications over the non-speculative execution can use one cache set or a smaller number of cache sets, since the speculative execution typically involving less instructions than the non-speculative execution.

Figure 6:
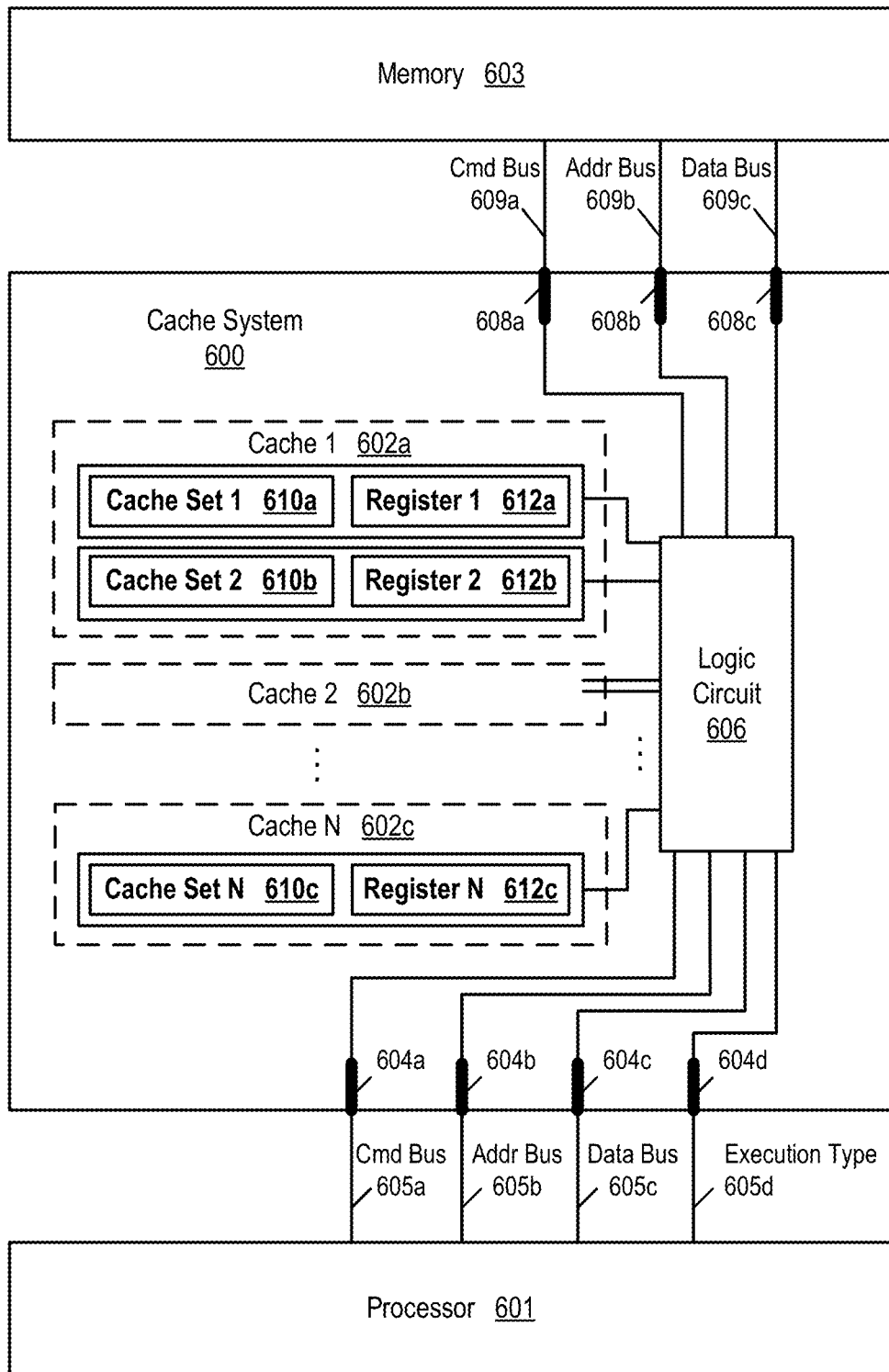
FIGS. 6, 7A, 7B, 8A, 8B, 9A, and 9B show example aspects of example computing devices, each computing device including a cache system having interchangeable cache sets for first type and second type executions (e.g., main type and speculative type executions), in accordance with some embodiments of the present disclosure.
Figure 10:
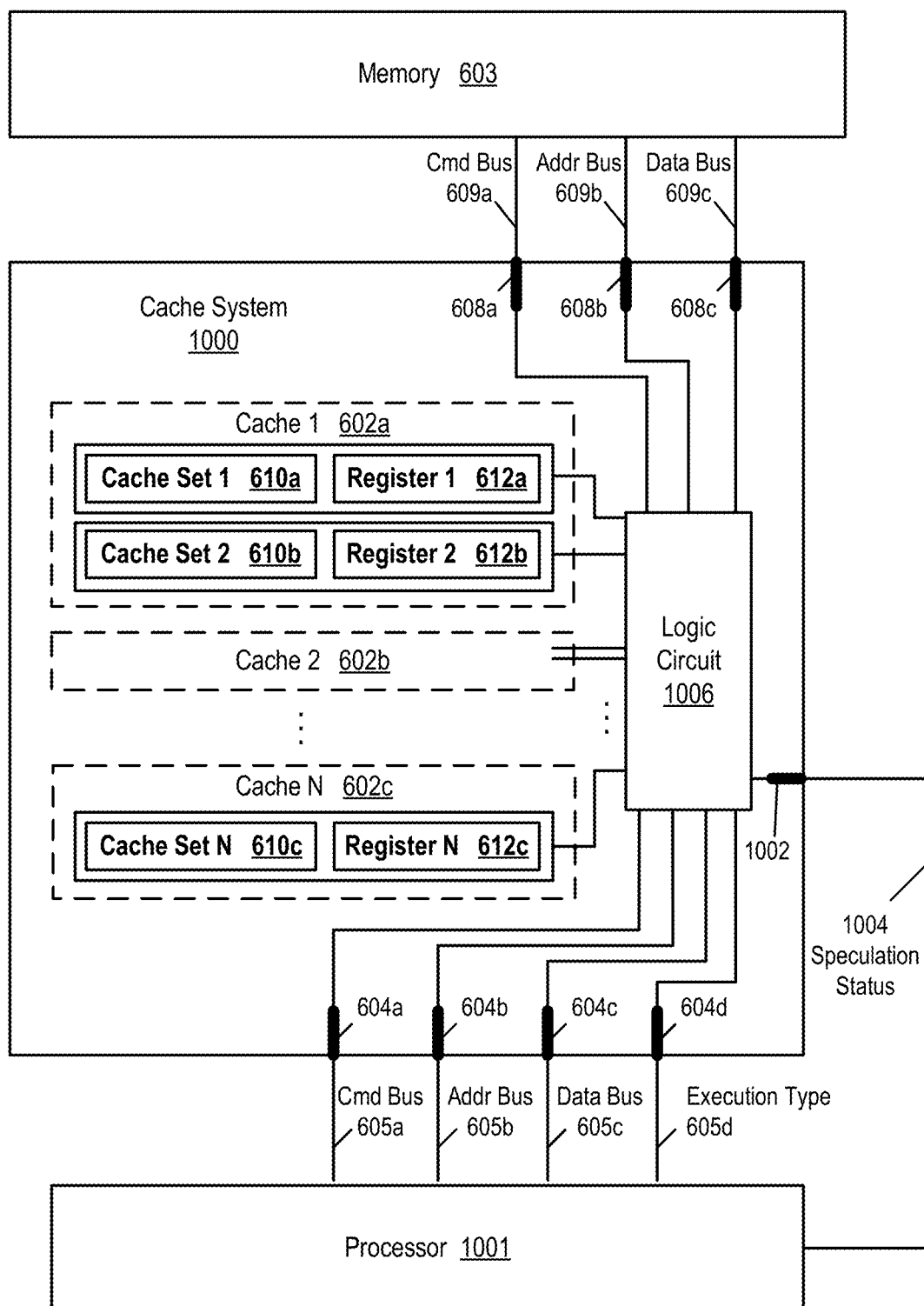
FIG. 10 shows example aspects of an example computing device including a cache system having interchangeable cache sets for main type and speculative type executions specifically, in accordance with some embodiments of the present disclosure.

As shown in FIG. 6 or 10, a cache system can include multiple caches (such as caches 602*a*, 602*b*, and 602*c* depicted in FIG. 6) for a processor and a cache of a cache system can include cache sets (such as cache sets 610*a*, 610*b*, and 610*c* depicted in FIG. 6) to further divide the organization of the cache system. Such an example includes a cache system with set associativity.

On the cache set level of a cache, a first cache set (e.g., see cache set 702 depicted in FIG. 7A, FIGS. 8A, and 9A) can hold content for use with a first type of execution by the processor or a second type. For instance, the first cache set can hold content for use with a non-speculative type or a speculative type of execution by the processor. Also, a second cache set (e.g., see cache set 704 or 706 depicted in FIG. 7A, FIGS. 8A, and 9A) can hold content for use with the first type of execution by the processor or the second type.

For example, in a first time instance, a first cache set is used for normal or non-speculative execution and a second cache set is used for speculative execution. In a second time instance, the second cache set is used for normal or non-speculative execution and the first cache set is used for speculative execution. A way of delegating/switching the cache sets for non-speculative and speculative executions can use set associativity via a cache set index within or external to a memory address tag or via a cache set indicator within a memory address tag that is different from a cache set index (e.g., see FIGS. 7A, 7B, 8A, 8B, 9A, and 9B).

As shown in at least FIGS. 1B, 1C, 1D, 1E, 7A, 7B, 8A, 8B, 9A, and 9B, a cache set index or a cache set indicator can be included in cache block addressing to implement cache set addressing and associativity. Cache block addressing can be stored in memory (e.g., SRAM, DRAM, etc. depending on design of computing device-design of processor registers, cache system, other intermediate memory, main memory, etc.).

As shown in FIGS. 6, 7A, 7B, 8A, 8B, 9A, 9B, and 10, each cache set of a cache (e.g., level 1, level 2 or level 3 cache) has a respective register (e.g., register 610*a*, 610*b*, or 610*c* shown in FIGS. 6 and 10 or register 712, 714, or 716 shown in FIGS. 7A, 7B, 8A, 8B, 9A, and 9B) and one of set indexes (e.g., see set indexes 722, 724, 726, and 728 shown in FIGS. 7A, 7B, 8A, 8B, 9A, and 9B) that can be swapped between the respective registers to implement swapping of cache sets for non-speculative and speculative executions of the processor (or, in general, for first type and second type executions of the processor). For example, with respect to FIGS. 7A and 7B, at a first time period, a first type of execution can use cache sets 702 and 704 and a second type of execution can use cache set 706. Then, at a second time period, the first type of execution can use cache sets 704 and 706 and the second type of execution can use cache set 702. Note this is just one example usage of cache sets, and it is to be understood that any of the cache sets without a predetermined restriction can be used by the first or second types of execution depending on time periods or set indexes or indicators stored in the registers.

In some embodiments, a number of cache sets can be initially allocated for use in the first type of execution (e.g., non-speculative execution). During the second type of execution (e.g., speculative execution), one of the cache sets initially used for the first type of execution or not (such as a reserved cache set) can be used in the second type of execution. Essentially, a cache set allocated for the second type of execution can be initially a free cache set waiting to be used, or selected from the number of cache sets used for the first type of execution (e.g., a cache set that is less likely to be further used in further first type executions).

In general, in some embodiments, the cache system includes a plurality of cache sets. The plurality of cache sets can include a first cache set, a second cache set, and a plurality of registers associated with the plurality of cache sets respectively. The plurality of registers can include a first register associated with the first cache set and a second register associated with the second cache set. The cache system can also include a connection to a command bus coupled between the cache system and a processor, a connection to an address bus coupled between the cache system and the processor, and a connection to a data bus coupled between the cache system and the processor. The cache system can also include a logic circuit coupled to the processor to control the plurality of cache sets according to the plurality of registers.

In such embodiments, the cache system can be configured to be coupled between the processor and a memory system. And, when the connection to the address bus receives a memory address from the processor, the logic circuit can be configured to generate a set index from at least the memory address (e.g., see set index generation 730, 732, 830, 832, 930, and 932 shown in FIGS. 7A, 7B, 8A, 8B, 9A, and 9B respectively). Also, when the connection to the address bus receives a memory address from the processor, the logic circuit can be configured to determine whether the generated set index matches with content stored in the first register or with content stored in the second register. Also, the logic circuit can be configured to implement a command received in the connection to the command bus via the first cache set in response to the generated set index matching with the content stored in the first register and via the second cache set in response to the generated set index matching with the content stored in the second register. Also, in response to a determination that a data set of the memory system associated with the memory address is not currently cached in the cache system, the logic circuit can be configured to allocate the first cache set for caching the data set and store the generated set index in the first register. The generated set index can include a predetermined segment of bits in the memory address.

The cache system can also include a connection to an execution-type signal line from the processor identifying an execution type (e.g., see connection 604d depicted in FIGS. 6 and 10). In such embodiments, the generated set index can be generated further based on a type identified by the execution-type signal line. Also, the generated set index can include a predetermined segment of bits in the memory address and a bit representing the type identified by the execution-type signal line (e.g., the generated set index can include or be derived from the predetermined segment of bits in the memory address 102e and one or more bits representing the type identified by the execution-type signal line, in execution type 110e, shown in FIG. 1E).

Also, when the first and second registers are in a first state, the logic circuit can be configured to: implement commands received from the command bus for accessing the memory system via the first cache set, when the execution type is a first type; and implement commands received from the command bus for accessing the memory system via the second cache set, when the execution type is a second type.

Also, when the first and second registers are in a second state, the logic circuit can be configured to: implement commands received from the command bus for accessing the memory system via another cache set of the plurality of cache sets besides the first cache set, when the execution type is the first type; and implement commands received from the command bus for accessing the memory system via another other cache set of the plurality of cache sets besides the second cache set, when the execution type is the second type. In such an example, each one of the plurality of registers can be configured to store a set index, and when the execution type changes from the second type to the first type, the logic circuit can be configured to change the content stored in the first register and the content stored in the second register.

Figure 7B:
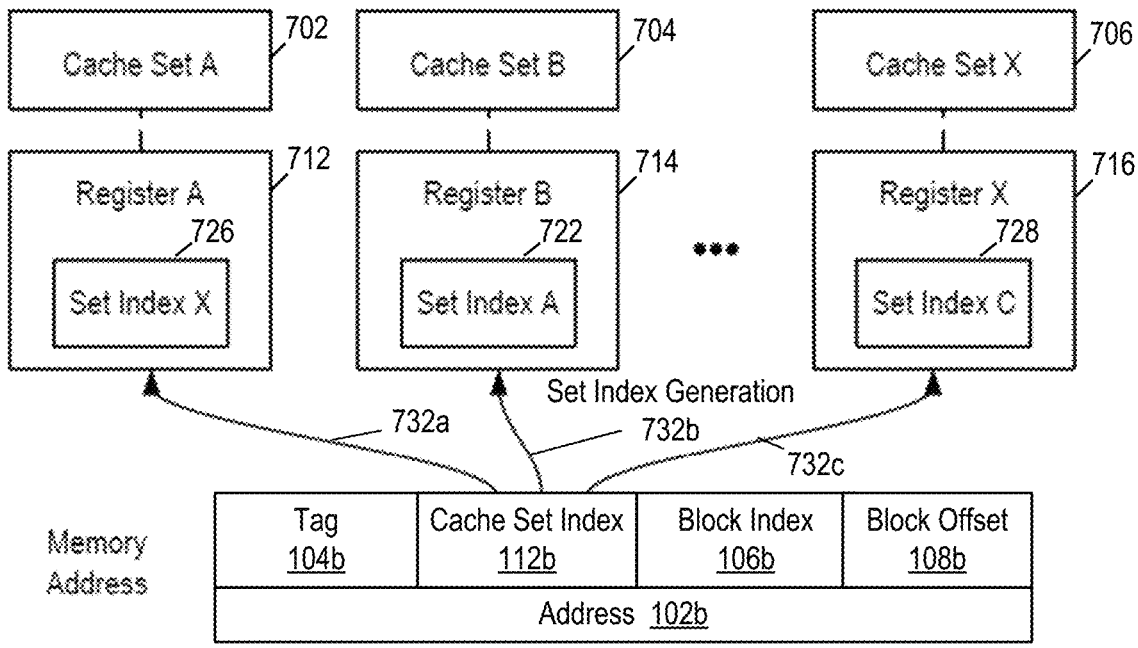

In some embodiments, the first type is configured to indicate non-speculative execution of instructions by the processor; and the second type is configured to indicate speculative execution of instructions by the processor. In such embodiments, the cache system can further include a connection to a speculation-status signal line from the processor identifying a status of a speculative execution of instructions by the processor (e.g., see connection 1002 shown in FIG. 10). The connection to the speculation-status signal line can be configured to receive the status of a speculative execution, and the status of a speculative execution can indicate that a result of a speculative execution is to be accepted or rejected. Each one of the plurality of registers can be configured to store a set index, and when the execution type changes from the second type to the first type, the logic circuit can be configured to change the content stored in the first register and the content stored in the second register, if the status of speculative execution indicates that a result of speculative execution is to be accepted (e.g., see the changes of the content stored in the registers shown between FIG. 7A and FIG. 7B, shown between FIG. 8A and FIG. 8B, and shown between FIG. 9A and FIG. 9B). And, when the execution type changes from the second type to the first type, the logic circuit can be configured to maintain the content stored in the first register and the content stored in the second register without changes, if the status of speculative execution indicates that a result of speculative execution is to be rejected.

Figure 11A:
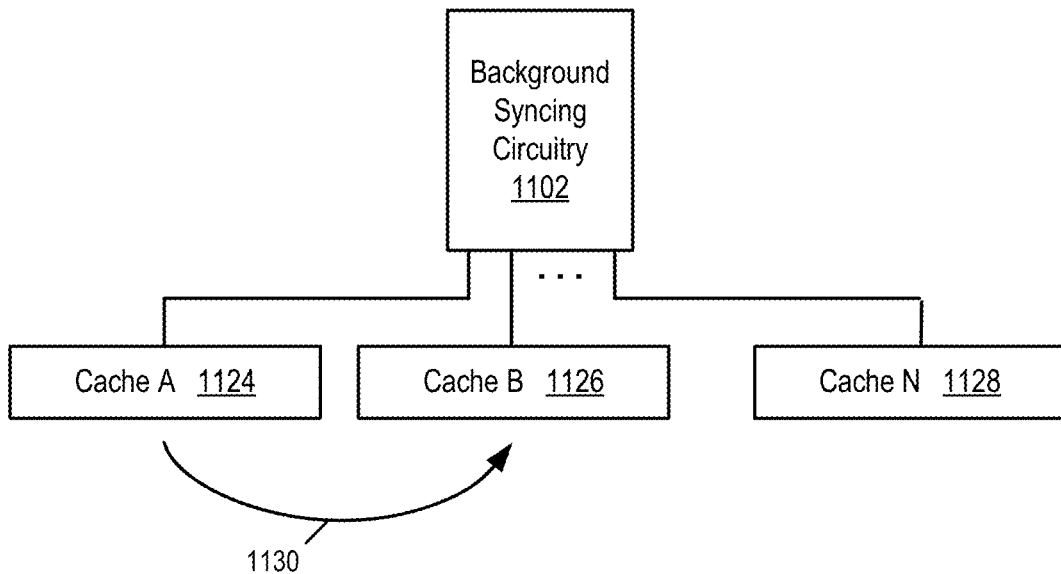
FIGS. 11A and 11B illustrate background synching circuitry for synchronizing content between a main cache and a shadow cache to save the content cached in the main cache in preparation of acceptance of the content in the shadow cache, in accordance with some embodiments of the present disclosure.
Figure 11B:
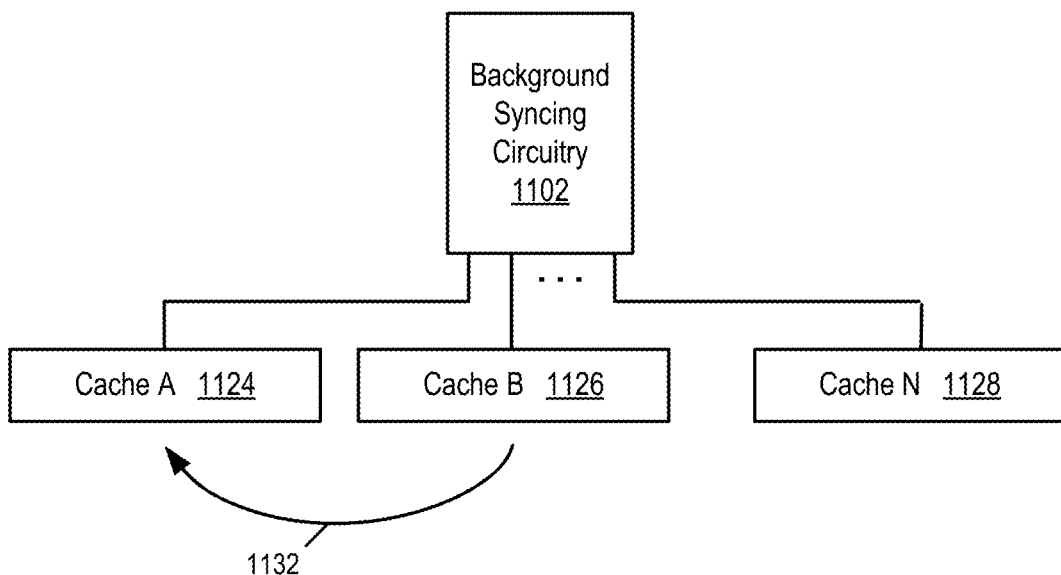

Additionally, the cache systems described herein (e.g., cache systems 200, 400, 600, and 1000) can each include or be connected to background syncing circuitry (e.g., see background syncing circuitry 1102 shown in FIGS. 11A and 11B). The background syncing circuitry can be configured to synchronize caches or cache sets before reconfiguring a shadow cache as a main cache and/or reconfiguring a main cache as shadow cache.

For example, the content of a cache or cache set that is initially delegated for a speculative execution (e.g., an extra cache or a spare cache set delegated for a speculative execution) can be synced with a corresponding cache or cache set used by a normal or non-speculative execution (to have the cache content of the normal execution), such that if the speculation is confirmed, the cache or cache set that is initially delegated for the speculative execution can immediately join the cache sets of a main or non-speculative execution. Also, the original cache set corresponding to the cache or cache set that is initially delegated for the speculative execution can be removed from the group of cache sets used for the main or non-speculative execution. In such embodiments, a circuit, such as a circuit including the background synching circuitry, can be configured to synchronize caches or cache sets in the background to reduce the impact of cache set syncing on cache usage by the processor. Also, the synchronization of the cache or cache sets can continue either until the speculation is abandoned, or until the speculation is confirmed and the syncing is complete. The synchronization may optionally include syncing (e.g., writing back) to the memory.

In some embodiments, a cache system can include a first cache and a second cache as well as a connection to a command bus coupled between the cache system and a processor, a connection to an address bus coupled between the cache system and the processor, a connection to a data bus coupled between the cache system and the processor, and a connection to an execution-type signal line from the processor identifying an execution type (e.g., see cache systems 200 and 400). Such a cache system can also include a logic circuit coupled to control the first cache and the second cache according to the execution type, and the cache system can be configured to be coupled between the processor and a memory system. Also, when the execution type is a first type indicating non-speculative execution of instructions by the processor and the first cache is configured to service commands from the command bus for accessing the memory system, the logic circuit can be configured to copy a portion of content cached in the first cache to the second cache (e.g., see operation 1202). Further, the logic circuit can be configured to copy the portion of content cached in the first cache to the second cache independent of a current command received in the command bus.

Additionally, when the execution type is the first type indicating non-speculative execution of instructions by the processor and the first cache is configured to service commands from the command bus for accessing the memory system, the logic circuit can be configured to service subsequent commands from the command bus using the second cache in response to the execution type being changed from the first type to a second type indicating speculative execution of instructions by the processor (e.g., see operation 1208). In such an example, the logic circuit can be configured to complete synchronization of the portion of the content from the first cache to the second cache before servicing the subsequent commands after the execution type is changed from the first type to the second type (e.g., see FIG. 12). The logic circuit can also be configured to continue synchronization of the portion of the content from the first cache to the second cache while servicing the subsequent commands (e.g., see operation 1210).

In such embodiments, the cache system can also include a configurable data bit, wherein the logic circuit is further coupled to control the first cache and the second cache according to the configurable data bit. Also, in such embodiments, the cache system can further include a plurality of cache sets. For instance, the first cache and the second cache together can include the plurality of cache sets, and a plurality of cache sets can include a first cache set and a second cache set. The cache system can also include a plurality of registers associated with the plurality of cache sets respectively. The plurality of registers can include a first register associated with the first cache set and a second register associated with the second cache set. And, in such embodiments, the logic circuit can be further coupled to control the plurality of cache sets according to the plurality of registers.

In some embodiments, a cache system can include a plurality of cache sets that includes a first cache set and a second cache set. The cache system can also include a plurality of registers associated with the plurality of cache sets respectively, which includes a first register associated with the first cache set and a second register associated with the second cache set. In such embodiments, the cache system can include a plurality of caches that include a first cache and a second cache, and the first cache and the second cache together can include at least part of the plurality of cache sets. Such a cache system can also include a connection to a command bus coupled between the cache system and a processor, a connection to an address bus coupled between the cache system and the processor, a connection to a data bus coupled between the cache system and the processor, and a connection to an execution-type signal line from the processor identifying an execution type, as well as a logic circuit coupled to control the plurality of cache sets according to the execution type.

In such embodiments, the cache system can be configured to be coupled between the processor and a memory system. And, when the execution type is a first type indicating non-speculative execution of instructions by the processor and the first cache set is configured to service commands from the command bus for accessing the memory system, the logic circuit is configured to copy a portion of content cached in the first cache set to the second cache set. The logic circuit can also be configured to copy the portion of content cached in the first cache set to the second cache set independent of a current command received in the command bus.

Also, when the execution type is the first type indicating non-speculative execution of instructions by the processor and the first cache set is configured to service commands from the command bus for accessing the memory system, the logic circuit can be configured to service subsequent commands from the command bus using the second cache set in response to the execution type being changed from the first type to a second type indicating speculative execution of instructions by the processor. The logic circuit can also be configured to complete synchronization of the portion of the content from the first cache set to the second cache set before servicing the subsequent commands after the execution type is changed from the first type to the second type. The logic circuit can also be configured to continue synchronization of the portion of the content from the first cache set to the second cache set while servicing the subsequent commands. And, the logic circuit can be further coupled to control the plurality of cache sets according to the plurality of registers.

In addition to using a shadow cache for securing speculative executions, and synchronizing content between a main cache and the shadow cache to save the content cached in the main cache in preparation of acceptance of the content in the shadow cache, a spare cache set can be used to accelerate the speculative executions. Also, a spare cache set can be used to accelerate the speculative executions without use of a shadow cache. Use of a spare cache set is useful with shadow cache implementations because data held in cache sets used as a shadow cache can be validated and therefore used for normal execution and some cache sets used as the main cache may not be ready to be used as the shadow cache. Thus, one or more cache sets can be used as spare cache sets to avoid delays from waiting for cache set availability. To put it another way, once a speculation is confirmed, the content of the cache sets used as a shadow cache is confirmed to be valid and up-to-date; and thus, the former cache sets used as the shadow cache for speculative execution are used for normal execution. However, some of the cache sets initially used as the normal cache may not be ready to be used for a subsequent speculative execution. Therefore, one or more cache sets can be used as spares to avoid delays from waiting for cache set availability and accelerate the speculative executions.

In some embodiments, if the syncing from a cache set in the normal cache to a corresponding cache set in the shadow cache has not yet been completed, the cache set in the normal cache cannot be freed immediately for use in the next speculative execution. In such a situation, if there is no spare cache set, the next speculative execution has to wait until the syncing is complete so that the corresponding cache set in the normal cache can be freed. This is just one example, of when a spare cache set is beneficial and can be added to an embodiment. And, there are many other situations when cache sets in the normal cache cannot be freed immediately so a spare cache set can be useful.

Also, in some embodiments, the speculative execution may reference a memory region that has no overlapping with the memory region cached in the cache sets used in the normal cache. As a result of accepting the result of the speculative execution, the cache sets in the shadow cache and the normal cache may all be in the normal cache. This can cause delays as well, because it takes time for the cache system to free a cache set to support the next speculative execution. To free one, the cache system can identify a cache set, such as a least used cache set, and synchronize the cache set with the memory system. If the cache has data that is more up to date than the memory system, the data can be written into the memory system.

Additionally, a system using a spare cache set can also use background synchronizing circuitry such as the background synchronizing circuitry 1102 depicted in FIGS. 11A and 11B. The background synchronizing circuitry 1102 can be a part of the logic circuit 606 or 1006, in some embodiments. When an initial speculation is confirmed, the cache set used in the initial speculation can be switched to join the set of cache sets used for a main execution. Instead of using a cache set from the prior main execution that was being used for a case of the speculation failing, a spare cache set can be made available immediately for a next speculative execution. Also, the spare cache set can be updated for the next speculative execution via the background synchronizing circuitry. And, because of background synchronizing, a spare cache set can be ready for use when the cache set currently used for the speculation execution is ready to be accepted for normal execution. This way there is no delay in waiting for use of the next cache set for the next speculative execution. To prepare for the next speculative execution, the spare cache set can be synchronized to a normal cache set that is likely to be used in the next speculative execution or a least used cache set in the system.

In addition to using a shadow cache, synchronizing content between a main cache and the shadow cache, and using a spare cache set, extended tags can be used to improve use of interchangeable caches and caches sets for different types of executions by a processor (such as speculative and non-speculative executions). There are many different ways to address cache sets and cache blocks within a cache system using extended tagging. Two example ways are shown in FIGS. 16 and 17.

In general, cache sets and cache blocks can be selected via a memory address. In some examples, selection is via set associativity. Both examples in FIGS. 16 and 17 use set associativity. In FIG. 16, set associativity is implicitly defined (e.g., defined through an algorithm that can be used to determine which tag should be in which cache set for a given execution type). In FIG. 17, set associativity is implemented via the bits of cache set index in the memory address. Also, parts of the functionality illustrated in FIGS. 16 and 17 can be implemented without use of set associativity (although this is not depicted in FIGS. 16 and 17).

Figure 16:
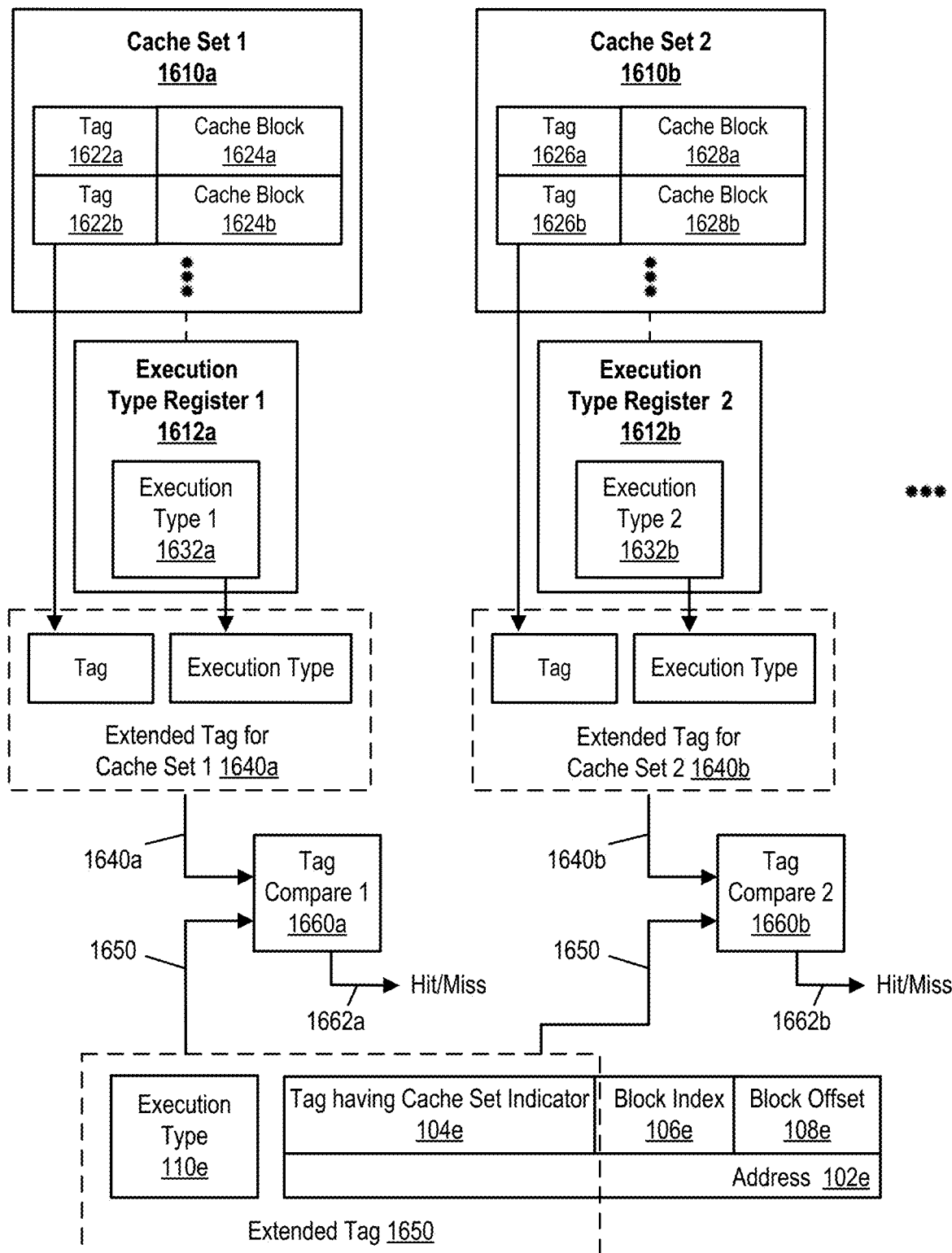
FIGS. 16 and 17 show example aspects of example computing devices having cache systems having interchangeable cache sets utilizing extended tags for different types of executions by a processor (such as speculative and non-speculative executions), in accordance with some embodiments of the present disclosure.
Figure 17:
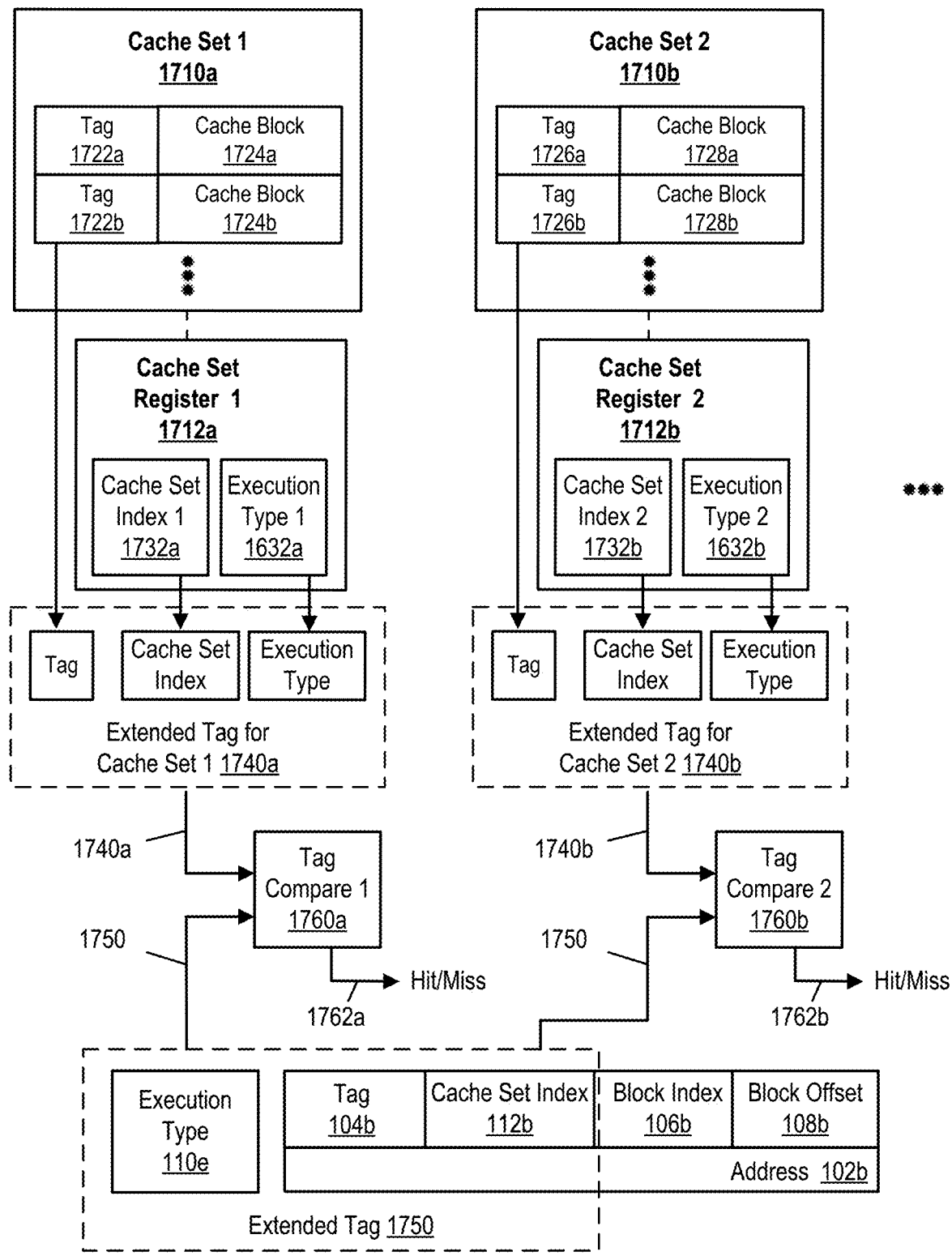

In some embodiments, including embodiments shown in FIGS. 16 and 17, a block index can be used as an address within individual cache sets to identify particular cache blocks in a cache set. And, the extended tags can be used as addresses for the cache sets. A block index of a memory address can be used for each cache set to get a cache block and a tag associated with the cache block. Also, as shown in FIGS. 16 and 17, tag compare circuits can compare the extended tags generated from the cache sets with the extended cache tag generated from a memory address and a current execution type. The output of the comparison can be a cache hit or miss. The construction of the extended tags guarantee that there is at most one hit among the cache sets. If there is a hit, a cache block from the selected cache set provides the output. Otherwise, the data associated with the memory address is not cached in or outputted from any of the cache sets. In short, the extended tags depicted in FIGS. 16 and 17 are used to select a cache set, and the block indexes are used to select a cache block and its tag within a cache set.

Also, as shown in FIG. 17, the combination of a tag and a cache set index in the system can provide somewhat similar functionality as merely using a tag—as shown in FIG. 16. However, in FIG. 17, by separating the tag and the cache set index, a cache set does not have to store redundant copies of the cache set index since a cache set can be associated with a cache set register to hold cache set indexes. Whereas, in FIG. 16, a cache set does need to store redundant copies of a cache set indicator in each of its blocks. However, since tags have the same cache set indicator in embodiments depicted in FIG. 16, the indicator could be stored once in a register for the cache set (e.g., see cache set registers shown in FIG. 17). A benefit of using cache set registers is that the lengths of the tags can be shorter in comparison with an implementation of the tags without cache set registers.

Both of the embodiments shown in FIGS. 16 and 17 have cache set registers configured to hold an execution type so that the corresponding cache sets can be used in implementing different execution types (e.g., speculative and non-speculative execution types). But, the embodiment shown in FIG. 17 has registers that are further configured to hold an execution type and a cache set index. When the execution type is combined with the cache set index to form an extended cache set index, the extended cache set index can be used to select one of the cache sets without depending on the addressing through tags of cache blocks. Also, when a tag from a selected cache set is compared to the tag in the address to determine hit or miss, the two-stage selection can be similar to a conventional two-stage selection using a cache set index or can be used to be combined with the extended tag to support interchanging of cache sets for different execution types.

In addition to using extended tags as well as other techniques disclosed herein to improve use of interchangeable caches and caches sets for different types of executions by a processor, a circuit included in or connected to the cache system can be used to map physical outputs from cache sets of a cache hardware system to a logical main cache and a logical shadow cache for normal and speculative executions by the processor respectively. The mapping can be according to at least one control register (e.g., a physical-to-logical-set-mapping (PLSM) register).

Also, disclosed herein are computing devices having cache systems having interchangeable cache sets utilizing a mapping circuit (such as mapping circuit 1830 shown in FIG. 18) to map physical cache set outputs to logical cache set outputs. A processor coupled to the cache system can execute two types of threads such as speculative and non-speculative execution threads. The speculative thread is executed speculatively with a condition that has not yet been evaluated. The data of the speculative thread can be in a logical shadow cache. The data of the non-speculative thread can be in the logical main or normal cache. Subsequently, when the result of evaluating the condition becomes available, the system can keep the results of executing the speculative thread when the condition requires the execution of the thread, or remove it. With the mapping circuit, the hardware circuit for the shadow cache can be repurposed as the hardware circuit for the main cache by changing the content of the control register. Thus, for example, there is no need to synchronize the main cache with the shadow cache if the execution of the speculative thread is required.

In a conventional cache, each cache set is statically associated with a particular value of "Index S"/"Block Index L". In the cache systems disclosed herein, any cache set can be used for any purpose for any index value S/L and for a main cache or a shadow cache. Cache sets can be used and defined by data in cache set registers associated with the cache sets. A selection logic can then be used to select the appropriate result based on the index value of S/L and how the cache sets are used.

For example, four cache sets, a cache set 0 to set 3, can be initially used for a main cache for S/L=00, 01, 10 and 11 respectively. A fourth cache set can be used as the speculative cache for S/L=00, assuming that speculative execution does not change the cache sets defined by 01, 10 and 11. If the result of the speculative execution is required, the mapping data can be changed to indicate that the main cache for S/L=00, 01, 10 and 11 are respectively for the fourth cache set, cache set 1, cache set 2, and cache set 3. Cache set 0 can then be freed or invalidated for subsequent use in a speculative execution. If the next speculative execution needs to change the cache set S/L to 01, cache set 0 can be used as the shadow cache (e.g., copied from cache set 1 and used to look up content for addresses with S/L equaling '01').

Also, the cache system and processor does not merely switch back and forth between a predetermined main thread and a predetermined speculative thread. Consider the speculative execution of the following pseudo-program.

Instructions A;
If condition=true,
  then Instructions B;
End conditional loop;
Instructions C; and
Instructions D.
For the pseudo-program, the processor can run two threads.
Thread A:
Instructions A;
Instructions C; and
Instructions D.
Thread B:
Instructions A;
Instructions B;
Instructions C; and
Instructions D.

The execution of Instructions B is speculative because it depends on the test result of "condition=true" instead of "condition=false". The execution of Instructions B is required only when condition=true. By the time the result of the test "condition=true" becomes available, the execution of Thread A reached Instructions D and the execution of Thread A may reach Instructions C. If the test result requires the execution of Instructions B, cache content for thread B is correct and cache content for thread A is incorrect. Then, all changes made in the cache according to Thread B should be retained and the processor can continue the execution of Instructions C using the cache that has the results of executing Instructions B; and Thread A is terminated. Since the changes made according to Thread B is in the shadow cache, the content of the shadow cache should be accepted as the main cache. If the test result requires no execution of Instructions B, the results of the Thread B is discarded (e.g., the content of the shadow cache is discarded or invalidated).

The cache sets used for the shadow and the normal cache can be swapped or changed according to a mapping circuit and a control register (e.g., a physical-to-logical-set-mapping (PLSM) register). In some embodiments, a cache system can include a plurality of cache sets, having a first cache set configured to provide a first physical output upon a cache hit and a second cache set configured to provide a second physical output upon a cache hit. The cache system can also include a connection to a command bus coupled between the cache system and a processor and a connection to an address bus coupled between the cache system and the processor. The cache system can also include the control register, and the mapping circuit coupled to the control register to map respective physical outputs of the plurality of cache sets to a first logical cache and a second logical cache according to a state of the control register. The cache system can be configured to be coupled between the processor and a memory system.

When the connection to the address bus receives a memory address from the processor and when the control register is in a first state, the mapping circuit can be configured to: map the first physical output to the first logical cache for a first type of execution by the processor to implement commands received from the command bus for accessing the memory system via the first cache set during the first type of execution; and map the second physical output to the second logical cache for a second type of execution by the processor to implement commands received from the command bus for accessing the memory system via the second cache set during the second type of execution. And, when the connection to the address bus receives a memory address from the processor and when the control register is in a second state, the mapping circuit is configured to: map the first physical output to the second logical cache to implement commands received from the command bus for accessing the memory system via the first cache set during the second type of execution; and map the second physical output to the first logical cache to implement commands received from the command bus for accessing the memory system via the second cache set for the first type of execution.

In some embodiments, the first logical cache is a normal cache for non-speculative execution by the processor, and the second logical cache is a shadow cache for speculative execution by the processor.

Also, in some embodiments, the cache system can further include a plurality of registers associated with the plurality of cache sets respectively, including a first register associated with the first cache set and a second register associated with the second cache set. The cache system can also include a logic circuit coupled to the processor to control the plurality of cache sets according to the plurality of registers. When the connection to the address bus receives a memory address from the processor, the logic circuit can be configured to generate a set index from at least the memory address, as well as determine whether the generated set index matches with a content stored in the first register or with a content stored in the second register. And, the logic circuit can be configured to implement a command received in the connection to the command bus via the first cache set in response to the generated set index matching with the content stored in the first register and via the second cache set in response to the generated set index matching with the content stored in the second register.

In some embodiments, the mapping circuit can be a part of or connected to the logic circuit and the state of the control register can control a state of a cache set of the plurality of cache sets. In some embodiments, the state of the control register can control the state of a cache set of the plurality of cache sets by changing a valid bit for each block of the cache set.

Also, in some examples, the cache system can further include a connection to a speculation-status signal line from the processor identifying a status of a speculative execution of instructions by the processor. The connection to the speculation-status signal line can be configured to receive the status of a speculative execution, and the status of a speculative execution can indicate that a result of a speculative execution is to be accepted or rejected. When the execution type changes from the speculative execution to a non-speculative execution, the logic circuit can be configured to change, via the control register, the state of the first and second cache sets, if the status of speculative execution indicates that a result of speculative execution is to be accepted (e.g., when the speculative execution is to become the main thread of execution). And, when the execution type changes from the speculative execution to a non-speculative execution, the logic circuit can be configured to maintain, via the control register, the state of the first and second cache sets without changes, if the status of speculative execution indicates that a result of speculative execution is to be rejected.

In some embodiments, the mapping circuit is part of or connected to the logic circuit and the state of the control register can control a state of a cache register of the plurality of cache registers via the mapping circuit. In such examples, the cache system can further include a connection to a speculation-status signal line from the processor identifying a status of a speculative execution of instructions by the processor. The connection to the speculation-status signal line can be configured to receive the status of a speculative execution, and the status of a speculative execution indicates that a result of a speculative execution is to be accepted or rejected. When the execution type changes from the speculative execution to a non-speculative execution, the logic circuit can be configured to change, via the control register, the state of the first and second registers, if the status of speculative execution indicates that a result of speculative execution is to be accepted. And, when the execution type changes from the speculative execution to a non-speculative execution, the logic circuit can be configured to maintain, via the control register, the state of the first and second registers without changes, if the status of speculative execution indicates that a result of speculative execution is to be rejected.

Additionally, the present disclosure includes techniques to secure speculative instruction execution using multiple interchangeable caches that are each interchangeable as a shadow cache or a main cache. The speculative instruction execution can occur in a processor of a computing device.

The processor can execute two different types of threads of instructions. One of the threads can be executed speculatively (such as with a condition that has not yet been evaluated). The data of the speculative thread can be in a logical cache acting as a shadow cache. The data of a main thread can be in a logical cache acting as a main cache. Subsequently, when the result of evaluating the condition becomes available, the processor can keep the results of executing the speculative thread when the condition requires the execution of the thread, or remove the results. The hardware circuit for the cache acting as a shadow cache can be repurposed as the hardware circuit for the main cache by changing the content of the register. Thus, there is no need to synchronize the main cache with the shadow cache if the execution of the speculative thread is required.

The techniques disclosed herein also relate to the use of a unified cache structure that can be used to implement, with improved performance, a main cache and a shadow cache. In the unified cache structure, results of cache sets can be dynamically remapped using a set of registers to switch being in the main cache and being in the shadow cache. When a speculative execution is successful, the cache set used with the shadow cache has the correct data and can be remapped as the corresponding cache set for the main cache. This eliminates a need to copy the data from the shadow cache to the main cache as used by other techniques using shadow and main caches.

In general, a cache can be configured as multiple sets of blocks. Each block set can have multiple blocks and each block can hold a number bytes. A memory address can be partitioned into three segments for accessing the cache: tag, block index (which can be for addressing a set within the multiple sets), and cache block (which can be for addressing a byte in a block of bytes). For each block in a set, the cache stores not only the data from the memory, but can also store a tag of the address from which the data is loaded and a field indicating whether the content in the block is valid. Data can be retrieved from the cache using the block index (e.g., set ID) and the cache block (e.g., byte ID). The tag in the retrieved data is compared with the tag portion of the address. A matched tag means the data is cached for the address. Otherwise, it means that the data can be cached for another address that is mapped to the same location in the cache.

With the techniques using multiple interchangeable caches, the physical cache sets of the interchangeable caches are not hardwired as main cache or shadow cache. A physical cache set can be used either as a main cache set or a shadow cache set. And, a set of registers can be used to specify whether the physical cache set is currently being used as a main cache set or a shadow cache set. In general, a mapping can be constructed to translate the outputs of the physical cache sets as logical outputs of the corresponding cache sets represented by the block index (e.g., set ID) and the main status or shadow status. The remapping allows any available physical cache to be used as a shadow cache.

In some embodiments, the unified cache architecture can remap a shadow cache (e.g., speculative cache) to a main cache, and can remap a main cache to a speculative cache. It is to be understood that designs can include any number of caches or cache sets that can interchange between being main or speculative caches or cache sets.

It is to be understood that there are no physical distinctions in the hardwiring of the main and speculative caches or cache sets. And, in some embodiments, there are no physical distinctions in the hardwiring of the logic units described herein. It is to be understood that interchangeable caches or cache sets do not have different caching capacity and structure. Otherwise, such caches or cache sets would not be interchangeable. Also, the physical cache sets can dynamically be configured to be main or speculative, such as with no a priori determination.

Also, it is to be understood that interchangeability occurs at the cache level and not at the cache block level. Interchangeability at cache block level may allow the main cache and the shadow cache to have different capacity; and thus, not be interchangeable.

Also, in some embodiments, when a speculation, by a processor, is successful and a cache is being used as a main cache as well as another cache is being used as a speculative or shadow cache, the valid bits associated with cache index blocks of the main cache are all set to indicate invalid (e.g., indicating invalid by a "0" bit value). In such embodiments, the initial states of all the valid bits of the speculative cache are indicative of invalid but then changed to indicate valid since the speculation was successful. In other words, the previous state of the main cache is voided, and the previous state of the speculative cache is set from invalid to valid and accessible by a main thread.

In some embodiments, a PLSM register for the main cache can be changed from indicating the main cache to indicating the speculative cache. The change in the indication, by the PLSM register, of the main cache to the speculative cache can occur by the PLSM register receiving a valid bit of the main cache which indicates invalid after a successful speculation. For example, after a successful speculation and where a first cache is initially a main cache and a second cache is initially a speculative cache, an invalid indication of bit "0" can replace a least significant bit in a 3-bit PLSM register for the first cache, which can change "011" to "010" (or "3" to "2"). And, for a 3-bit PLSM register for the second cache, a valid indication of bit "1" can replace a least significant bit in the PLSM register, which can change "010" to "011" (or "2" to "3"). Thus, as shown by the example, a PLSM register, which is initially for a first cache (e.g., main cache) and initially selecting the first cache, is changed to selecting the second cache (e.g., speculative cache) after a successful speculation. And, as shown by the example, a PLSM register, which is initially for a second cache (e.g., speculative cache) and initially selecting the second cache, is changed to selecting the first cache (e.g., main cache) after a successful speculation. With such a design, a main thread of the processor can first access a cache initially designated as a main cache and then access a cache initially designated as a speculative cache after a successful speculation by the processor. And, a speculative thread of the processor can first access a cache initially designated as a speculative cache and then access a cache initially designated as a main cache after a successful speculation by the processor.

FIG. 1A shows a memory address $102a$ partitioned into a tag part $104a$, a block index part $106a$, and a block offset part $108a$. The execution type $110a$ can be combined with the parts of the memory addresses to control cache operations in accordance with some embodiments of the present disclosure. The total bits used to control the addressing in a cache system according to some embodiments disclosed herein is A bits. And, the sum of the bits for the parts $104a$, $106a$ and $108a$ and the execution type $110a$ equals the A bits. Tag part $104a$ is K bits, the block index part $106a$ is L bits, the block offset part $108a$ is M bits, and the execution type $110a$ is one or more T bits.

For example, data of all memory addresses having the same block index part $106a$ and block offset part $108a$ can be stored in the same physical location in a cache for a given execution type. When the data at the memory address $102a$ is stored in the cache, tag part $104a$ is also stored for the block containing the memory address to identify which of the addresses having the same block index part $106a$ and block offset part $108a$ is currently being cached at that location in the cache.

The data at a memory address can be cached in different locations in a unified cache structure for different types of executions. For example, the data can be cached in a main cache during non-speculative execution; and subsequent cached in a shadow cache during speculative execution. Execution type $110a$ can be combined with the tag part $104a$ to select from caches that can be dynamically configured for use in main and speculative executions without restriction. There can be many different ways to implement the use of the combination of execution type $110a$ and tag part $104a$ to make the selection. For example, logic circuit 206 depicted in FIGS. 2 and 4 can use the execution type $110a$ and/or the tag part $104a$ In a relatively simple implementation, the execution type $110a$ can be combined with the tag part $104a$ to form an extended tag in determining whether a cache location contains the data for the memory address $102a$ and for the current type of execution of instructions. For example, a cache system can use the tag part $104a$ to select a cache location without distinction of execution types; and when the tag part $104a$ is combined with the execution type $110a$ to form an extended tag, the extended tag can be used in a similar way to select a cache location in executions that have different types (e.g., speculative execution and non-speculative execution), such that the techniques of shadow cache can be implemented to enhance security. Also, since the information about the execution type associated with cached data is shared among many cache locations (e.g., in a cache set, or in a cache having multiple cache sets), it is not necessary to store the execution type for individual locations; and a selection mechanism (e.g., a switch, a filter, or a multiplexor such as a data multiplexor) can be used to implement the selection according to the execution type. Alternatively, the physical caches or physical cache sets used for different types of executions can be remapped to logical caches pre-associated with the different types of executions respectively. Thus, the use of the logical caches can be selected according to the execution type $110a$.

Figure 1B:
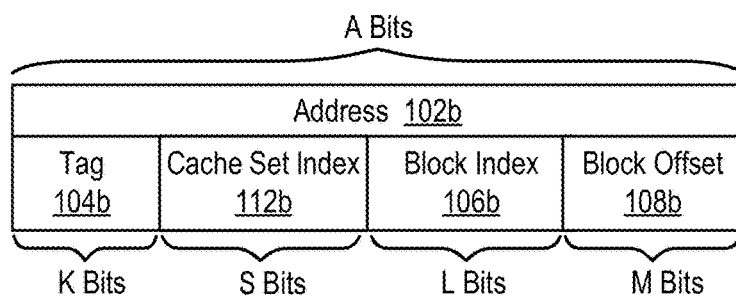

FIG. 1B shows another way to partition a memory address $102b$ partitioned into parts to control cache operations. The memory address $102b$ is partitioned into a tag part $104b$, a cache set index part $112b$, a block index part $106b$, and a block offset part $108b$. The total bits of the memory address $102b$ is A bits. And, the sum of the bits for the four parts equals the A bits of the address $102b$. Tag part $104b$ is K bits, the block index part $106b$ is L bits, the block offset part $108b$ is M bits, and the cache set index part $112b$ is S bits. Thus, for address $102b$, its A bits=K bits+L bits+M bits+S bits. The partition of a memory address $102b$ according to FIG. 1B allows the implementation of set associativity in caching data.

For example, a plurality of cache sets can be configured in a cache, where each cache set can be addressed using cache set index $112b$. A data set associated with the same cache set index can be cached in a same cache set. The tag part $104b$ of a data block cached in the cache set can be stored in the cache in association with the data block. When the address $102b$ is used to retrieve data from the cache set identified using the cache set index $112b$, the tag part of the data block stored in the cache set can be retrieved and compared with the tag part 104b to determine whether there is a match between the tag 104b of the address 102b of the access request and the tag 104b stored in the cache set identified by the cache set index 112b and stored for the cache block identified by the block index 106b. If there is a match (such as a cache hit), the cache block stored in the cache set is for the memory address 112b; otherwise, the cache block stored in the cache set is for another the memory address that has the same cache set index 112b and the same block index 106b as the memory address 102b, which results in a cache miss. In response to a cache miss, the cache system accesses the main memory to retrieve the data block according to the address 102b. To implement shadow cache techniques, the cache set index 112b can be combined with the execution type 110a to form an extended cache set index. Thus, cache sets used for different types of executions for different cache set indices can be addressed using the extended cache set index that identifies both the cache set index and the execution type.

In FIG. 1B, a cache set index part 112b is extracted from a predetermined portion of the address 102b. Data stored at memory addresses having different set indices can be cached in different cache sets of a cache to implement set associativity in caching data. A cache set of a cache can be selected using the cache set index (e.g., part 112b of the address 102b). Alternatively, cache set associativity can be implemented via tag 104c that includes a cache set indicator using a partition scheme illustrated in FIG. 1C. Optionally, the cache set indicator is computed from tag 104c and used as a cache set index to address a cache set. Alternatively, set associativity can be implemented directly via tag 104c such that a cache set storing the tag 104c is selected for a cache hit; and when no cache set stores the tag 104c, a cache miss is determined. Alternatively, an address 102d can be partition in a way as illustrated in FIG. 1D for cache operations, where tag part 104d includes a cache set index 112d, where the cache sets are not explicitly and separately addressed using cache set index. For example, to implement shadow cache techniques, the combination of execution type 110e and tag 104e (depicted in FIG. 1E) with an embedded cache set indicator can be used to select a cache set that is for the correct execution type and that stores the same tag 104e for a cache hit. When no cache set has a matching execution type and storing the same tag 104e, a cache miss is determined.

Figure 1C:
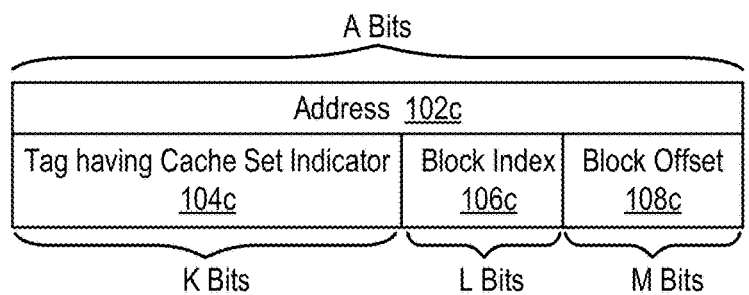
Figure 1D:
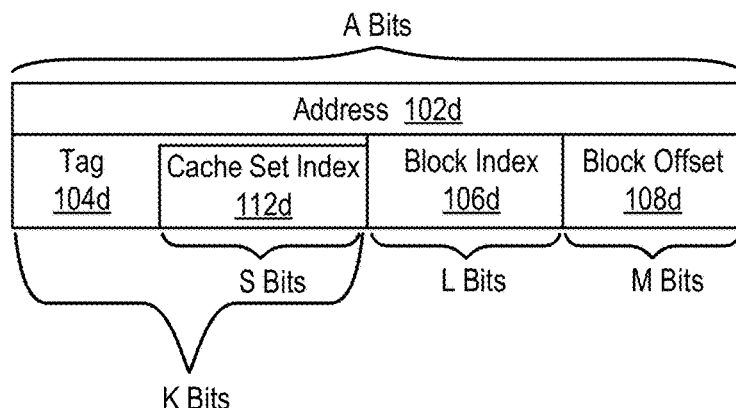

Also, as shown in FIG. 1C, FIG. 1C depicts another way to partition a memory address 102c partitioned into parts to control cache operations. The memory address 102c is partitioned into a tag part 104c having a cache set indicator, a block index part 106c, and a block offset part 108c. The total bits of the memory address 102c is A bits. And, the sum of the bits for the three parts equals the A bits of the address 102c. Tag part 104c is K bits, the block index part 106c is L bits, and the block offset part 108c is M bits. Thus, for address 102c, its A bits=K bits+L bits+M bits. As mentioned, the partition of a memory address 102c according to FIG. 1C allows the implementation of set associativity in caching data.

Also, as shown in FIG. 1D, FIG. 1D depicts another way to partition a memory address 102d partitioned into parts to control cache operations. The memory address 102d is partitioned into a tag part 104d having a cache set index 112d, a block index part 106d, and a block offset part 108d. The total bits of the memory address 102d is A bits. And, the sum of the bits for the three parts equals the A bits of the address 102d. Tag part 104d is K bits, the block index part 106d is L bits, and the block offset part 108d is M bits. Thus, for address 102d, its A bits=K bits+L bits+M bits. As mentioned, the partition of a memory address 102d according to FIG. 1D allows the implementation of set associativity in caching data.

Figure 1E:
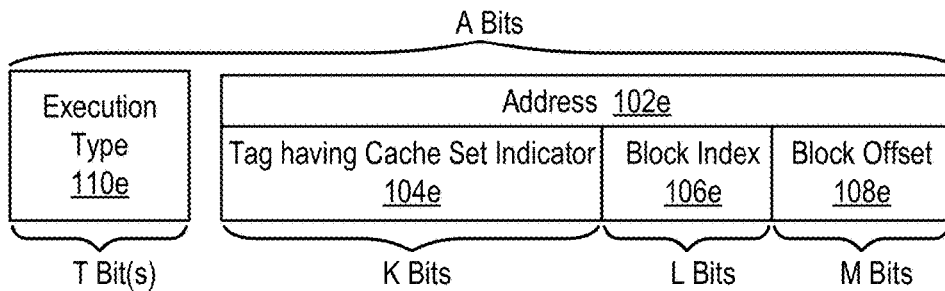

Also, as shown in FIG. 1E, FIG. 1E depicts another way to partition a memory address 102e partitioned into parts to control cache operations. FIG. 1E shows a memory address 102e partitioned into a tag part 104e having a cache set indicator, a block index part 106e, and a block offset part 108e. The execution type 110e can be combined with the parts of the memory addresses to control cache operations in accordance with some embodiments of the present disclosure. The total bits used to control the addressing in a cache system according to some embodiments disclosed herein is A bits. And, the sum of the bits for the parts 104e, 106e and 108e and the execution type 110e equals the A bits. Tag part 104e is K bits, the block index part 106e is L bits, the block offset part 108e is M bits, and the execution type 110e is T bit(s).

Figure 2:
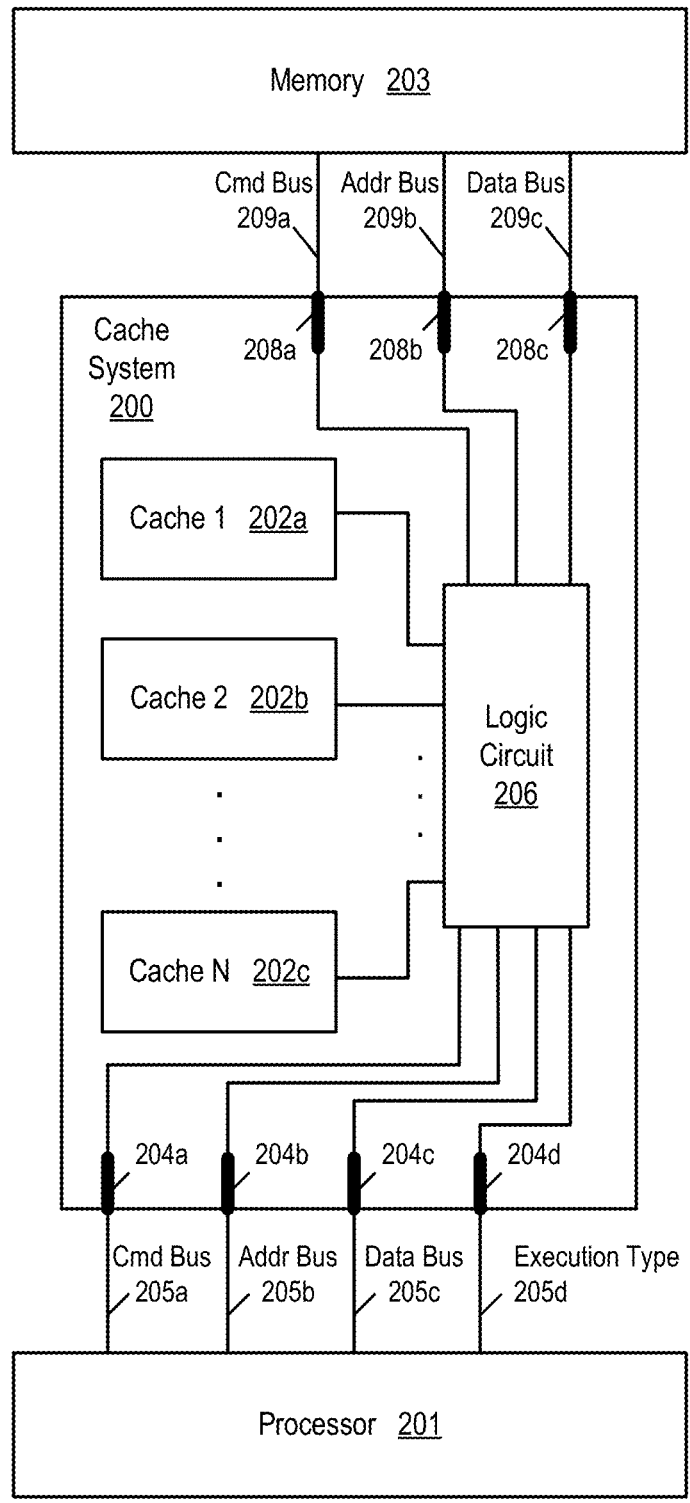
FIGS. 2, 3A, and 3B show example aspects of example computing devices, each computing device including a cache system having interchangeable caches for first type and second type executions, in accordance with some embodiments of the present disclosure.
Figure 3A:
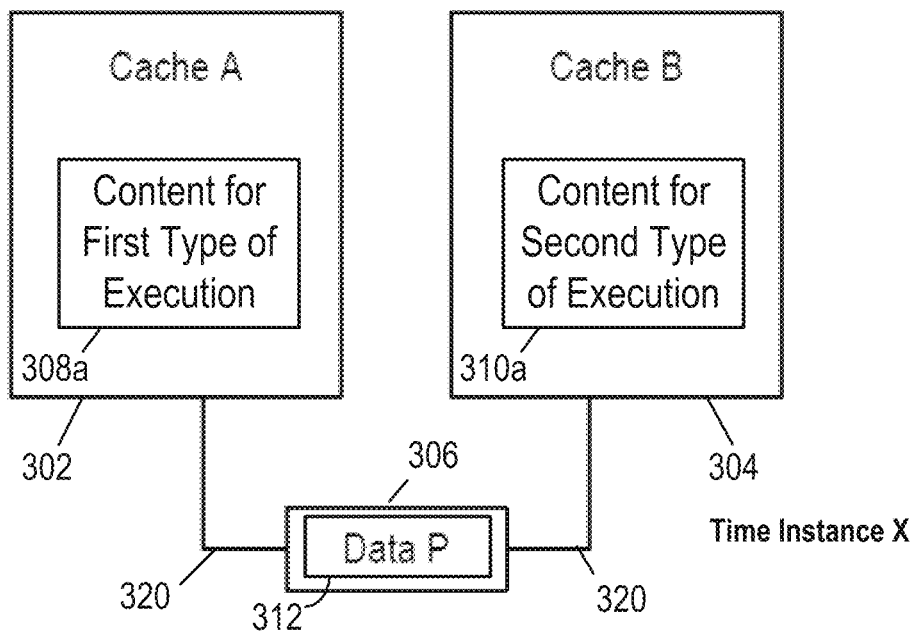
Figure 3B:
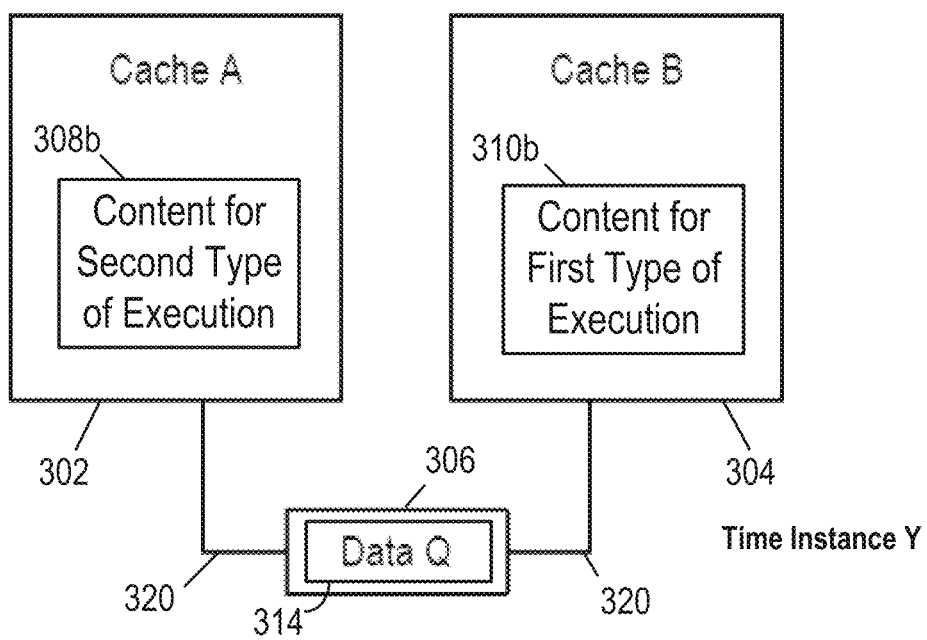

FIGS. 2, 3A, and 3B show example aspects of example computing devices, each computing device including a cache system having caches interchangeable for first type and second type executions (e.g., for implementation of shadow cache techniques in enhancing security), in accordance with some embodiments of the present disclosure.

FIG. 2 specifically shows aspects of an example computing device that includes a cache system 200 having multiple caches (e.g., see caches 202a, 202b, and 202c). The example computing device is also shown having a processor 201 and a memory system 203. The cache system 200 is configured to be coupled between the processor 201 and a memory system 203.

The cache system 200 is shown including a connection 204a to a command bus 205a coupled between the cache system and the processor 201. The cache system 200 is shown including a connection 204b to an address bus 205b coupled between the cache system and the processor 201. Addresses 102a, 102b, 102c, 102d, and 102e depicted in FIGS. 1A, 1B, 1C, 1D, and 1E, respectively, can each be communicated via the address bus 205b depending on the implementation of the cache system 200. The cache system 200 is also shown including a connection 204c to a data bus 205c coupled between the cache system and the processor 201. The cache system 200 is also shown including a connection 204d to an execution-type signal line 205d from the processor 201 identifying an execution type.

Not shown in FIG. 2, the cache system 200 can include a configurable data bit. The configurable data bit can be included in or be data 312 shown in a first state in FIG. 3A and can be included in or be data 314 shown in a second state in FIG. 3B. Memory access requests from the processor and memory use by the processor can be controlled through the command bus 205a, the address bus 205b, and the data bus 205c.

In some embodiments, the cache system 200 can include a first cache (e.g., see cache 202a) and a second cache (e.g., see cache 202b). In such embodiments, as shown in FIG. 2, the cache system 200 can include a logic circuit 206 coupled to the processor 201. Also, in such embodiments, the logic circuit 206 can be configured to control the first cache (e.g., see cache 202a) and the second cache (e.g., see cache 202b) based on the configurable data bit.

When the configurable data bit is in a first state (e.g., see data 312 depicted in FIG. 3A), the logic circuit 206 can be configured to implement commands received from the command bus 205a for accessing the memory system 203 via the first cache, when the execution type is a first type. Also, when the configurable data bit is in a first state (e.g., see data 312 depicted in FIG. 3A), the logic circuit 206 can be configured to implement commands received from the command bus 205a for accessing the memory system 203 via the second cache, when the execution type is a second type.

When the configurable data bit is in a second state (e.g., see data 314 depicted in FIG. 3B), the logic circuit 206 can be configured to implement commands received from the command bus 205a for accessing the memory system 203 via the second cache, when the execution type is the first type. Also, when the configurable data bit is in a second state (e.g., see data 314 depicted in FIG. 3B), the logic circuit 206 can be configured to implement commands received from the command bus 205a for accessing the memory system 203 via the first cache, when the execution type is the second type.

In some embodiments, when the execution type changes from the second type to the first type, the logic circuit 206 is configured to toggle the configurable data bit.

Also, as shown in FIG. 2, the cache system 200 further includes a connection 208a to a second command bus 209a coupled between the cache system and the memory system 203. The cache system 200 also includes a connection 208b to a second address bus 209b coupled between the cache system and the memory system 203. The cache system 200 also includes a connection 208c to a second data bus 209c coupled between the cache system and the memory system 203. When the configurable data bit is in a first state, the logic circuit 206 is configured to provide commands to the second command bus 209a for accessing the memory system 203 via the first cache, when the execution type is a first type (such as a non-speculative type). When the configurable data bit is in a first state, the logic circuit 206 is also configured to provide commands to the second command bus 209a for accessing the memory system via the second cache, when the execution type is a second type (such as a speculative type).

When the configurable data bit is in a second state, the logic circuit 206 is configured to provide commands to the second command bus 209a for accessing the memory system 203 via the second cache, when the execution type is the first type. Also, when the configurable data bit is in a second state, the logic circuit 206 is configured to provide commands to the second command bus 209a for accessing the memory system 203 via the first cache, when the execution type is the second type.

In some embodiments, the connection 204a to the command bus 205a is configured to receive a read command or a write command from the processor 201 for accessing the memory system 203. Also, the connection 204b to the address bus 205b can be configured to receive a memory address from the processor 201 for accessing the memory system 203 for the read command or the write command. Also, the connection 204c to the data bus 205c can be configured to communicate data to the processor 201 for the processor to read the data for the read command. And, the connection 204c to the data bus 205c can also be configured to receive data from the processor 201 to be written in the memory system 203 for the write command. Also, the connection 204d to the execution-type signal line 205d can be configured to receive an identification of the execution type from the processor 201 (such as an identification of a non-speculative or speculative type of execution performed by the processor).

In some embodiments, the logic circuit 206 can be configured to select the first cache for a memory access request from the processor 201 (e.g., one of the commands received from the command bus for accessing the memory system), when the configurable data bit is in the first state and the connection 204d to the execution-type signal line 205d receives an indication of the first type (e.g., the non-speculative type). Also, the logic circuit 206 can be configured to select the second cache for a memory access request from the processor 201, when the configurable data bit is in the first state and the connection 204d to the execution-type signal line 205d receives an indication of the second type (e.g., the speculative type). Also, the logic circuit 206 can be configured to select the second cache for a memory access request from the processor 201, when the configurable data bit is in the second state and the connection 204d to the execution-type signal line 205d receives an indication of the first type. And, the logic circuit 206 can be configured to select the first cache for a memory access request from the processor 201, when the configurable data bit is in the second state and the connection 204d to the execution-type signal line 205d receives an indication of the second type.

FIG. 3A specifically shows aspects of an example computing device that includes a cache system (e.g., cache system 200) having multiple caches (e.g., see caches 302 and 304). The example computing device is also shown having a register 306 storing data 312 that can include the configurable bit. The register 306 can be connect to or be a part of the logic circuit 206. In FIG. 3A, it is shown that during a first time instance ("Time Instance X"), the register 306 stores data 312 which can be the configurable bit in a first state. The content 308a received from the first cache (e.g., cache 302) during the first time instance includes content for a first type of execution. And, the content 310a received from the second cache (e.g., cache 304) during the first time instance includes content for a second type of execution.

FIG. 3B specifically shows aspects of an example computing device that includes a cache system (e.g., cache system 200) having multiple caches (e.g., see caches 302 and 304). The example computing device is also shown having a register 306 storing data 314 that can include the configurable bit. In FIG. 3B, it is shown that during a second time instance ("Time Instance Y"), the register 306 stores data 314 which can be the configurable bit in a second state. The content 308b received from the first cache (e.g., cache 302) during the second time instance includes content for the second type of execution. And, the content 310b received from the second cache (e.g., cache 304) during the second time instance includes content for the first type of execution.

The illustrated lines 320 connecting the register 306 to the caches 302 and 304 can be a part of the logic circuit 206.

In some embodiments, instead of using a configurable bit to control use of the caches of the cache system 200, another form of data may be used to control use of the caches of the cache system. For instance, the logic circuit 206 can be configured to control the first cache (e.g., see cache 202a) and the second cache (e.g., see cache 202b) based on different data being stored in the register 306 that is not the configurable bit. In such an example, when the register 306 stores first data or is in a first state, the logic circuit can be configured to: implement commands received from the command bus for accessing the memory system via the first cache, when the execution type is a first type; and implement commands received from the command bus for accessing the memory system via the second cache, when the execution type is a second type. And, when the register 306 stores second data or is in a second state, the logic circuit can be configured to: implement commands received from the command bus for accessing the memory system via the second cache, when the execution type is the first type; and implement commands received from the command bus for accessing the memory system via the first cache, when the execution type is the second type.

Figure 4:
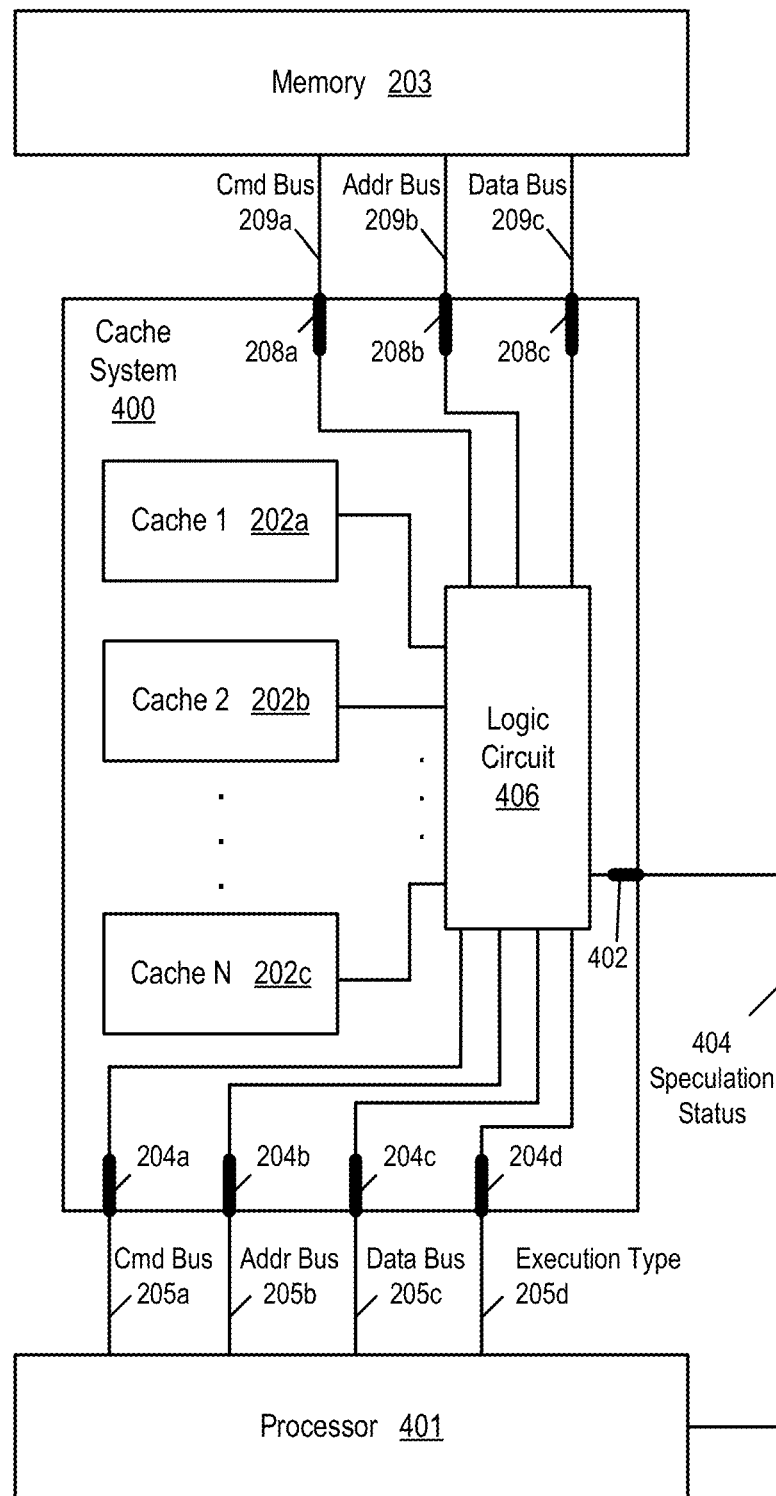
FIGS. 4, 5A, and 5B show example aspects of example computing devices, each computing device including a cache system having interchangeable caches for main type and speculative type executions specifically, in accordance with some embodiments of the present disclosure.
Figure 5A:
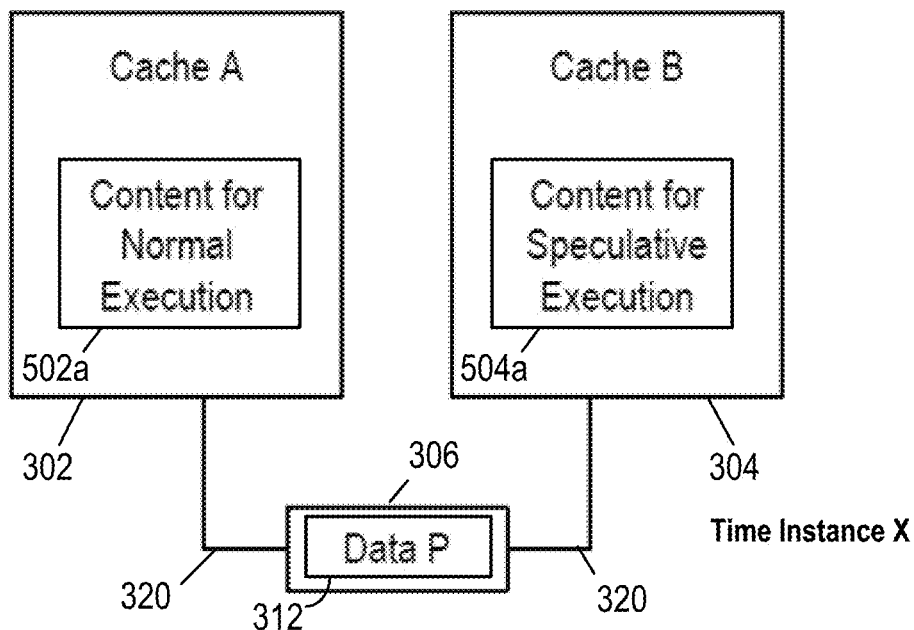
Figure 5B:
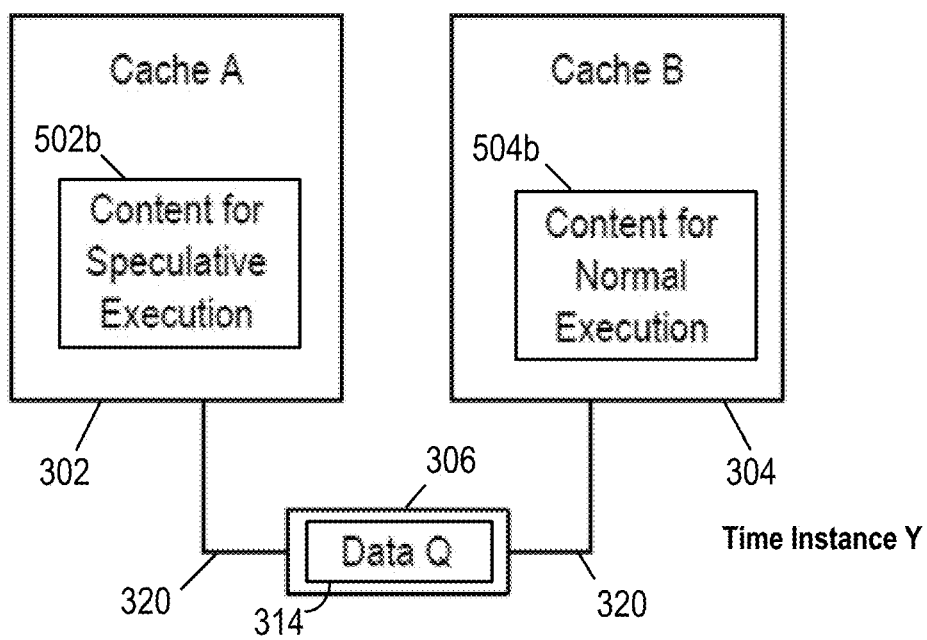

FIGS. 4, 5A, and 5B show example aspects of example computing devices, each computing device including a cache system having interchangeable caches for main or normal type execution (e.g., non-speculative execution) and speculative execution, in accordance with some embodiments of the present disclosure.

FIG. 4 specifically shows aspects of an example computing device that includes a cache system 400 having multiple caches (e.g., see caches 202a, 202b, and 202c depicted in FIG. 4). In FIG. 4, the example computing device is also shown having a processor 401 and memory system 203. As shown by FIG. 4, cache system 400 is similar to cache system 200 but for the cache system 400 also includes a connection 402 to a speculation-status signal line 404 from the processor 401 identifying a status of a speculative execution of instructions by the processor 401.

Similarly, the cache system 400 is shown including connection 204a to command bus 205a coupled between the cache system and the processor 401. The system 400 also includes connection 204b to an address bus 205b coupled between the cache system and the processor 401. Addresses 102a, 102b, 102c, 102d, and 102e depicted in FIGS. 1A, 1B, 1C, 1D, and 1E, respectively, can each be communicated via the address bus 205b depending on the implementation of the cache system 400. The system 400 also includes a connection 204c to a data bus 205c coupled between the cache system and the processor 401. It also includes a connection 204d to an execution-type signal line 205d from the processor 401 identifying a non-speculative execution type or a speculative execution type. Not shown in FIG. 4, the cache system 400 can also include the configurable data bit. The configurable data bit can be included in or be data 312 shown in a first state in FIG. 5A and can be included in or be data 314 shown in a second state in FIG. 5B.

In some embodiments, the cache system 400 can include a first cache (e.g., see cache 202a) and a second cache (e.g., see cache 202b). In such embodiments, as shown in FIG. 4, the cache system 400 can include a logic circuit 406 coupled to the processor 401. Also, in such embodiments, the logic circuit 406 can be configured to control the first cache (e.g., see cache 202a) and the second cache (e.g., see cache 202b) based on the configurable data bit. When the configurable data bit is in a first state (e.g., see data 312 depicted in FIG. 5A), the logic circuit 406 can be configured to: implement commands received from the command bus 205a for accessing the memory system 203 via the first cache, when the execution type is a non-speculative type; and implement commands received from the command bus 205a for accessing the memory system 203 via the second cache, when the execution type is a speculative type. When the configurable data bit is in a second state (e.g., see data 314 depicted in FIG. 5B), the logic circuit 406 can be configured to implement commands received from the command bus 205a for accessing the memory system 203 via the second cache, when the execution type is the non-speculative type. Also, when the configurable data bit is in a second state (e.g., see data 314 depicted in FIG. 5B), the logic circuit 406 can be configured to implement commands received from the command bus 205a for accessing the memory system 203 via the first cache, when the execution type is the speculative type.

In some embodiments, such as shown in FIG. 4, the first type can be configured to indicate non-speculative execution of instructions by the processor. In such examples, the second type can be configured to indicate speculative execution of instructions by the processor. In such embodiments, the cache system 400 can further include connection 402 to speculation-status signal line 404 from the processor 401 identifying a status of a speculative execution of instructions by the processor. The connection 402 to the speculation-status signal line 404 can be configured to receive the status of a speculative execution, and the status of a speculative execution can indicate that a result of a speculative execution is to be accepted or rejected.

Also, when the execution type changes from the second type or the speculative type to the first type or non-speculative type, the logic circuit 406 of system 400 can be configured to toggle the configurable data bit, if the status of speculative execution indicates that a result of speculative execution is to be accepted. Further, when the execution type changes from the second type or the speculative type to the first type or non-speculative type, the logic circuit 406 of system 400 can be configured to maintain the configurable data bit without changes, if the status of speculative execution indicates that a result of speculative execution is to be rejected.

FIG. 5A specifically shows aspects of an example computing device that includes a cache system (e.g., cache system 400) having multiple caches (e.g., see caches 302 and 304). The example computing device is also shown having a register 306 storing data 312 that can include the configurable bit. In FIG. 5A, it is shown that during a first time instance ("Time Instance X"), the register 306 stores data 312 which can be the configurable bit in a first state. This is similar to FIG. 3A. except the content 502a received from a first cache (e.g., cache 302) during the first time instance includes content for a non-speculative execution. And, the content 504a received from a second cache (e.g., cache 304) during the first time instance includes content for a speculative execution.

FIG. 5B specifically shows aspects of an example computing device that includes a cache system (e.g., cache system 400) having multiple caches (e.g., see caches 302 and 304). The example computing device is also shown having a register 306 storing data 314 that can include the configurable bit. In FIG. 5B, it is shown that during a second time instance ("Time Instance Y"), the register 306 stores data 314 which can be the configurable bit in a second state. This is similar to FIG. 3B. except the content 502b received from the first cache (e.g., cache 302) during the second time instance includes content for the speculative execution. And, the content 504b received from the second cache (e.g., cache 304) during the second time instance includes content for the non-speculative execution.

Also, similarly, in FIGS. 5A and 5B, the illustrated lines 320 connecting the register 306 to the caches 302 and 304 can be a part of the logic circuit 406 of the cache system 400.

In some embodiments, instead of using a configurable bit to control use of the caches of the cache system 400, another form of data may be used to control use of the caches of the cache system 400. For instance, the logic circuit 406 in the system 400 can be configured to control the first cache (e.g., see cache 202a) and the second cache (e.g., see cache 202b) based on different data being stored in the register 306 that is not the configurable bit. In such an example, when the register 306 stores first data or is in a first state, the logic circuit can be configured to: implement commands received from the command bus for accessing the memory system via the first cache, when the execution type is a non-speculative type; and implement commands received from the command bus for accessing the memory system via the second cache, when the execution type is a speculative type. And, when the register 306 stores second data or is in a second state, the logic circuit can be configured to: implement commands received from the command bus for accessing the memory system via the second cache, when the execution type is the non-speculative type; and implement commands received from the command bus for accessing the memory system via the first cache, when the execution type is the speculative type.

Some embodiments can include a cache system and the cache system can include a plurality of caches including a first cache and a second cache. The system can also include a connection to a command bus, configured to receive a read command or a write command from a processor connected to the cache system, for reading from or writing to a memory system. The system can also include a connection to an address bus, configured to receive a memory address from the processor for accessing the memory system for the read command or the write command. The system can also include a connection to a data bus, configured to: communicate data to the processor for the processor to read the data for the read command; and receive data from the processor to be written in the memory system for the write command. In such examples, the memory access requests from the processor and memory used by the processor can be defined by the command bus, the address bus, and the data bus. The system can also include an execution-type signal line, configured to receive an identification of execution type from the processor. The execution type is either a first execution type or a second execution type (e.g., a normal or non-speculative execution or a speculative execution).

The system can also include a configurable data bit configured to be set to a first state (e.g., "0") or a second state (e.g., "1") to control selection of the first cache and the second cache for use by the processor.

The system can also include a logic circuit, configured to select the first cache for use by the processor, when the configurable data bit is in a first state and the execution-type signal line receives an indication of the first type of execution. The logic circuit can also be configured to select the second cache for use by the processor, when the configurable data bit is in the first state and the execution-type signal line receives an indication of the second type of execution. The logic circuit can also be configured to select the second cache for use by the processor, when the configurable data bit is in the second state and the execution-type signal line receives an indication of the first type of execution. The logic circuit can also be configured to select the first cache for use by the processor, when the configurable data bit is in the second state and the execution-type signal line receives an indication of the second type of execution.

In some embodiments, the first type of execution is a speculative execution of instructions by the processor, and the second type of execution is a non-speculative execution of instructions by the processor (e.g., a normal or main execution). In such examples, the system can further include a connection to a speculation-status signal line that is configured to receive speculation status from the processor. The speculation status can be either an acceptance or a rejection of a condition with nested instructions that are executed initially by a speculative execution of the processor and subsequently by a normal execution of the processor when the speculation status is the acceptance of the condition.

In some embodiments, the logic circuit is configured to switch the configurable data bit from the first state to the second state, when the speculation status received by the speculation-status signal line is the acceptance of the condition. The logic circuit can also be configured to maintain the state of the configurable data bit, when the speculation status received by the speculation-status signal line is the rejection of the condition.

In some embodiments, the logic circuit is configured to select the second cache for use as identified by the first state of the configurable data bit and restrict the first cache from use as identified by the first state of the configurable data bit, when the signal received by the execution-type signal line changes from an indication of a normal execution to an indication of a speculative execution. At this change, a speculation status can be ignored/bypassed by the logic circuit because the processor is in speculative execution does not know whether the instructions preformed under the speculative execution should be executed or not by the main execution.

The logic circuit can also be configured to maintain the first state of the configurable data bit and select the first cache for a memory access request when the execution-type signal line receives an indication of a normal execution, when the signal received by the execution-type signal line changes from the indication of the speculative execution to the indication of the normal execution and when the speculation status received by the speculation-status signal line is the rejection of the condition.

In some embodiments, the logic circuit is configured to invalidate and discard the contents of the second cache, when the signal received by the execution-type signal line changes from the indication of the speculative execution to the indication of the normal execution and when the speculation status received by the speculation-status signal line is the rejection of the condition.

In some embodiments, the system further includes a connection to a second command bus, configured to communicate a read command or a write command to the memory system (e.g., including main memory). The read command or the write command can be received from the processor by the cache system. The system can also include a connection to a second address bus, configured to communicate a memory address to the memory system. The memory address can be received from the processor by the cache system. The system can also include a connection to a second data bus, configured to: communicate data to the memory system to be written in the memory system; and receive data from the memory system to be communicated to the processor to be read by the processor. For instance, memory access requests to the memory system from the cache system can be defined by the second command bus, the second address bus, and the second data bus.

In some embodiments, when the configurable data bit is in a first state, the logic circuit is configured to: provide commands to the second command bus for accessing the memory system via the first cache, when the execution type is a first type; and provide commands to the second command bus for accessing the memory system via the second cache, when the execution type is a second type. And, when the configurable data bit is in a second state, the logic circuit can be configured to: provide commands to the second command bus for accessing the memory system via the second cache, when the execution type is the first type; and provide commands to the second command bus for accessing the memory system via the first cache, when the execution type is the second type.

Some embodiments can include a system including a processor, a memory system, and a cache system coupled between the processor and the memory system. The cache system of the system can include a plurality of caches including a first cache and a second cache. The cache system of the system can also include a connection to a command bus coupled between the cache system and the processor, a connection to an address bus coupled between the cache system and the processor, a connection to a data bus coupled between the cache system and the processor, and a connection to an execution-type signal line from the processor identifying an execution type.

The cache system of the system can also include a configurable data bit and a logic circuit coupled to the processor to control the first cache and the second cache based on the configurable data bit. When the configurable data bit is in a first state, the logic circuit can be configured to: implement commands received from the command bus for accessing the memory system via the first cache, when the execution type is a first type; and implement commands received from the command bus for accessing the memory system via the second cache, when the execution type is a second type. And, when the configurable data bit is in a second state, the logic circuit can be configured to: implement commands received from the command bus for accessing the memory system via the second cache, when the execution type is the first type; and implement commands received from the command bus for accessing the memory system via the first cache, when the execution type is the second type.

In such a system, the first type can be configured to indicate non-speculative execution of instructions by the processor, and the second type can be configured to indicate speculative execution of instructions by the processor. Also, the cache system of the system can further include a connection to a speculation-status signal line from the processor identifying a status of a speculative execution of instructions by the processor. The connection to the speculation-status signal line can be configured to receive the status of a speculative execution, and the status of a speculative execution can indicate that a result of a speculative execution is to be accepted or rejected. When the execution type changes from the second type (speculative type) to the first type (non-speculative type), the logic circuit can be configured to toggle the configurable data bit, if the status of speculative execution indicates that a result of speculative execution is to be accepted. And, when the execution type changes from the second type (speculative type) to the first type (non-speculative type), the logic circuit can also be configured to maintain the configurable data bit without changes, if the status of speculative execution indicates that a result of speculative execution is to be rejected.

FIGS. 6, 7A, 7B, 8A, 8B, 9A, and 9B show example aspects of example computing devices, each computing device including a cache system having interchangeable cache sets for first type and second type executions (e.g., for implementation of shadow cache techniques in enhancing security and/or for main type and speculative type executions), in accordance with some embodiments of the present disclosure.

FIG. 6 specifically shows aspects of an example computing device that includes a cache system 600 having multiple caches (e.g., see caches 602a, 602b, and 602c), where at least one of the caches is implemented with cache set associativity. The example computing device is also shown having a processor 601 and a memory system 603. The cache system 600 is configured to be coupled between the processor 601 and a memory system 603.

The cache system 600 is shown including a connection 604a to a command bus 605a coupled between the cache system and the processor 601. The cache system 600 is shown including a connection 604b to an address bus 605b coupled between the cache system and the processor 601. Addresses 102a, 102b, 102c, 102d, and 102e depicted in FIGS. 1A, 1B, 1C, 1D, and 1E, respectively, can each be communicated via the address bus 605b depending on the implementation of the cache system 600. The cache system 600 is also shown including a connection 604c to a data bus 605c coupled between the cache system and the processor 601. The cache system 600 is also shown including a connection 604d to an execution-type signal line 605d from the processor 601 identifying an execution type. The connections 604a, 604b, 604c, and 604d can provide communicative couplings between the buses 605a, 605b, 605c, and 605d and a logic circuit 606 of the cache system 600.

Also, as shown in FIG. 6, the cache system 600 further includes a connection 608a to a second command bus 609a coupled between the cache system and the memory system 603. The cache system 600 also includes a connection 608b to a second address bus 609b coupled between the cache system and the memory system 603. The cache system 600 also includes a connection 608c to a second data bus 609c coupled between the cache system and the memory system 603.

The cache system 600 also includes a plurality of cache sets (e.g., see cache sets 610a, 610b, and 610c). The caches sets can include a first cache set (e.g., see cache set 610a) and a second cache set (e.g., see cache set 610b).

Also, as shown in FIG. 6, the cache system 600 further includes a plurality of registers (e.g., see registers 612a, 612b, and 612c) associated with the plurality of cache sets respectively. The registers (or cache set registers) can include a first register (e.g., see register 612a) associated with the first cache set (e.g., see cache set 610a) and a second register (e.g., see register 612a) associated with the second cache set (e.g., see cache set 610b). Each one of the plurality of registers (e.g., see registers 612a, 612b, and 612c) can be configured to store a set index.

As shown in FIG. 6 as well as FIG. 10, cache 602a and cache 602b to cache 602c (caches 1 to N) are not fixed structures. However, it is to be understood that in some embodiments the caches can be fixed structures. Each of the depicted caches can be considered a logical grouping of cache sets and such logical grouping is shown by broken lines representing each logical cache. The cache sets 610a to 610c (cache sets 1 to N) can be based on the content of the registers 610a to 610c (registers 1 to N). Cache sets 1 to N can be a collection of cache sets within the cache system shared among cache 1, and cache 2 to cache N. Cache 1 can be a subset of the collection; cache 2 can be another non-overlapping subset. The member cache sets in each of the caches can change based on the contents in the registers 1 to N.

Cache set 1 (in a conventional sense) may or may not communicate with its register 1 depending on the embodiment. Broken lines are also shown in FIGS. 7A, 7B, 8A, 8B, 9A, and 9B to indicate the logical relation between the cache sets and corresponding registers in FIGS. 7A, 7B, 8A, 8B, 9A, and 9B. The content of the register 1 determines how cache set 1 is addressed (e.g., what cache set index will cause the cache set 1 to be selected to output data). In some embodiments, there is no direct interaction between a cache set 1 and its corresponding register 1. The logic circuit 606 or 1006 interacts with both the cache set and the corresponding register depending on the embodiment.

In some embodiments, the logic circuit 606 can be coupled to the processor 601 to control the plurality of cache sets (e.g., cache sets 610a, 610b, and 610c) according to the plurality of registers (e.g., registers 612a, 612b, and 612c). In such embodiments, the cache system 600 can be configured to be coupled between the processor 601 and a memory system 603. And, when the connection 604b to the address bus 605b receives a memory address from the processor 601, the logic circuit 606 can be configured to generate a set index from at least the memory address and determine whether the generated set index matches with content stored in the first register (e.g., register 612a) or with content stored in the second register (e.g., register 612b). The logic circuit 606 can also be configured to implement a command received in the connection 604a to the command bus 605a via the first cache set (e.g., cache set 610a) in response to the generated set index matching with the content stored in the first register (e.g., register 612a) and via the second cache set (e.g., cache set 610b) in response to the generated set index matching with the content stored in the second register (e.g., register 612b).

In some embodiments, the cache system 600 can include a first cache (e.g., see cache 602a) and a second cache (e.g., see cache 602b). In such embodiments, as shown in FIG. 2, the cache system 600 can include a logic circuit 606 coupled to the processor 601. Also, in such embodiments, the logic circuit 606 can be configured to control the first cache (e.g., see cache 602a) and the second cache (e.g., see cache 602b) based on a configurable data bit and/or respective registers (e.g., see registers 612a, 612b, and 612c).

In some embodiments, in response to a determination that a data set of the memory system 603 associated with the memory address is not currently cached in the cache system 600 (such as not cached in cache 602a of the system), the logic circuit 606 is configured to allocate the first cache set (e.g., cache set 610a) for caching the data set and store the generated set index in the first register (e.g., register 612a). In such embodiments and others, the cache system can include a connection to an execution-type signal line (e.g., connection 604d to execution-type signal line 605) from the processor (e.g., processor 601) identifying an execution type. And, in such embodiments and others, the generated set index is generated further based on a type identified by the execution-type signal line. Also, the generated set index can include a predetermined segment of bits in the memory address and a bit representing the type identified by the execution-type signal line 605d.

Also, when the first and second registers (e.g., registers 612a and 612b) are in a first state, the logic circuit 606 can be configured to implement commands received from the command bus 605a for accessing the memory system 603 via the first cache set (e.g., cache set 610a), when the execution type is a first type. Also, when the first and second registers (e.g., registers 612a and 612b) are in a first state, the logic circuit 606 can be configured to implement commands received from the command bus 605a for accessing the memory system 603 via the second cache set (e.g., cache set 610b), when the execution type is a second type.

Furthermore, when the first and second registers (e.g., registers 612a and 612b) are in a second state, the logic circuit 606 can be configured to implement commands received from the command bus 605a for accessing the memory system 603 via another cache set of the plurality of cache sets besides the first cache set (e.g., cache set 610b or 610c), when the execution type is the first type. Also, when the first and second registers (e.g., registers 612a and 612b) are in a second state, the logic circuit 606 can be configured to implement commands received from the command bus 605a for accessing the memory system 603 via another other cache set of the plurality of cache sets besides the second cache set (e.g., cache set 610a or 610c or another cache set not depicted in FIG. 6), when the execution type is the second type.

In some embodiments, each one of the plurality of registers (e.g., see registers 612a, 612b, and 612c) can be configured to store a set index, and when the execution type changes from the second type to the first type (e.g., from the non-speculative type to the speculative type of execution), the logic circuit 606 can be configured to change the content stored in the first register (e.g., register 612a) and the content stored in the second register (e.g., register 612b). Examples of the change of the content stored in the first register (e.g., register 612a) and the content stored in the second register (e.g., register 612b) are illustrated in FIGS. 7A and 7B, FIGS. 8A and 8B, and FIGS. 9A and 9B.

Each of FIGS. 7A, 7B, 8A, 8B, 9A, and 9B, specifically shows aspects of an example computing device that includes a cache system having multiple cache sets (e.g., see caches 702, 704, and 706), where the cache sets are implemented via cache set associativity. The respective cache system for each of these figures is also shown having a plurality of registers associated with the cache sets respectively. The plurality of registers includes at least register 712, register 714, and register 716. The plurality of registers includes at least one additional register which is not shown in the figures. Register 712 is shown being associated with or connected to cache set 702, register 714 is shown being associated with or connected to cache set 704, and register 716 is shown being associated with or connected to cache set 706.

Not shown in FIGS. 7A, 7B, 8A, 8B, 9A, and 9B, each of the respective cache systems can also include a connection to a command bus coupled between the cache system and a processor, a connection to an address bus coupled between the cache system and the processor, and a connection to a data bus coupled between the cache system and the processor. Each of the cache systems can also include a logic circuit coupled to the processor to control the plurality of cache sets (e.g., cache sets 702, 704, and 706) according to the plurality of registers (e.g., registers 712, 714, and 716).

As illustrated by FIGS. 7A, 7B, 8A, 8B, 9A, and 9B, when a connection to an address bus of a cache system receives a memory address (e.g., see memory address 102b, 102c, or 102d) from a processor, a logic circuit of the cache system can be configured to generate a set index (e.g., see set index 722, 724, 726, or 728) from the memory address (e.g., see set index generation 730, 732, 830, 832, 930, or 932).

Specifically, as shown in FIG. 7A, at least the registers 712, 714, and 716 are configured in a first state. When a connection to an address bus of the cache system receives the memory address 102b from a processor, a logic circuit of the cache system generates set index 722, 724 or 726 according to at least set index generation 730a, 730b, or 730c respectively and an instance of cache set index 112b of address 102b. The set index generation 730a, 730b, or 730c can be for storing the set index 722, 724 or 726 in register 712, 714, or 716 respectively. The set index generation 730a, 730b, or 730c can also be for usage of the recently generated set index in a comparison of the recently generated set index to content already stored in register 712, 714, or 716 respectively. The set index generations 730a, 730b, and 730c occur when the registers are configured in the first state. The configuration of the first state can be through set index generation and storage.

Specifically, as shown in FIG. 7B, at least the registers 712, 714, and 716 are configured in a second state. When the connection to the address bus of the cache system receives the memory address 102b from the processor, the logic circuit of the cache system generates set index 726, 722 or 728 according to at least set index generation 732a, 732b, or 732c respectively and an instance of cache set index 112b of address 102b. The set index generation 732a, 732b, or 732c can be for storing the set index 726, 722 or 728 in register 712, 714, or 716 respectively. The set index generation 732a, 732b, or 732c can also be for usage of the recently generated set index in a comparison of the recently generated set index to content already stored in register 712, 714, or 716 respectively. The set index generations 732a, 732b, and 732c occur when the registers are configured in the second state. The configuration of the second state can be through set index generation and storage.

Figure 8A:
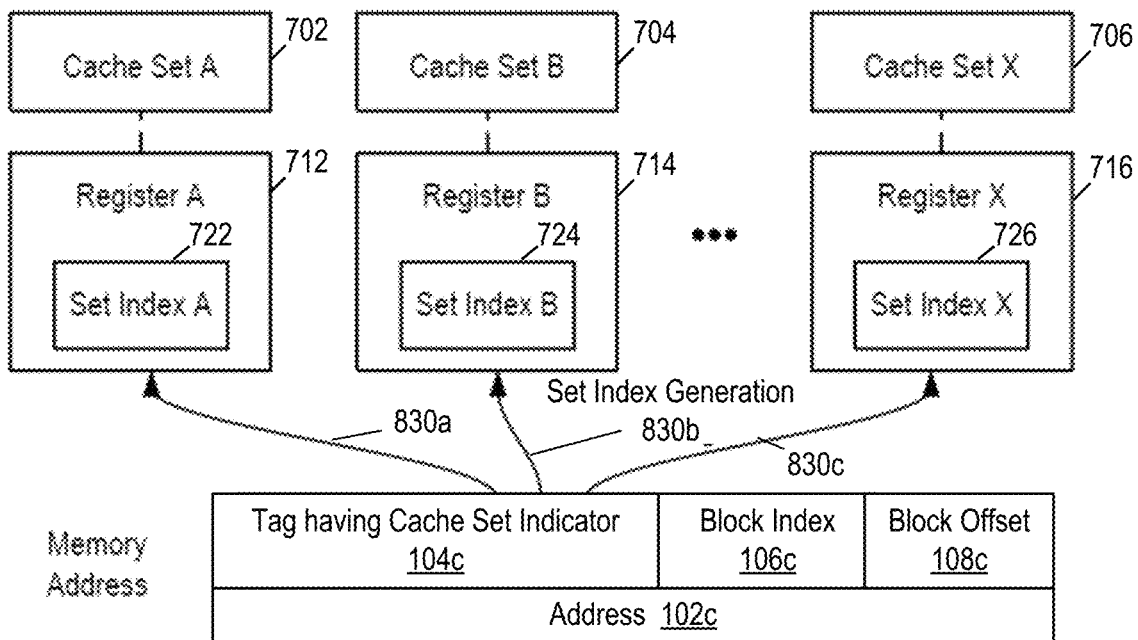

Specifically, as shown in FIG. 8A, at least the registers 712, 714, and 716 are configured in a first state. When a connection to an address bus of the cache system receives the memory address 102c from a processor, a logic circuit of the cache system generates set index 722, 724 or 726 according to at least set index generation 830a, 830b, or 830c respectively and an instance of tag 104c of address 102b having a cache set indicator. The set index generation 830a, 830b, or 830c can be for storing the set index 722, 724 or 726 in register 712, 714, or 716 respectively. The set index generation 830a, 830b, or 830c can also be for usage of the recently generated set index in a comparison of the recently generated set index to content already stored in register 712, 714, or 716 respectively. The set index generations 830a, 830b, and 830c occur when the registers are configured in the first state.

Figure 8B:
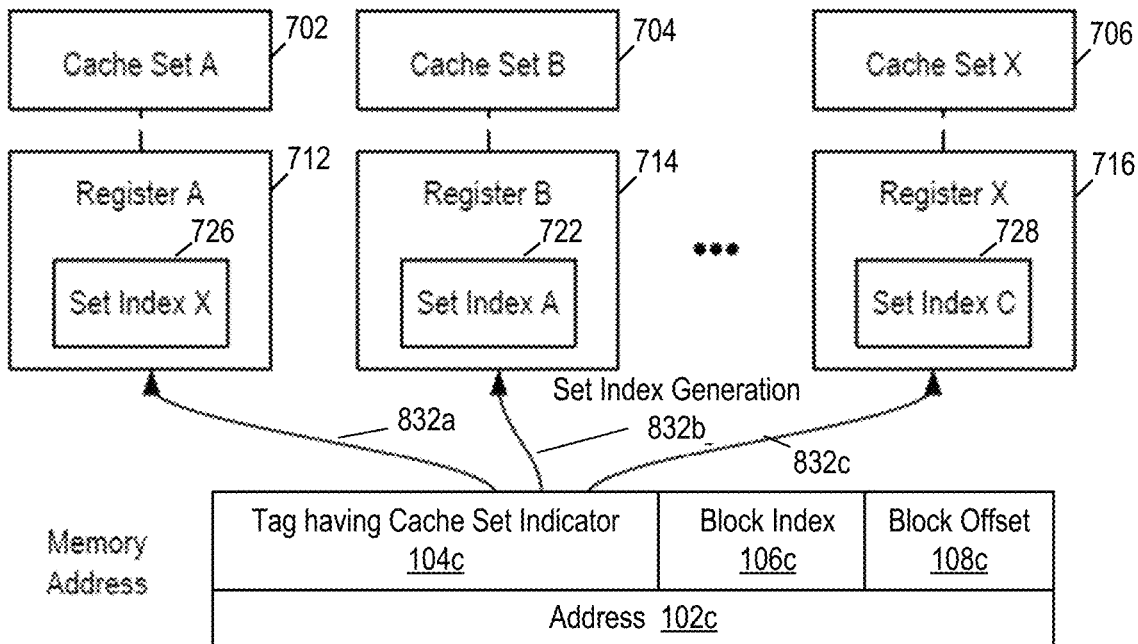

Specifically, as shown in FIG. 8B, at least the registers 712, 714, and 716 are configured in a second state. When the connection to the address bus of the cache system receives the memory address 102c from the processor, the logic circuit of the cache system generates set index 726, 722 or 728 according to at least set index generation 832a, 832b, or 832c respectively and an instance of tag 104c of address 102b having a cache set indicator. The set index generation 832a, 832b, or 832c can be for storing the set index 726, 722 or 728 in register 712, 714, or 716 respectively. The set index generation 832a, 832b, or 832c can also be for usage of the recently generated set index in a comparison of the recently generated set index to content already stored in register 712, 714, or 716 respectively. The set index generations 832a, 832b, and 832c occur when the registers are configured in the second state.

Figure 9A:
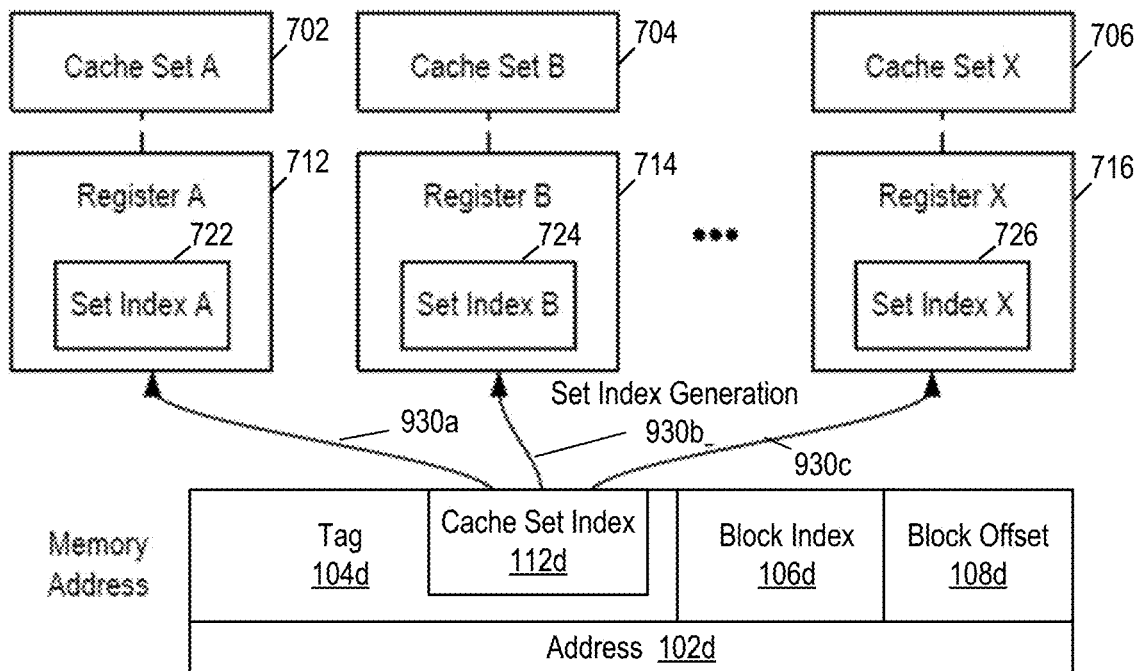
Figure 9B:
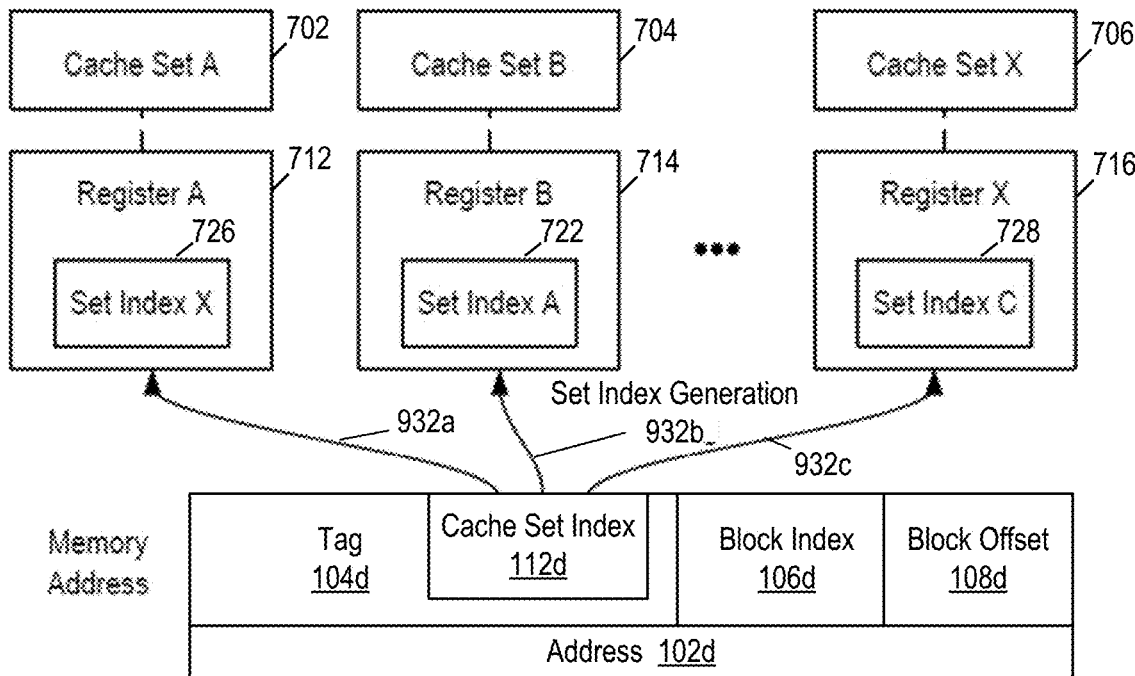

Specifically, as shown in FIG. 9A, at least the registers 712, 714, and 716 are configured in a first state. When a connection to an address bus of the cache system receives the memory address 102d from a processor, a logic circuit of the cache system generates set index 722, 724 or 726 according to at least set index generation 930a, 930b, or 930c respectively and an instance of cache set index 112d in tag 104d of address 102b. The set index generation 930a, 930b, or 930c can be for storing the set index 722, 724 or 726 in register 712, 714, or 716 respectively. The set index generation 930a, 930b, or 930c can also be for usage of the recently generated set index in a comparison of the recently generated set index to content already stored in register 712, 714, or 716 respectively. The set index generations 930a, 930b, and 930c occur when the registers are configured in the first state.

Specifically, as shown in FIG. 7B, at least the registers 712, 714, and 716 are configured in a second state. When the connection to the address bus of the cache system receives the memory address 102d from the processor, the logic circuit of the cache system generates set index 726, 722 or 728 according to at least set index generation 932a, 932b, or 932c respectively and an instance of cache set index 112d in tag 104d of address 102b. The set index generation 932a, 932b, or 932c can be for storing the set index 726, 722 or 728 in register 712, 714, or 716 respectively. The set index generation 932a, 932b, or 932c can also be for usage of the recently generated set index in a comparison of the recently generated set index to content already stored in register 712, 714, or 716 respectively. The set index generations 932a, 932b, and 932c occur when the registers are configured in the second state.

In some embodiments implemented through the cache system illustrated in FIGS. 7A and 7B, 8A and 8B, or 9A and 9B, when the connection to the address bus receives a memory address from the processor, the logic circuit can be configured to determine whether the generated set index matches with content stored in one of the registers (e.g., registers 712, 714, and 716). The content stored in the register can be from a prior generation of a set index and storage of the set index in the register.

Also, in some embodiments implemented through the cache system illustrated in FIGS. 7A and 7B, 8A and 8B, or 9A and 9B, the logic circuit can be configured to implement a command received in the connection to the command bus via a first cache set in response to the generated set index matching with the content stored in an associated first register and via a second cache set in response to the generated set index matching with the content stored in an associated second register. Also, in response to a determination that a data set of the memory system associated with the memory address is not currently cached in the cache system, the logic circuit can be configured to allocate the first cache set for caching the data set and store the generated set index in the first register. The generated set index can include a predetermined segment of bits in the memory address.

Also, in such embodiments, when the first and second registers are in a first state, the logic circuit can be configured to: implement commands received from the command bus for accessing the memory system via the first cache set, when an execution type of a processor is a first type; and implement commands received from the command bus for accessing the memory system via the second cache set, when the execution type is a second type. Also, when the first and second registers are in a second state, the logic circuit can be configured to: implement commands received from the command bus for accessing the memory system via another cache set of the plurality of cache sets besides the first cache set, when the execution type is the first type; and implement commands received from the command bus for accessing the memory system via another other cache set of the plurality of cache sets besides the second cache set, when the execution type is the second type. In such an example, each one of the plurality of registers can be configured to store a set index, and when the execution type changes from the second type to the first type, the logic circuit can be configured to change the content stored in the first register and the content stored in the second register.

FIG. 10 specifically shows aspects of an example computing device that includes a cache system 1000 having multiple caches (e.g., see caches 602a, 602b, and 602c depicted in FIG. 10), where at least one of the caches is implemented with cache set associativity (e.g., see cache sets 610a, 610b, and 601c). In FIG. 10, the example computing device is also shown having a processor 1001 and memory system 603. As shown by FIG. 10, cache system 1000 is similar to cache system 600 but for the cache system 1000 also includes a connection 1002 to a speculation-status signal line 1004 from the processor 1001 identifying a status of a speculative execution of instructions by the processor 1001.

Similarly, the cache system 1000 is shown including connection 604a to command bus 605a coupled between the cache system and the processor 1001. The system 1000 also includes connection 604b to an address bus 605b coupled between the cache system and the processor 1001. Addresses 102a, 102b, 102c, 102d, and 102e depicted in FIGS. 1A, 1B, 1C, 1D, and 1E, respectively, can each be communicated via the address bus 605b depending on the implementation of the cache system 1000. The system 1000 also includes a connection 604c to a data bus 605c coupled between the cache system and the processor 1001. It also includes a connection 604d to an execution-type signal line 605d from the processor 1001 identifying a non-speculative execution type or a speculative execution type.

Similarly, the cache system 1000 is also shown including logic circuit 1006 which can be similar to logic circuit 606 but for its circuitry coupled to the connection 1002 to the speculation-status signal line 1004.

In some embodiments, the logic circuit 1006 can be coupled to the processor 1001 to control the plurality of cache sets (e.g., cache sets 610a, 610b, and 610c) according to the plurality of registers (e.g., registers 612a, 612b, and 612c). Each one of the plurality of registers (e.g., see registers 612a, 612b, and 612c) can be configured to store a set index.

In such embodiments, the cache system 1000 can be configured to be coupled between the processor 1001 and a memory system 603. And, when the connection 604b to the address bus 605b receives a memory address from the processor 1001, the logic circuit 1006 can be configured to generate a set index from at least the memory address and determine whether the generated set index matches with content stored in the first register (e.g., register 612a) or with content stored in the second register (e.g., register 612b). The logic circuit 1006 can also be configured to implement a command received in the connection 604a to the command bus 605a via the first cache set (e.g., cache set 610a) in response to the generated set index matching with the content stored in the first register (e.g., register 612a) and via the second cache set (e.g., cache set 610b) in response to the generated set index matching with the content stored in the second register (e.g., register 612b).

Also, the cache system 1000 is shown including connections 608a, 608b, and 608c, which are similar to the corresponding connections shown in FIG. 6. With respect to the connections 608a, 608b, and 608c depicted in FIGS. 6 and 10, when the first and second registers (e.g., registers 612a and 612b) are in a first state, the logic circuit 606 or 1006 can be configured to provide commands to the second command bus 609a for accessing the memory system 603 via the first cache set (e.g., cache set 610a), when the execution type is a first type (such as a non-speculative type). Also, when the first and second registers (e.g., registers 612a and 612b) are in the first state, the logic circuit 606 or 1006 can be configured to provide commands to the second command bus 609a for accessing the memory system via the second cache set (e.g., cache set 610b), when the execution type is a second type (such as a speculative type).

Further, when the first and second registers (e.g., registers 612a and 612b) are in a second state, the logic circuit 606 or 1006 can be configured to provide commands to the second command bus 609a for accessing the memory system 603 via a cache set other than the first cache set (e.g., cache set 610b or 610c or another cache set not depicted in FIG. 6 or 10), when the execution type is the first type. Also, when the first and second registers (e.g., registers 612a and 612b) are in a second state, the logic circuit 606 or 1006 can be configured to provide commands to the second command bus 609a for accessing the memory system 603 via a cache set other than the second cache set (e.g., cache set 610a or 610c or another cache set not depicted in FIG. 6 or 10), when the execution type is the second type.

In some embodiments, such as shown in FIG. 10, the first type can be configured to indicate non-speculative execution of instructions by the processor 1001; and the second type can be configured to indicate speculative execution of instructions by the processor. Shown in FIG. 10, the cache system 1000 further includes connection 1002 to speculation-status signal line 1004 from the processor 1001 identifying a status of a speculative execution of instructions by the processor. The connection 1002 to the speculation-status signal line 1004 can be configured to receive the status of a speculative execution, and the status of a speculative execution can indicate that a result of a speculative execution is to be accepted or rejected.

In such embodiments, each one of the plurality of registers (e.g., registers 612a, 612b, and 612c) can be configured to store a set index, and when the execution type changes from the speculative execution type to the non-speculative type, the logic circuit 1006 can be configured to change the content stored in the first register (e.g., register 612a) and the content stored in the second register (e.g., register 612b), if the status of speculative type of execution indicates that a result of the speculative execution is to be accepted. And, when the execution type changes from the speculative type to the non-speculative type, the logic circuit 1006 can be configured to maintain the content stored in the first register and the content stored in the second register without changes, if the status of speculative type of execution indicates that a result of the speculative type of execution is to be rejected.

Some embodiments can include a cache system that includes a plurality of cache sets having at least a first cache set and a second cache set. The cache system can also include a plurality of registers associated with the plurality of cache sets respectively. The plurality of registers can include at least a first register associated with the first cache set, configured to store a set index, and a second register associated with the second cache set, configured to store a set index. The cache system can also include a connection to a command bus coupled between the cache system and a processor, a connection to an address bus coupled between the cache system and the processor, a connection to a data bus coupled between the cache system and the processor, and a connection to an execution-type signal line from the processor identifying an execution type.

The cache system can also include a logic circuit coupled to the processor to control the plurality of cache sets according to the plurality of registers. And, the cache system can be configured to be coupled between the processor and a memory system. When the first and second registers are in a first state, the logic circuit can be configured to: implement commands received from the command bus for accessing the memory system via the first cache set, when the execution type is a first type; and implement commands received from the command bus for accessing the memory system via the second cache set, when the execution type is a second type. Also, when the first and second registers are in a second state, the logic circuit can be configured to: implement commands received from the command bus for accessing the memory system via another cache set of the plurality of cache sets besides the first cache set, when the execution type is the first type; and implement commands received from the command bus for accessing the memory system via another other cache set of the plurality of cache sets besides the second cache set, when the execution type is the second type.

The connection to the address bus can be configured to receive a memory address from the processor, and the memory address can include a set index.

In some embodiments, when the first and second registers are in a first state, a first set index associated with the first cache set is stored in the first register, and a second set index associated with the second cache set is stored in the second register. When the first and second registers are in a second state, the first set index can be stored in another register of the plurality of registers besides the first register, and the second set index can be stored in another register of the plurality of registers besides the second register. In such examples, when the connection to the address bus receives a memory address from the processor, the logic circuit can be configured to: generate a set index from at least the memory address; and determine whether the generated set index matches with content stored in the first register or with content stored in the second register. And, the logic circuit can be further configured to implement a command received in the connection to the command bus via the first cache set in response to the generated set index matching with the content stored in the first register and via the second cache set in response to the generated set index matching with the content stored in the second register.

In response to a determination that a data set of the memory system associated with the memory address is not currently cached in the cache system, the logic circuit can be configured to allocate the first cache set for caching the data set and store the generated set index in the first register.

In some embodiments, the generated set index is generated further based on an execution type identified by the execution-type signal line. In such examples, the generated set index can include a predetermined segment of bits in the memory address and a bit representing the execution type identified by the execution-type signal line.

Some embodiments can include a system, including a processor, a memory system, and a cache system. The cache system can include a plurality of cache sets, including a first cache set and a second cache set, and a plurality of registers associated with the plurality of cache sets respectively, including a first register associated with the first cache set and a second register associated with the second cache set. The cache system can also include a connection to a command bus coupled between the cache system and the processor, a connection to an address bus coupled between the cache system and the processor, and a connection to a data bus coupled between the cache system and the processor.

The cache system can also include a logic circuit coupled to the processor to control the plurality of cache sets according to the plurality of registers. When the connection to the address bus receives a memory address from the processor, the logic circuit can be configured to: generate a set index from at least the memory address; and determine whether the generated set index matches with content stored in the first register or with content stored in the second register. And, the logic circuit can be configured to implement a command received in the connection to the command bus via the first cache set in response to the generated set index matching with the content stored in the first register and via the second cache set in response to the generated set index matching with the content stored in the second register.

The cache system can further include a connection to an execution-type signal line from the processor identifying an execution type. The generated set index can be generated further based on a type identified by the execution-type signal line. The generated set index can include a predetermined segment of bits in the memory address and a bit representing the type identified by the execution-type signal line.

FIGS. 11A and 11B illustrate background synching circuitry for synchronizing content between a main cache and a shadow cache to save the content cached in the main cache in preparation of acceptance of the content in the shadow cache, in accordance with some embodiments of the present disclosure. The cache system in FIGS. 11A and 11B includes background syncing circuitry 1102. For example, cache 1124 and cache 1126 can be caches 202a and 202b in FIG. 2 or 4, or caches 602a and 602b in FIG. 6 or 10. The background syncing circuitry 1102 can be a part of the logic circuit 206, 406, 606 or 1006.

FIG. 11A illustrates a scenario where cache 1124 is used as the main cache in non-speculative execution and cache 1126 is used as a shadow cache in speculative execution. The background syncing circuitry 1102 is configured to synchronize 1130 the cached content from cache 1124 to cache 1126 such that if the conditional speculative execution is confirmed to be required, cache 1126 can be used as the main cache in subsequent non-speculative execution; and, cache 1124 can be used as the shadow cache in a further instance of speculative execution. The syncing 1130 of the cached content from cache 1124 to cache 1126 copies the previous execution results into cache 1126 such that the execution results are not lost in repurposing the cache 1124 as the shadow cache subsequently. The cached content from cache 1124 can be cached in cache 1124 but not yet flushed to memory (e.g., memory 203 or 603). Further, some of the memory content that has a same copy cached in cache 1124 can also be copied from cache 1124 to cache 1126, such that when cache 1126 is subsequently used as a main cache, the content previously cached in cache 1124 is also available in cache 1126. This can speed up the access to the previously cached content. Copying the content between the cache 1124 and cache 1126 is faster than retrieving the data from the memory to the cache system.

In some embodiments, if a program references a variable during normal execution, the variable can be cached. In such examples, if during speculation the variable is referenced in a write-through cache, the value in main memory is valid and correct. If during speculation the variable is referenced in a write-back cache, then the aforesaid examples features described for FIG. 11A can be used; and the valid value of the variable can be in the cache 1124.

In the scenario illustrated in FIG. 11A, a processor (e.g., processor 201, 401, 601, or 1001) can execution a first set of instructions in the mode of non-speculative execution. During the execution of the first set of instructions, the processor can access memory addresses to load data (e.g., instructions and operands) from the memory, and store computation results. Since cache 1124 is used as the main cache, the content of the data and/or computation results can be cached in cache 1124. For example, cache 1124 can store the computation results that have not yet been written back into the memory; and cache 1124 can store the loaded data (e.g., instructions and operands) that may be used in subsequent executions of instructions.

In preparation of the cache B 1226 for use as a shadow cache in the speculative execution of a second set of instructions, the background syncing circuitry 1102 copies the cached content from cache 1124 to cache 1126 in syncing 1130. At least part of the copying operations can be performed in the background in a way independent from the processor accessing the memory via the cache system. For example, when the processor is accessing a first memory address in the non-speculative execution of the first set of instructions, the background syncing circuitry 1102 can copy the content cached in the cache 1124 for a second memory address into the cache 1126. In some instances, the copying operations can be performed in the background in parallel with the accessing the memory via the cache system. For example, when the processor is accessing a first memory address in the non-speculative execution of the first set of instructions to store a computation result, the background syncing circuitry can copy the computation result into the cache 1126 as cache content for the first memory address.

In one implementation, the background syncing circuitry 1102 is configured to complete the syncing operation before the cache 1126 is allowed to be used in the speculative execution of the second set of instructions. Thus, when the cache 1126 is enabled to be used for the speculative execution of the second set of instructions, the valid content in the cache 1124 can also be found in cache 1126. However, the syncing operation can delay the use of the cache 1126 as the shadow cache. Alternatively, the background syncing circuitry 1102 is configured to prioritize the syncing of dirty content from the cache 1124 to the cache 1126. Dirty content can be where the data in the cache has been modified and the data in main memory has not be modified.

Dirty content cached in the cache 1124 can be more up to date than the content stored in corresponding one or more addresses in the memory. For example, when the processor stores a computation result at an address, the cache 1124 can cache the computation result for the address without immediately writing the computation result into the memory at the address. When the computation result is written back to the memory at the address, the cached content is no longer considered dirty. The cache 1124 stores data to track the dirty content cached in cache 1124. The background syncing circuit 1102 can automatically copy the dirty content from cache 1124 to cache 1126 in preparation of cache 1126 to serve as a shadow cache.

Optionally, before the completion of the syncing operations, the background syncing circuitry 1102 can allow the cache 1126 to function as a shadow cache in conditional speculative execution of the second set of instructions. During the time period in which the cache 1126 is used in the speculative execution as a shadow cache, the background syncing circuit 1102 can continue the syncing operation 1130 of copying cached content from cache 1124 to cache 1126. The background syncing circuitry 1102 is configured to complete at least the syncing of the dirty content from the cache 1124 to cache 1126 before allowing the cache 1126 to be accepted as the main cache. For example, upon the indication that the execution of the second set of instructions is required, the background syncing circuitry 1102 determines whether the dirty content in the cache 1124 has been synced to the cache 1126; and if not, the use of the cache 1126 as main cache is postponed until the syncing is complete.

In some implementations, the background syncing circuitry 1102 can continue its syncing operation even after the cache 1126 is accepted as the main cache, but before the cache 1124 is used as a shadow cache in conditional speculative execution of a third set of instructions.

Before the completion of the syncing operation 1130, the cache system can configure the cache 1124 as a secondary cache between the cache 1126 and the memory during the speculative execution, such that when the content of a memory address is not found in cache 1126, the cache system checks cache 1124 to determine whether the content is in cache 1124; and if so, the content is copied from cache 1124 to cache 1126 (instead of being loaded from the memory directly). When the processor stores data at a memory address and the data is cached in cache 1126, the cache system checks invalidates the content that is cached in the cache 1124 as a secondary cache.

After the cache 1126 is reconfigured as the main cache following the acceptance of the result of the speculative execution of the second set of instructions, the background syncing circuitry 1102 can start to synchronize 1132 the cached content from the cache 1126 to the cache 1124, as illustrated in FIG. 11B.

Following the speculative execution of the second set of instructions, if the speculative status from the processor indicates that the results of the execution of the second set of instructions should be rejected, the cache 1124 remains to function as the main cache; and the content in the cache 1126 can be invalidated. The invalidation can include the cache 1126 has all its entries marked empty; thus, any subsequent speculations begin with an empty speculative cache.

The background syncing circuitry 1102 can again synchronize 1130 the cached content from the cache 1124 to the cache 1126 in preparation of the speculative execution of the third set of instructions.

In some embodiments, each of the cache 1124 and cache 1126 has a dedicated and fixed collection of cache sets; and a configurable bit is used to control use of the caches 1124 and 1126 as main cache and shadow cache respectively, as illustrated in FIGS. 3A, 3B, 5A, and 5B.

In other embodiments, cache 1124 and cache 1126 can share a pool of cache sets, some of the cache sets can be dynamically allocated to cache 1124 and cache 1126, as illustrated in FIGS. 6 to 10. When the cache 1124 is used as the main cache and the cache 1126 is used as the shadow cache, the cache 1126 can have a smaller number of cache sets than the cache 1124. Some of the cache sets in cache 1126 can be the shadows of a portion of the cache sets in the cache 1124 such that when the result of the speculative execution is determined to be accepted, the portion of the cache sets in the cache 1124 can be reconfigured for use as shadow cache in the next speculative execution; and the remaining portion of the cache sets that is not affected by the speculative execution can be re-allocated from the cache 1124 to the cache 1126, such that the cached content in the unaffected portion can be further used in the subsequent non-speculative execution.

Figure 12:
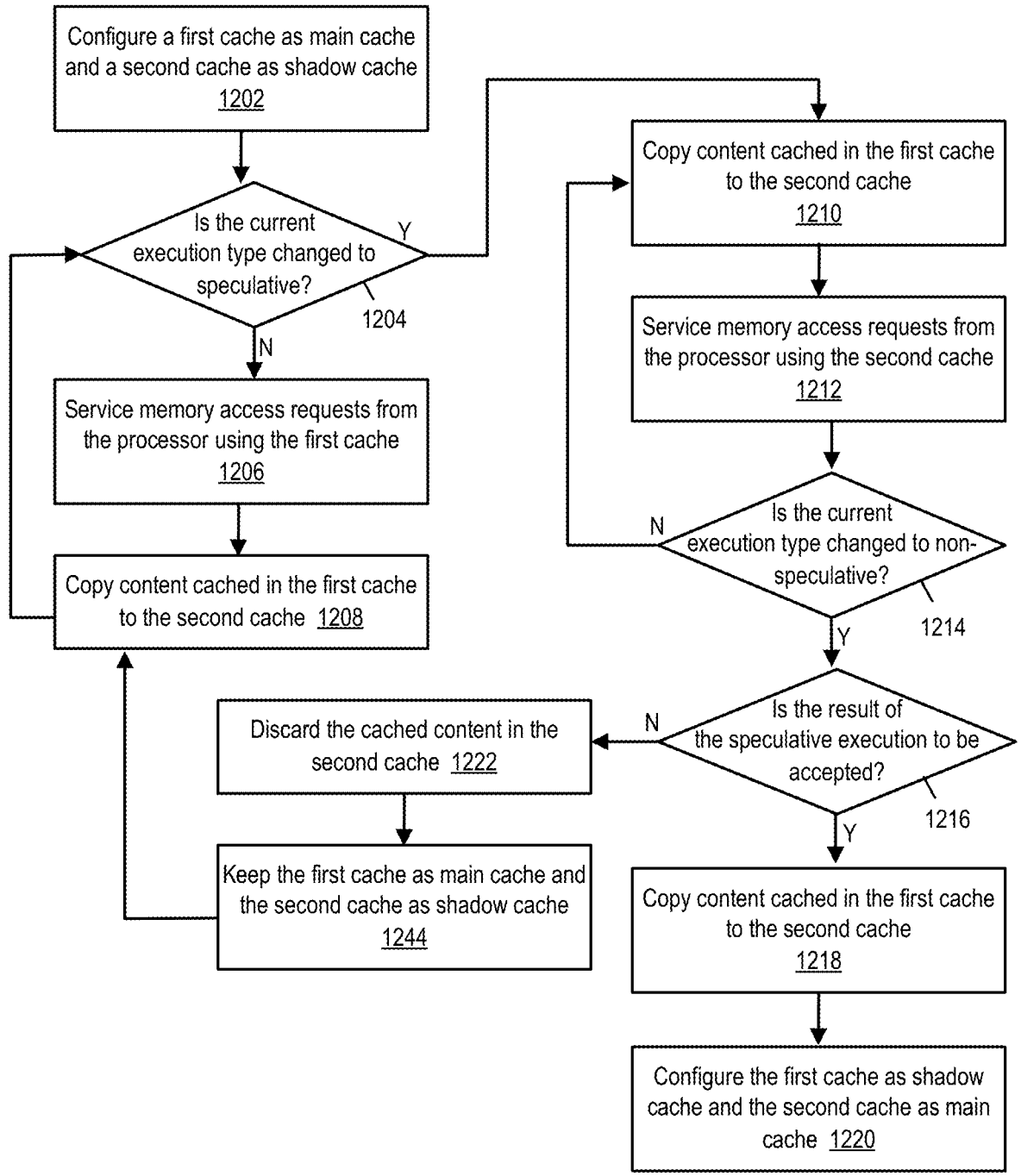
FIG. 12 show example operations of the example syncing circuitry of FIGS. 11A and 11B, in accordance with some embodiments of the present disclosure.

FIG. 12 show example operations of the background syncing circuitry 1102 of FIGS. 11A and 11B, in accordance with some embodiments of the present disclosure.

As shown in FIG. 12, at operation 1202, a cache system configures a first cache as main cache and a second cache as shadow cache. For example, when dedicated caches with fixed hardware structures are used as the first cache and the second cache, a configurable bit can be used to configure the first cache as main cache and the second cache as shadow cache, as illustrated in FIGS. 2 to 5B. Alternatively, cache sets can be allocated from a pool of cache sets, using registers, to and from the first cache and the second cache, in a way as illustrated in FIGS. 6 to 10.

At operation 1204, the cache system determines whether the current execution type is changed from non-speculative to speculative. For example, when the processor accesses the memory via the cache system 200, the processor further provides the indication of whether the current memory access is associated with conditional speculative execution. For example, the indication can be provided in a signal line 205*d* configured to specify execution type.

If the current execution type is not changed from non-speculative to speculative, the cache system services memory access requests from the processor using the first cache as the main cache at operation 1206. When the memory access changes the cached content in the first cache, the background syncing circuitry 1102 can copy the content cached in the first cache to the second cache in operation 1208. For example, the background syncing circuitry 1102 can be part of the logic circuit 206 in FIG. 2, 406 in FIG. 4, 606 in FIG. 6, and/or 1006 in FIG. 10. The background syncing circuitry 1102 can prioritize the copy of dirty content cached in the first cache.

In FIG. 12, the operations 1204 to 1208 are repeated until the cache system 200 determines that the current execution type is changed to speculative.

Optionally, the background syncing circuitry 1102 is configured to continue copying content cached in the first cache to the second cache to finish syncing at least the dirty content from the first cache to the second cache in operation 1210 before allowing the cache system to service memory requests from the processor during the speculative execution using the second cache in operation 1212.

Optionally, the background syncing circuitry 1102 can continue the syncing operation while the cache system uses the second cache to service memory requests from the processor during the speculative execution in operation 1212.

In operation 1214, the cache system determines whether the current execution type is changed to non-speculative. If the current execution type remains as speculative, the operations 1210 and 1212 can be repeated.

In response to the determination that the current execution type is changed to non-speculative at operation 1214, the cache system determines whether the result of the speculative execution is to be accepted. The result of the speculative execution corresponds to the changes in the cached content in the second cache. For example, the processor 401 can provide an indication of whether the result of the speculative execution should be accepted via speculation-status signal line 404 illustrated in FIG. 4 or speculation-status signal line 1004 in FIG. 10.

If, in operation 1216, the cache system determines that the result of the speculative execution is to be rejected, the cache system can discard the cached content currently cached in the second cache in operation 1222 (e.g., discard via setting the invalid bits of cache blocks in the second cache). Subsequently, in operation 1244, the cache system can keep the first cache as main cache and the second cache as shadow cache; and in operation 1208, the background syncing circuitry 1102 can copy the cached content from the first cache to the second cache. When the execution remains non-speculative, operations 1204 to 1208 can be repeated.

If, in operation 1216, the cache system determines that the result of the speculative execution is to be accepted, the background syncing circuitry 1102 is configured to further copy content cached in the first cache to the second cache to complete syncing at least the dirty content from the first cache to the second cache in operation 1218 before allowing the cache system to re-configure first cache as shadow cache.

In operation 1220, the cache system configures the first cache as shadow cache and the second cache as main cache, in a way somewhat similar to the operation 1202. In configuring the first cache as shadow cache, the cache system can invalidate its content and then synchronize the cached content in the second cache to the first cache, in a way somewhat similar to the operations 1222, 1224, 1208, and 1204.

For example, when dedicated caches with fixed hardware structures are used as the first cache and the second cache, a configurable bit can be changed to configure the first cache as shadow cache and the second cache as main cache in operation 1220. Alternatively, when cache sets can be allocated from a pool of cache sets using registers to from the first cache and the second cache, in a way as illustrated in FIGS. 6 to 10, the cache sets that are initially in the first cache but are not impacted by the speculative execution can be reconfigured via their associated registers (e.g., registers 612*a* and 612*b* illustrated in FIGS. 6 and 10) to join the second cache. The cache sets that are initially in the first cache (but now has out of data content in view of the content in the second cache) can be reconfigured as in the new first cache. Optionally, further cache sets can be allocated from the available pool of cache sets and added to the new first cache. Optionally, some of the cache sets that have invalidated cache content can be put back into the available pool of cache sets for future allocation (e.g., for adding to the second cache as the main cache or the first cache as the shadow cache).

In this specification, the disclosure has been described with reference to specific exemplary embodiments thereof. However, it will be evident that various modifications can be made thereto without departing from the broader spirit and scope as set forth in the following claims. The specification and drawings are, accordingly, to be regarded in an illustrative sense rather than a restrictive sense.

For example, embodiments can include a cache system, including: a first cache; a second cache; a connection to a command bus coupled between the cache system and a processor; a connection to an address bus coupled between the cache system and the processor; a connection to a data bus coupled between the cache system and the processor; a connection to an execution-type signal line from the processor identifying an execution type; and a logic circuit coupled to control the first cache and the second cache according to the execution type. In such embodiments, the cache system is configured to be coupled between the processor and a memory system. Also, when the execution type is a first type indicating non-speculative execution of instructions by the processor and the first cache is configured to service commands from the command bus for accessing the memory system, the logic circuit is configured to copy a portion of content cached in the first cache to the second cache.

In such embodiments, the logic circuit can be configured to copy the portion of content cached in the first cache to the second cache independent of a current command received in the command bus.

Also, when the execution type is the first type indicating non-speculative execution of instructions by the processor and the first cache is configured to service commands from the command bus for accessing the memory system, the logic circuit can be configured to service subsequent commands from the command bus using the second cache in response to the execution type being changed from the first type to a second type indicating speculative execution of instructions by the processor. The logic circuit can also be configured to complete synchronization of the portion of the content from the first cache to the second cache before servicing the subsequent commands after the execution type is changed from the first type to the second type. The logic circuit can also be configured to continue synchronization of the portion of the content from the first cache to the second cache while servicing the subsequent commands.

In such embodiments, the cache system can further include: a configurable data bit, and the logic circuit is further coupled to control the first cache and the second cache according to the configurable data bit. When the configurable data bit is in a first state, the logic circuit can be configured to: implement commands received from the command bus for accessing the memory system via the first cache, when the execution type is the first type; and implement commands received from the command bus for accessing the memory system via the second cache, when the execution type is a second type. And, when the configurable data bit is in a second state, the logic circuit can be configured to: implement commands received from the command bus for accessing the memory system via the second cache, when the execution type is the first type; and implement commands received from the command bus for accessing the memory system via the first cache, when the execution type is the second type. When the execution type changes from the second type to the first type, the logic circuit can also be configured to toggle the configurable data bit.

In such embodiments, the cache system can further include: a connection to a speculation-status signal line from the processor identifying a status of a speculative execution of instructions by the processor. The connection to the speculation-status signal line is configured to receive the status of a speculative execution. The status of a speculative execution indicates that a result of a speculative execution is to be accepted or rejected. When the execution type changes from the second type to the first type, the logic circuit can be configured to: toggle the configurable data bit, if the status of speculative execution indicates that a result of speculative execution is to be accepted; and maintain the configurable data bit without changes, if the status of speculative execution indicates that a result of speculative execution is to be rejected.

Also, in such embodiments, the first cache and the second cache together include: a plurality of cache sets, including a first cache set and a second cache set; and a plurality of registers associated with the plurality of cache sets respectively, including a first register associated with the first cache set and a second register associated with the second cache set. In such examples, the logic circuit can be further coupled to control the plurality of cache sets according to the plurality of registers. Also, when the connection to the address bus receives a memory address from the processor, the logic circuit can be configured to: generate a set index from at least the memory address; and determine whether the generated set index matches with content stored in the first register or with content stored in the second register. The logic circuit can also be configured to implement a command received in the connection to the command bus via the first cache set in response to the generated set index matching with the content stored in the first register and via the second cache set in response to the generated set index matching with the content stored in the second register. Furthermore, in response to a determination that a data set of the memory system associated with the memory address is not currently cached in the cache system, the logic circuit can be configured to allocate the first cache set for caching the data set and store the generated set index in the first register.

Additionally, in such embodiments having cache sets, the cache system can also include a connection to an execution-type signal line from the processor identifying an execution type, and the generated set index is generated further based on a type identified by the execution-type signal line. The generated set index can include a predetermined segment of bits in the memory address and a bit representing the type identified by the execution-type signal line. Also, when the first and second registers are in a first state, the logic circuit can be configured to: implement commands received from the command bus for accessing the memory system via the first cache set, when the execution type is a first type; and implement commands received from the command bus for accessing the memory system via the second cache set, when the execution type is a second type. And, when the first and second registers are in a second state, the logic circuit is configured to: implement commands received from the command bus for accessing the memory system via another cache set of the plurality of cache sets besides the first cache set, when the execution type is the first type; and implement commands received from the command bus for accessing the memory system via another other cache set of the plurality of cache sets besides the second cache set, when the execution type is the second type.

In such embodiments having cache sets, each one of the plurality of registers can be configured to store a set index. And, when the execution type changes from the second type to the first type, the logic circuit can be configured to change the content stored in the first register and the content stored in the second register. Also, the first type can be configured to indicate non-speculative execution of instructions by the processor and the second type can be configured to indicate speculative execution of instructions by the processor. In such examples, the cache system can further include a connection to a speculation-status signal line from the processor identifying a status of a speculative execution of instructions by the processor. The connection to the speculation-status signal line is configured to receive the status of a speculative execution, and the status of a speculative execution indicates that a result of a speculative execution is to be accepted or rejected. When the execution type changes from the second type to the first type, the logic circuit can be configured to: change the content stored in the first register and the content stored in the second register, if the status of speculative execution indicates that a result of speculative execution is to be accepted; and maintain the content stored in the first register and the content stored in the second register without changes, if the status of speculative execution indicates that a result of speculative execution is to be rejected.

Also, for example, embodiments can include a cache system, including: in general, a plurality of cache sets and a plurality of registers associated with the plurality of cache sets respectively. The plurality of cache sets includes a first cache set and a second cache set, and the plurality of registers includes a first register associated with the first cache set and a second register associated with the second cache set. Similarly, in such embodiments, the cache system can include a connection to a command bus coupled between the cache system and a processor, a connection to an address bus coupled between the cache system and the processor, a connection to a data bus coupled between the cache system and the processor, a connection to an execution-type signal line from the processor identifying an execution type, and a logic circuit coupled to control the plurality of cache sets according to the execution type. The cache system can also be configured to be coupled between the processor and a memory system. And, when the execution type is a first type indicating non-speculative execution of instructions by the processor and the first cache set is configured to service commands from the command bus for accessing the memory system, the logic circuit can be configured to copy a portion of content cached in the first cache set to the second cache set.

In such embodiments with cache sets, the logic circuit can be configured to copy the portion of content cached in the first cache set to the second cache set independent of a current command received in the command bus. When the execution type is the first type indicating non-speculative execution of instructions by the processor and the first cache set is configured to service commands from the command bus for accessing the memory system, the logic circuit can be configured to service subsequent commands from the command bus using the second cache set in response to the execution type being changed from the first type to a second type indicating speculative execution of instructions by the processor. The logic circuit can also be configured to complete synchronization of the portion of the content from the first cache set to the second cache set before servicing the subsequent commands after the execution type is changed from the first type to the second type. The logic circuit can also be configured to continue synchronization of the portion of the content from the first cache set to the second cache set while servicing the subsequent commands.

Also, in such embodiments with cache sets, the logic circuit can be further coupled to control the plurality of cache sets according to the plurality of registers. When the connection to the address bus receives a memory address from the processor, the logic circuit can be configured to: generate a set index from at least the memory address; and determine whether the generated set index matches with content stored in the first register or with content stored in the second register. The logic circuit can also be configured to implement a command received in the connection to the command bus via the first cache set in response to the generated set index matching with the content stored in the first register and via the second cache set in response to the generated set index matching with the content stored in the second register. Also, in response to a determination that a data set of the memory system associated with the memory address is not currently cached in the cache system, the logic circuit can be configured to allocate the first cache set for caching the data set and store the generated set index in the first register.

Additionally, in such embodiments with cache sets, the cache system can further include a connection to an execution-type signal line from the processor identifying an execution type, and the generated set index can be generated further based on a type identified by the execution-type signal line. The generated set index can include a predetermined segment of bits in the memory address and a bit representing the type identified by the execution-type signal line. When the first and second registers are in a first state, the logic circuit can be configured to: implement commands received from the command bus for accessing the memory system via the first cache set, when the execution type is a first type; and implement commands received from the command bus for accessing the memory system via the second cache set, when the execution type is a second type. And, when the first and second registers are in a second state, the logic circuit can be configured to: implement commands received from the command bus for accessing the memory system via another cache set of the plurality of cache sets besides the first cache set, when the execution type is the first type; and implement commands received from the command bus for accessing the memory system via another other cache set of the plurality of cache sets besides the second cache set, when the execution type is the second type.

In such embodiments with cache sets, each one of the plurality of registers is configured to store a set index, and when the execution type changes from the second type to the first type, the logic circuit can be configured to change the content stored in the first register and the content stored in the second register. Also, the first type can be configured to indicate non-speculative execution of instructions by the processor and the second type is configured to indicate speculative execution of instructions by the processor.

In such embodiments with cache sets, the cache system can also include a connection to a speculation-status signal line from the processor identifying a status of a speculative execution of instructions by the processor. The connection to the speculation-status signal line is configured to receive the status of a speculative execution, and the status of a speculative execution indicates that a result of a speculative execution is to be accepted or rejected. When the execution type changes from the second type to the first type, the logic circuit can be configured to: change the content stored in the first register and the content stored in the second register, if the status of speculative execution indicates that a result of speculative execution is to be accepted; and maintain the content stored in the first register and the content stored in the second register without changes, if the status of speculative execution indicates that a result of speculative execution is to be rejected.

Also, in such embodiments with cache sets, the cache sets can be divided amongst a plurality of caches within the cache system. For instance, the cache sets can be divided up amongst first and second caches of the plurality of caches.

FIGS. 13, 14A, 14B, 14C, 15A, 15B, 15C, and 15D show example aspects of an example computing device having a cache system (e.g., see cache system 1000 shown in FIG. 13) having interchangeable cache sets (e.g., see cache sets 1310a, 1310b, 1310c, and 1310d) including a spare cache set (e.g., see spare cache set 1310d shown in FIGS. 14A and 15A) to accelerate speculative execution, in accordance with some embodiments of the present disclosure.

Figure 14A:
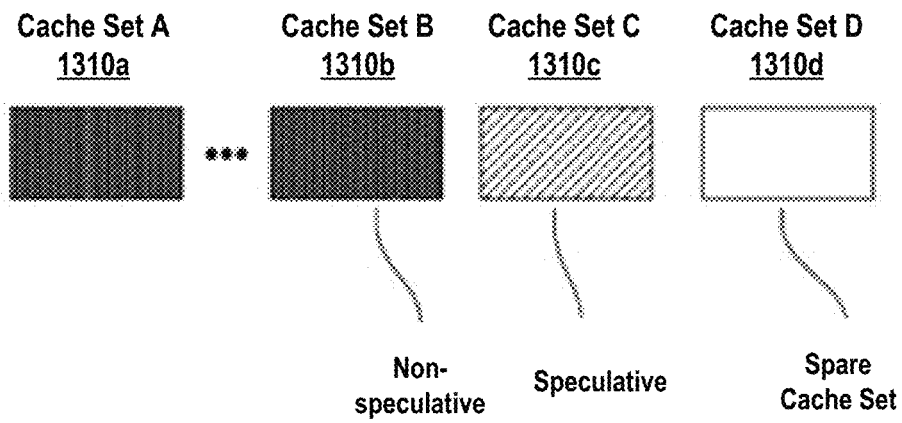
Figure 15A:
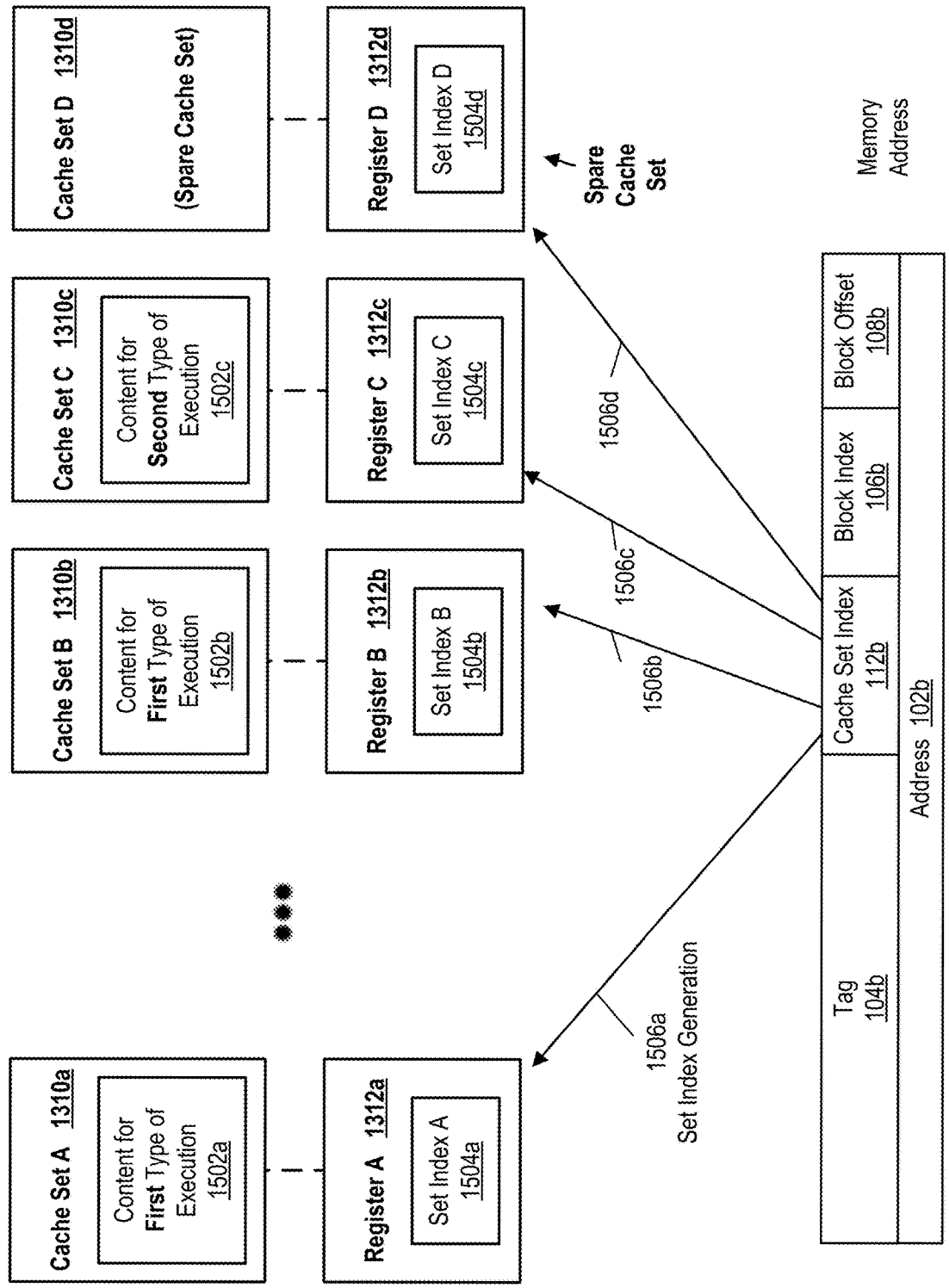
Figure 15B:
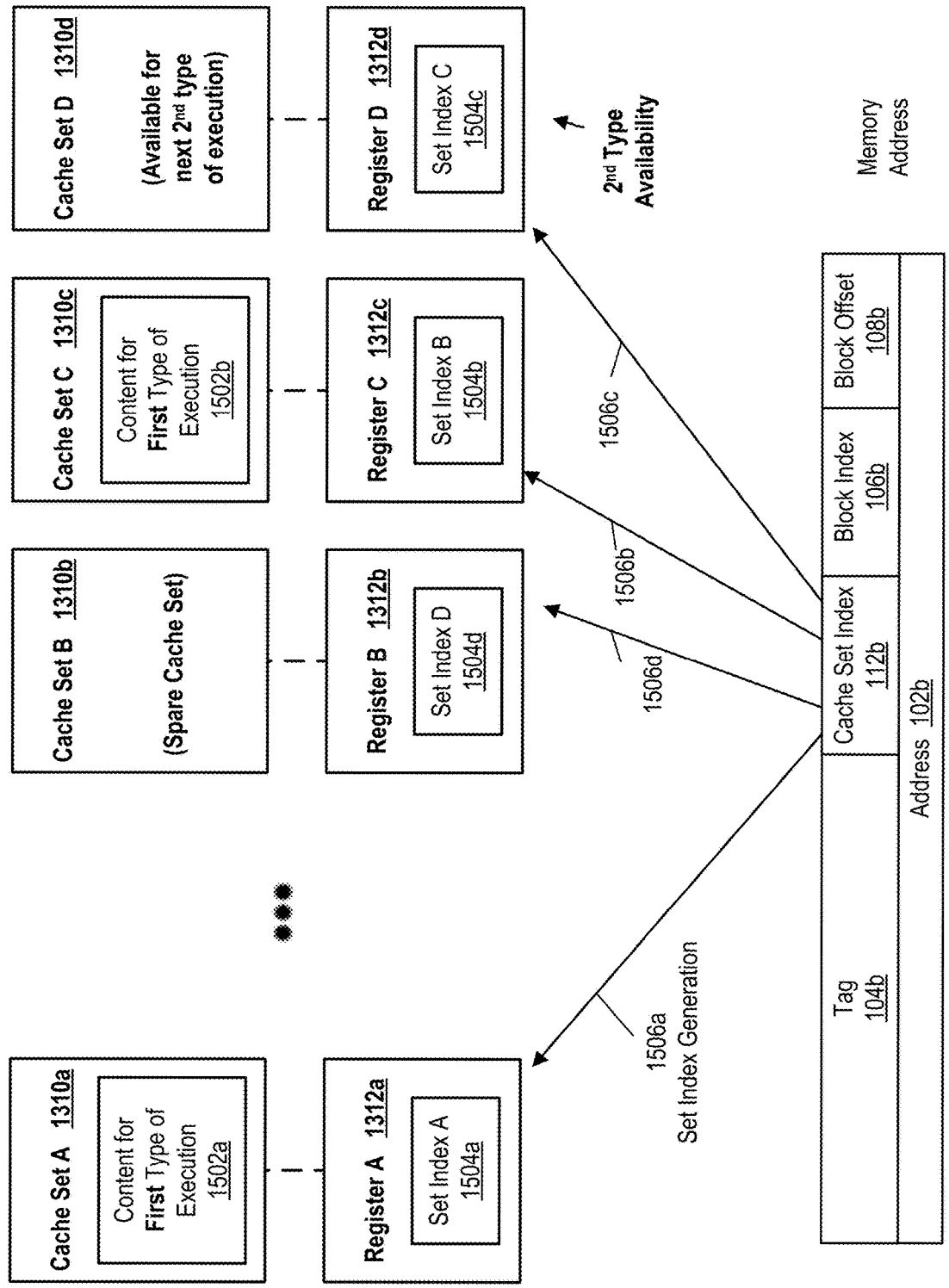
Figure 15C:
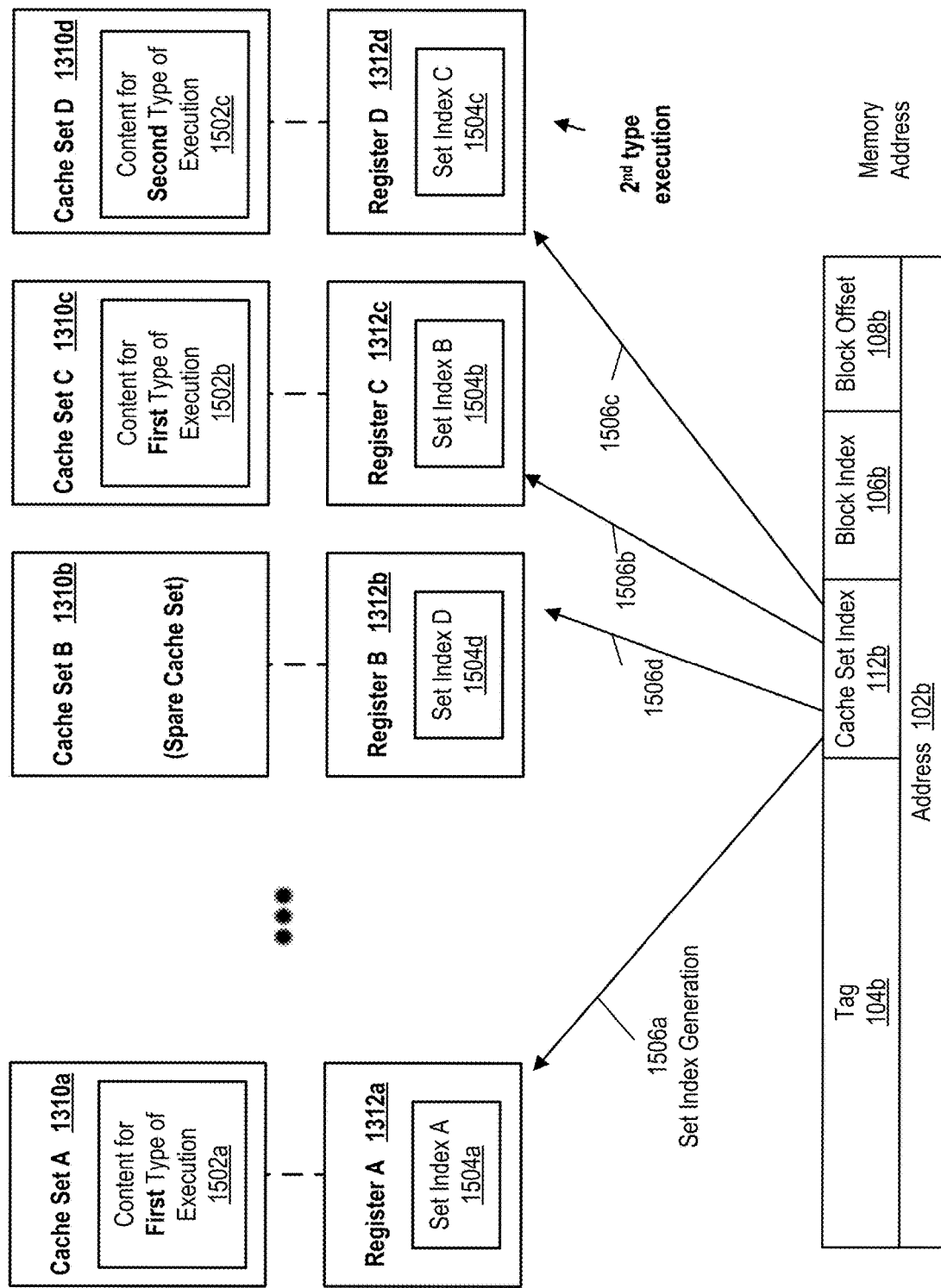
Figure 15D:
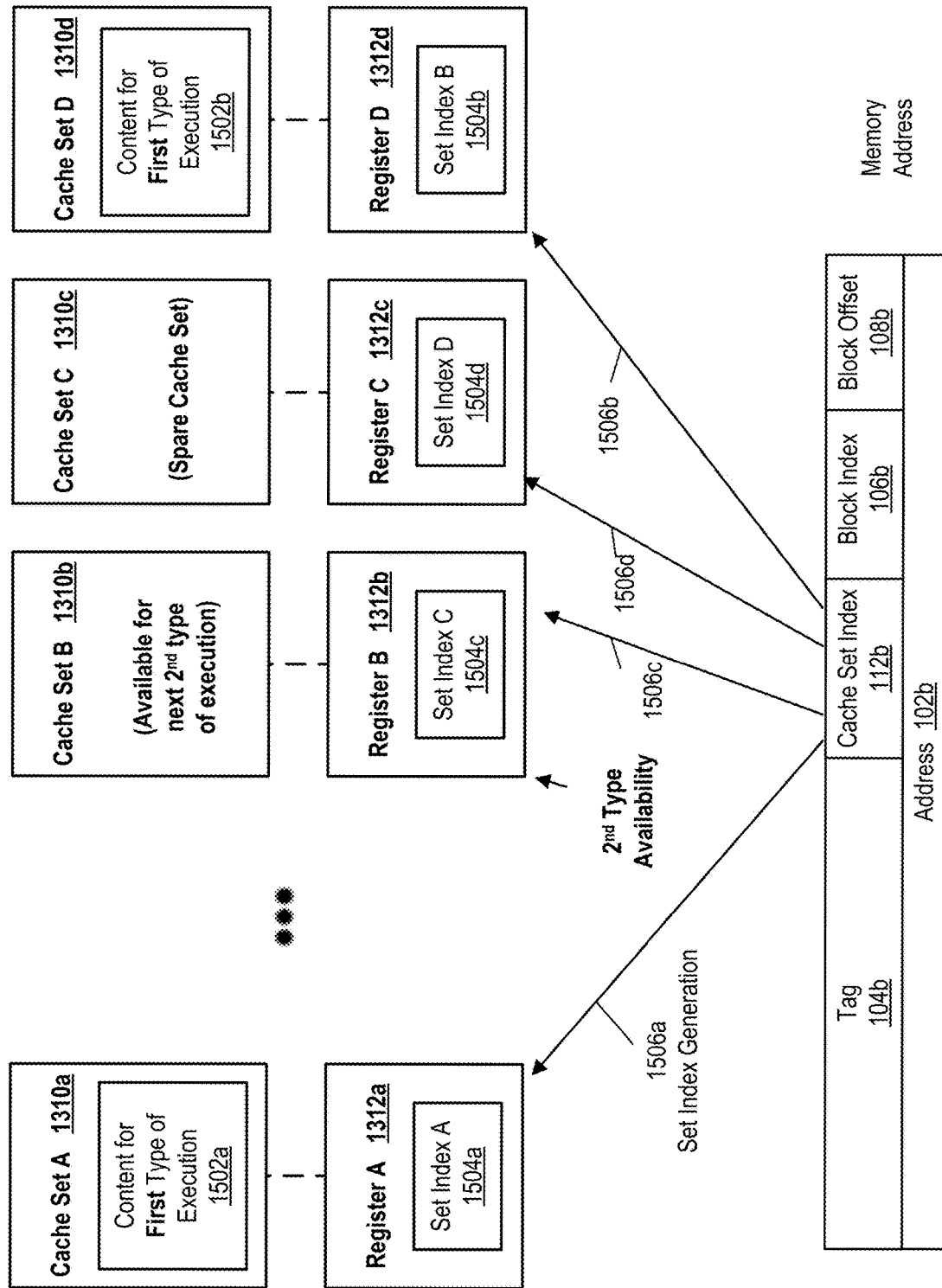

In addition to using a shadow cache for securing speculative executions, as well as synchronizing content between a main cache and the shadow cache to save the content cached in the main cache in preparation of acceptance of the content in the shadow cache, a spare cache set can be used to accelerate the speculative executions (e.g., see the spare cache set 1310d as depicted in FIGS. 14A and 15A as well as cache set 1310b as depicted in FIGS. 15B and 15C and cache set 1310c as depicted in FIG. 15D). A spare cache set can also be used to accelerate the speculative executions without use of a shadow cache. Data held in cache sets used as a shadow cache can be validated and therefore used for normal execution (e.g., see the cache set 1310c as depicted in FIGS. 14A and 15A as well as cache set 1310d as depicted in FIGS. 15B and 15C and cache set 1310b as depicted in FIG. 15D each of which can be used for a speculative execution and be a cache set of a shadow cache, and then after content validation can be used for normal execution). And, some cache sets used as the main cache for normal or non-speculative execution (e.g., see the cache set 1310b as depicted in FIGS. 14A and 15A as well as cache set 1310c as depicted in FIGS. 15B and 15C and cache set 1310d as depicted in FIG. 15D) may not be ready to be used as the shadow cache for speculative execution. Thus, one or more cache sets can be used as spare cache sets to avoid delays from waiting for cache set availability (e.g., see the spare cache set 1310d as depicted in FIGS. 14A and 15A as well as cache set 1310b as depicted in FIGS. 15B and 15C and cache set 1310c as depicted in FIG. 15D).

Once a speculation is confirmed, the content of the cache sets used as a shadow cache is confirmed to be valid and up-to-date; and thus, the former cache sets used as the shadow cache for speculative execution are used for normal execution. For example, see the cache set 1310c as depicted in FIGS. 14A and 15A as well as cache set 1310d as depicted in FIGS. 15B and 15C and cache set 1310b as depicted in FIG. 15D, each of which can be used for a speculative execution and be a cache set of a shadow cache, and then after content validation can be used for normal execution. However, some of the cache sets initially used as the normal cache may not be ready to be used for a subsequent speculative execution. For instance, see the cache set 1310b as depicted in FIGS. 14A and 15A as well as cache set 1310c as depicted in FIGS. 15B and 15C and cache set 1310d as depicted in FIG. 15D, each of which is used as part of a normal cache but may not be ready to be used for a subsequent speculative execution. Therefore, one or more cache sets can be used as spare cache sets to avoid delays from waiting for cache set availability and accelerate the speculative executions. For example, see the spare cache set 1310d as depicted in FIGS. 14A and 15A as well as cache set 1310b as depicted in FIGS. 15B and 15C and cache set 1310c as depicted in FIG. 15D, each of which are being used as a spare cache set.

In some embodiments, where the cache system has background syncing circuitry (e.g., see background synching circuitry 1102), if the syncing from a cache set in the normal cache to a corresponding cache set in the shadow cache has not yet been completed (e.g., see syncing 1130 shown in FIG. 11A), the cache set in the normal cache cannot be freed immediately for use in the next speculative execution. In such a situation, if there is no spare cache set, the next speculative execution has to wait until the syncing is complete so that the corresponding cache set in the normal cache can be freed. This is just one example, of when a spare cache set is beneficial. There are many other situations when cache sets in the normal cache cannot be freed immediately.

Also, for example, the speculative execution may reference a memory region in the memory system (e.g., see memory system 603 in FIGS. 6, 10, and 13) that has no overlapping with the memory region cached in the cache sets used in the normal cache. As a result of accepting the result of the speculative execution, the cache sets in the shadow cache and the normal cache are now all in the normal cache. This can cause delays as well, because it takes time for the cache system to free a cache set to support the next speculative execution. To free one, the cache system needs to identify a cache set, such as a least used cache set, and synchronize the cache set with the memory system. If the cache has data that is more up to date than the memory system, the data needs to be written into the memory system.

Additionally, a system using a spare cache set (e.g., see the spare cache set 1310d as depicted in FIGS. 14A and 15A as well as cache set 1310b as depicted in FIGS. 15B and 15C and cache set 1310c in FIG. 15D) can also use background synchronizing circuitry (such as the background synchronizing circuitry 1102). When an initial speculation is confirmed, the cache set used in the initial speculation (e.g., see the cache set 1310c as depicted in FIGS. 14A and 15A) can be switched to join the set of cache sets used for a main execution (e.g., see the cache set 1310a as shown in FIGS. 14A, B, and C and as depicted in FIGS. 15A, B, C, and D, which is a cache set of a set of cache sets used for main or non-speculative execution). Instead of using a cache set from the prior main execution that was being used for the case of the speculation failing (e.g., see the cache set 1310b as depicted in FIGS. 14A and 15A as well as cache set 1310c as depicted in FIGS. 15B and 15C and cache set 1310d in FIG. 15D), a spare cache set can be made available immediately for a next speculative execution (e.g., see the spare cache set 1310d as depicted in FIGS. 14A and 15A as well as cache set 1310b as depicted in FIGS. 15B and 15C and cache set 1310c in FIG. 15D). The spare cache set can be updated for the next speculative execution via the background synchronizing circuitry 1102 for example. And, because of background synchronizing, a spare cache set, such as the spare cache set 1310d as shown in FIGS. 14A and 15A, is ready for use when the cache set currently used for the speculation execution, such as the cache set 1310c as shown in FIGS. 14A and 15A, is ready to be accepted for normal execution. This way there is no delay in waiting for use of the next cache set for the next speculative execution. To prepare for the next speculative execution, the spare cache set, such as the cache set 1310c as shown in FIGS. 14A and 15A, can be synchronized to a normal cache set, such as the cache set 1310b as shown in FIGS. 14A and 15A, that is likely to be used in the next speculative execution or a least used cache set in the system.

Figure 13:
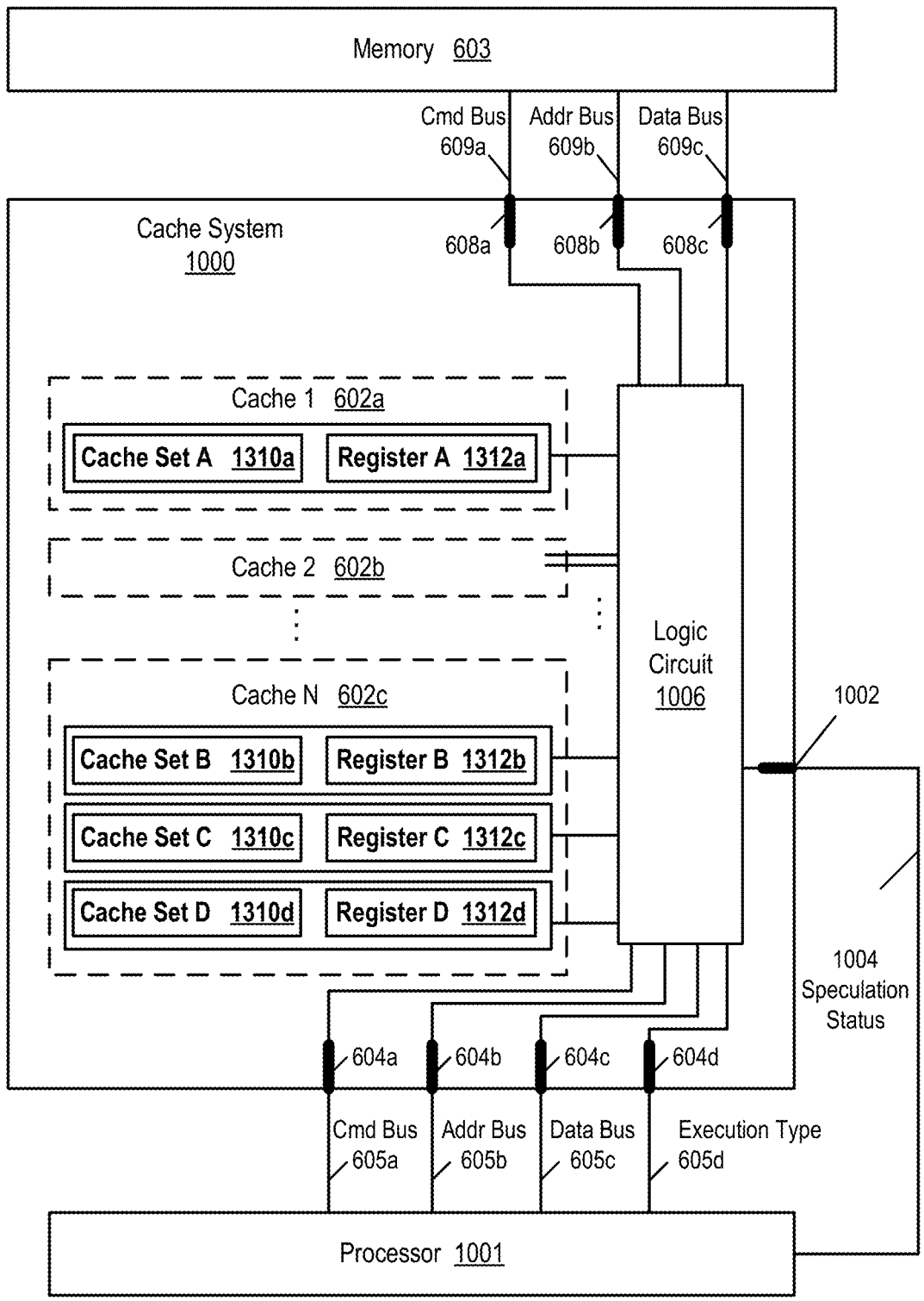
FIGS. 13, 14A, 14B, 14C, 15A, 15B, 15C, and 15D show example aspects of an example computing device having a cache system having interchangeable cache sets including a spare cache set to accelerate speculative execution, in accordance with some embodiments of the present disclosure.

FIG. 13 shows example aspects of an example computing device having a cache system 1000 having interchangeable cache sets (e.g., see cache sets 1310a, 1310b, 1310c, and 1310d) including a spare cache set to accelerate speculative execution, in accordance with some embodiments of the present disclosure. The computing device, in FIG. 13, is similar to the computing device depicted in FIG. 10. For example, the device shown in FIG. 13 includes processor 1001, memory system 603, cache system 1000, and connections 604a to 604d and 609a to 609c as well as connection 1002.

In FIG. 13, the cache system 1000 is shown having cache sets (e.g., cache sets 1310a, 1310b, 1310c, and 1310d). The cache system 1000 is also shown having connection 604d to execution-type signal line 605d from processor 1001 identifying an execution type and connection 1002 to a signal line 1004 from the processor 1001 identifying a status of speculative execution.

The cache system 1000 is also shown including logic circuit 1006 that can be configured to allocate a first subset of the cache sets (e.g., see cache 602a as shown in FIG. 13) for caching in caching operations when the execution type is a first type indicating non-speculative execution of instructions by the processor 1001. The logic circuit 1006 can also be configured to allocate a second subset of the cache sets (e.g., see cache 602b as shown in FIG. 13) for caching in caching operations when the execution type changes from the first type to a second type indicating speculative execution of instructions by the processor. The logic circuit 1006 can also be configured to reserve at least one cache set or a third subset of cache sets (e.g., see cache 602c as shown in FIG. 13) when the execution type is the second type.

The logic circuit 1006 can also be configured to reconfigure the second subset for caching in caching operations (e.g., see cache 602b as shown in FIG. 13), when the execution type is the first type and when the execution type changes from the second type to the first type and the status of speculative execution indicates that a result of speculative execution is to be accepted. And, the logic circuit 1006 can also be configured to allocate the at least one cache set or third subset for caching in caching operations (e.g., see cache 602c as shown in FIG. 13), when the execution type changes from the first type to the second type and when the execution type changes from the second type to the first type and the status of speculative execution indicates that a result of speculative execution is to be accepted. The logic circuit 1006 can also be configured to reserve the at least one cache set or the third subset (e.g., see cache 602c as shown in FIG. 13), when the execution type is the second type and when the at least one cache set is a least used cache set in the plurality of cache sets.

In some embodiments, a cache system can include one or more mapping tables that can map the cache sets mentioned herein. And, in such embodiments, a logic circuit, such as the logic circuits mentioned herein, can be configured to allocate and reconfigure subsets of cache sets, such as caches in a cache system, according to the one or more mapping tables. The map can be an alternative to the cache set registers described herein or used in addition to such registers.

In some embodiments, as shown in at least FIGS. 13, 14A to 14C, and 15A to 15D, the cache system 1000 can include cache set registers (e.g., see cache set registers 1312a, 1312b, 1312c, and 1312d) associated with the cache sets (e.g., see cache sets 1310a, 1310b, 1310c, and 1310d), respectively. In such embodiments, the logic circuit 1006 can be configured to allocate and reconfigure subsets of the of cache sets (e.g., see caches 602a, 602b, and 602c as shown in FIG. 13) according to the cache set registers.

Also, in some embodiments, as shown in FIGS. 15A to 15D, a first subset of the cache sets can include a first cache set, a second subset of the cache sets can include a second cache set, and a third subset can include a third cache set. In such embodiments, the cache set registers can include a first cache set register associated with the first cache set which is configured to store a first cache set index initially so that the first cache set is used for non-speculative execution (e.g., see cache set index 1504b held in cache set register 1312b as shown in FIG. 15A). The cache set registers can also include a second cache set register associated with the second cache set which is configured to store a second cache set index initially so that the second cache set is used for speculative execution (e.g., see cache set index 1504c held in cache set register 1312c as shown in FIG. 15A). The cache set registers can also include a third cache set register associated with the third cache set which is configured to store a third cache set index initially so that the third cache set is used as a spare cache set (e.g., see cache set index 1504d held in cache set register 1312d as shown in FIG. 15A).

Also, in such embodiments, the logic circuit 1006 can be configured to generate a set index (e.g., see set indexes 1504a, 1504b, 1504c, and 1504d) based on a memory address received from address bus 605b, from processor 1001 and an identification of speculative execution or non-speculative execution received from execution-type signal line 605d from the processor identifying execution type. And, the logic circuit 1006 can be configured to determine whether the set index matches with content stored in the first cache set register, the second cache set register, or the third cache set register.

Also, in such embodiments, the logic circuit 1006 can be configured to store the first cache set index in the second cache set register or another cache set register associated with another cache set in the second subset of the plurality of cache sets, so that the second cache set or the other cache set in the second subset is used for non-speculative execution, when the execution type changes from the second type to the first type and the status of speculative execution indicates that a result of speculative execution is to be accepted. For example, see FIG. 15B depicting cache set index 1504b held in the second cache set register 1312c, so that the second cache set 1310c can be used for non-speculative execution. Further, the logic circuit 1006 can be configured to store the second cache set index in the third cache set register or another cache set register associated with another cache set in the at least one cache set, so that the third cache set or the other cache set in the at least one cache set is used for speculative execution, when the execution type changes from the second type to the first type and the status of speculative execution indicates that a result of speculative execution is to be accepted. For example, see FIG. 15B depicting cache set index 1504c held in the third cache set register 1312d, so that the third cache set 1310d is available and can be used for speculative execution. The logic circuit 1006 can also be configured to store the third cache set index in the first cache set register or another cache set register associated with another cache set in the first subset of the plurality of cache sets, so that the first cache set or the other cache set in the first subset is used as a spare cache set, when the execution type changes from the second type to the first type and the status of speculative execution indicates that a result of speculative execution is to be accepted. For example, see FIG. 15B depicting cache set index 1504d held in the first cache set register 1312b, so that the first cache set 1310b is used as a spare cache set.

Figure 14B:
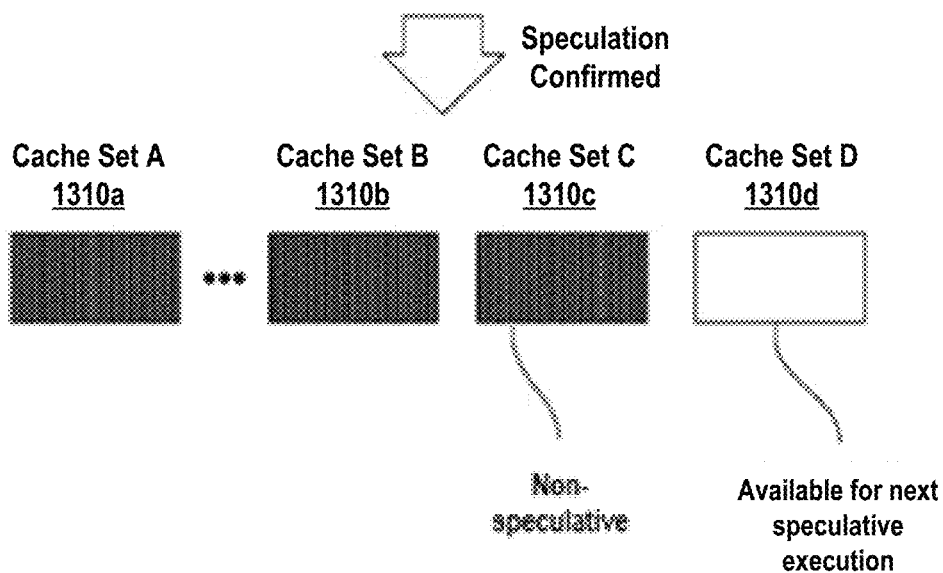
Figure 14C:
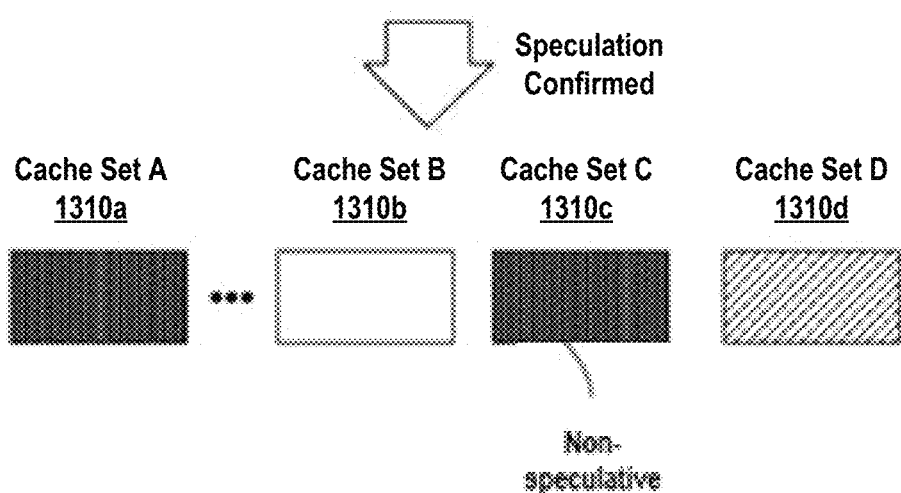

FIGS. 14A, 14B, and 14C show example aspects of the example computing device having the cache system 1000 having interchangeable cache sets (e.g., see cache sets 1310a, 1310b, 1310c, and 1310d) including a spare cache set (e.g., see spare cache set 1310d as shown in FIGS. 14A and 14B and spare cache set 1310b as shown in FIG. 14C) to accelerate speculative execution, in accordance with some embodiments of the present disclosure. Specifically, FIG. 14A shows the cache sets in a first state where cache sets 1310a and 1310b can be used for non-speculative executions, cache set 1310c can be used for a speculative execution, and cache set 1310d is used as a spare cache set. FIG. 14B shows the cache sets in a second state where cache sets 1310a, 1310b, and 1310c can be used for non-speculative executions and cache set 1310c is available for and can be used for a speculative execution. FIG. 14C, shows the cache sets in a third state where cache sets 1310a, and 1310c can be used for non-speculative executions, cache set 1310d can be used for speculative executions, and cache set 1310b is used as a spare cache set.

FIGS. 15A, 15B, 15C and 15D each show example aspects of the example computing device having the cache system 1000 having interchangeable cache sets (e.g., see cache sets 1310a, 1310b, 1310c, and 1310d) including a spare cache set to accelerate speculative execution, in accordance with some embodiments of the present disclosure.

Specifically, FIG. 15A shows the cache sets in a first state where cache sets 1310a and 1310b can be used for non-speculative executions (or first type of executions), cache set 1310c can be used for a speculative execution (or a second type execution), and cache set 1310d is used as a spare cache set. As shown in FIG. 15A, in this first state, the logic circuit 1006 can be configured to store the cache set index 1504b in the cache set register 1312b so that content 1502b in the cache set 1310b is used for non-speculative execution. Further, in this first state, the logic circuit 1006 can be configured to store the cache set index 1504*c* in the cache set register 1312*c* so that the cache set 1310*c* is available and can be used for speculative execution. The logic circuit 1006 can also be configured to store the cache set index 1504*d* in the cache set register 1312*d* so that the cache set 1310*d* is used as a spare cache set in this first state.

FIG. 15B shows the cache sets in a second state where cache sets 1310*a* and 1310*c* can be used for non-speculative executions, cache set 1310*d* is available for a speculative execution, and cache set 1310*b* is used as a spare cache set. The second state depicted in FIG. 15B occurs when the execution type changes from the second type to the first type and the status of speculative execution indicates that a result of speculative execution is to be accepted. As shown in FIG. 15B, in this second state, the logic circuit 1006 can be configured to store the cache set index 1504*b* in the cache set register 1312*c* so that content 1502*b* in the cache set 1310*c* is used for non-speculative execution. Further, in this second state, the logic circuit 1006 can be configured to store the cache set index 1504*c* in the cache set register 1312*d* so that the cache set 1310*d* is available for speculative execution. The logic circuit 1006 can also be configured to store the cache set index 1504*d* in the cache set register 1312*b* so that the cache set 1310*b* is used as a spare cache set in this second state.

FIG. 15C shows the cache sets in the second state for the most part, where cache sets 1310*a* and 1310*c* can be used for non-speculative executions and cache set 1310*b* is used as a spare cache set. But, in FIG. 15C, it is shown that cache set 1310*d* is being used for a speculative execution instead of being merely available. As shown in FIG. 15C, in this second state, the logic circuit 1006 can be configured to store the cache set index 1504*c* in the cache set register 1312*d* so that the content 1502*c* held in the cache set 1310*d* can also be used for speculative execution.

FIG. 15D shows the cache sets in a third state where cache sets 1310*a* and 1310*d* can be used for non-speculative executions, cache set 1310*b* is available for a speculative execution, and cache set 1310*c* is used as a spare cache set. The third state depicted in FIG. 15D occurs, in a subsequent cycle after the second state, when the execution type changes again from the second type to the first type and the status of speculative execution indicates that a result of speculative execution is to be accepted. As shown in FIG. 15D, in this third state, the logic circuit 1006 can be configured to store the cache set index 1504*b* in the cache set register 1312*d* so that content 1502*b* in the cache set 1310*d* is used for non-speculative execution. Further, in this third state, the logic circuit 1006 can be configured to store the cache set index 1504*c* in the cache set register 1312*b* so that the cache set 1310*b* is available for speculative execution. The logic circuit 1006 can also be configured to store the cache set index 1504*d* in the cache set register 1312*c* so that the cache set 1310*c* is used as a spare cache set in this third state.

As shown by FIGS. 15A to 15D, the cache sets are interchangeable and the cache set used as the spare cache set is interchangeable as well.

In such embodiments, when the connection 604*b* to the address bus 605*b* receives a memory address from the processor 1001, the logic circuit 1006 can be configured to generate a set index from at least the memory address 102*b* according to this cache set index 112*b* of the address (e.g., see set index generations 1506*a*, 1506*b*, 1506*c*, and 1506*d*, which generate set indexes 1504*a*, 1504*b*, 1504*c*, and 1504*d* respectively). Also, when the connection 604*b* to the address bus 605*b* receives a memory address from the processor 1001, the logic circuit 1006 can be configured to determine whether the generated set index matches with content stored in one of the registers (which can be stored set index 1504*a*, 1504*b*, 1504*c*, or 1504*d*). Also, the logic circuit 1006 can be configured to implement a command received in the connection 604*a* to the command bus 605*a* via a cache set in response to the generated set index matching with the content stored in the corresponding register. Also, in response to a determination that a data set of the memory system associated with the memory address is not currently cached in the cache system, the logic circuit 1001 can be configured to allocate the cache set for caching the data set and store the generated set index in the corresponding register. The generated set index can include a predetermined segment of bits in the memory address as shown in FIGS. 15A to 15B.

Also, in such embodiments, the logic circuit 1006 can be configured to generate a set index (e.g., see set indexes 1504*a*, 1504*b*, 1504*c*, and 1504*d*) based on a memory address (e.g., memory address 102*b*) received from address bus 605*b*, from processor 1001 and an identification of speculative execution or non-speculative execution received from execution-type signal line 605*d* from the processor identifying execution type. And, the logic circuit 1006 can be configured to determine whether the set index matches with content stored in the cache set register 1312*b*, the cache set register 1312*c*, or the cache set register 1312*d*.

In some embodiments, a cache system can include a plurality of cache sets, a connection to an execution-type signal line from a processor identifying an execution type, a connection to a signal line from the processor identifying a status of speculative execution, and a logic circuit. The logic circuit can be configured to: allocate a first subset of the plurality of cache sets for caching in caching operations when the execution type is a first type indicating non-speculative execution of instructions by the processor, and allocate a second subset of the plurality of cache sets for caching in caching operations when the execution type changes from the first type to a second type indicating speculative execution of instructions by the processor. The logic circuit can also be configured to reserve at least one cache set (or a third subset of the plurality of cache sets) when the execution type is the second type. The logic circuit can also be configured to reconfigure the second subset for caching in caching operations when the execution type is the first type, when the execution type changes from the second type to the first type and the status of speculative execution indicates that a result of speculative execution is to be accepted. And, the logic circuit can also be configured to allocate the at least one cache set (or the third subset of the plurality of cache sets) for caching in caching operations when the execution type changes from the first type to the second type, when the execution type changes from the second type to the first type and the status of speculative execution indicates that a result of speculative execution is to be accepted.

In such embodiments, the logic circuit can be configured to reserve the at least one cache set (or the third subset of the plurality of cache sets) when the execution type is the second type and the at least one cache set (or the third subset of the plurality of cache sets) includes a least used cache set in the plurality of cache sets.

Also, in such embodiments, the cache system can include one or more mapping tables mapping the plurality of cache sets. In such an example, the logic circuit is configured to allocate and reconfigure subsets of the plurality of cache sets according to the one or more mapping tables.

Also, in such embodiments, the cache system can include a plurality of cache set registers associated with the plurality of cache sets, respectively. In such an example, the logic circuit is configured to allocate and reconfigure subsets of the plurality of cache sets according to the plurality of cache set registers. In such an example, the first subset of the plurality of cache sets can include a first cache set, the second subset of the plurality of cache sets can include a second cache set, and the at least one cache set (or the third subset of the plurality of cache sets) can include a third cache set. Also, the plurality of cache set registers can include a first cache set register associated with the first cache set, configured to store a first cache set index initially so that the first cache set is used for non-speculative execution. The plurality of cache set registers can also include a second cache set register associated with the second cache set, configured to store a second cache set index initially so that the second cache set is used for speculative execution. The plurality of cache set registers can also include a third cache set register associated with the third cache set, configured to store a third cache set index initially so that the third cache set is used as a spare cache set.

In such embodiments, the logic circuit can be configured to generate a set index based on a memory address received from an address bus from a processor and identification of speculative execution or non-speculative execution received from an execution-type signal line from the processor identifying execution type. And, the logic circuit can be configured to determine whether the set index matches with content stored in the first cache set register, the second cache set register, or the third cache set register. When the execution type changes from the second type to the first type and the status of speculative execution indicates that a result of speculative execution is to be accepted, the logic circuit can also be configured to store the first cache set index in the second cache set register or another cache set register associated with another cache set in the second subset of the plurality of cache sets, so that the second cache set or the other cache set in the second subset is used for non-speculative execution. When the execution type changes from the second type to the first type and the status of speculative execution indicates that a result of speculative execution is to be accepted, the logic circuit can also be configured to store the second cache set index in the third cache set register or another cache set register associated with another cache set in the at least one cache set (or the third subset of the plurality of cache sets), so that the third cache set or the other cache set in the at least one cache set (or the third subset of the plurality of cache sets) is used for speculative execution. When the execution type changes from the second type to the first type and the status of speculative execution indicates that a result of speculative execution is to be accepted, the logic circuit can also be configured to store the third cache set index in the first cache set register or another cache set register associated with another cache set in the first subset of the plurality of cache sets, so that the first cache set or the other cache set in the first subset is used as a spare cache set.

In some embodiments, a cache system can include a plurality of cache sets having a first subset of cache sets, a second subset of cache sets, and a third subset of cache sets. The cache system can also include a connection to an execution-type signal line from a processor identifying an execution type, a connection to a signal line from the processor identifying a status of speculative execution, and a logic circuit. The logic circuit can be configured to allocate the first subset of the plurality of cache sets for caching in caching operations when the execution type is a first type indicating non-speculative execution of instructions by the processor and allocate the second subset of the plurality of cache sets for caching in caching operations when the execution type changes from the first type to a second type indicating speculative execution of instructions by the processor. The logic circuit can also be configured to reserve the third subset of the plurality of cache sets when the execution type is the second type. The logic circuit can also be configured to reconfigure the second subset for caching in caching operations when the execution type is the first type, when the execution type changes from the second type to the first type and the status of speculative execution indicates that a result of speculative execution is to be accepted. The logic circuit can also be configured to allocate the third subset for caching in caching operations when the execution type changes from the first type to the second type, when the execution type changes from the second type to the first type and the status of speculative execution indicates that a result of speculative execution is to be accepted.

In some embodiments, a cache system can include a plurality of caches including a first cache, a second cache, and a third cache. The cache system can also include a connection to an execution-type signal line from a processor identifying an execution type, a connection to a signal line from the processor identifying a status of speculative execution, and a logic circuit. The logic circuit can be configured to allocate the first cache for caching in caching operations when the execution type is a first type indicating non-speculative execution of instructions by the processor and allocate the second cache for caching in caching operations when the execution type changes from the first type to a second type indicating speculative execution of instructions by the processor. The logic circuit can also be configured to reserve the third cache when the execution type is the second type. The logic circuit can also be configured to reconfigure the second cache for caching in caching operations when the execution type is the first type, when the execution type changes from the second type to the first type and the status of speculative execution indicates that a result of speculative execution is to be accepted. And, the logic circuit can also be configured to allocate the third cache for caching in caching operations when the execution type changes from the first type to the second type.

FIGS. 16 and 17 show example aspects of example computing devices having cache systems having interchangeable cache sets (e.g., see cache sets 1610*a*, 1610*b*, 1710*a*, and 1710*b*) utilizing extended tags (e.g., see extended tags 1640*a*, 1640*b*, 1740*a*, and 1740*b*) for different types of executions by a processor (such as speculative and non-speculative executions), in accordance with some embodiments of the present disclosure. Also, FIGS. 16 and 17 illustrate different ways to address cache sets and cache blocks within a cache system—such as cache systems 600 and 1000 depicted in FIGS. 6, 10, and 13 respectively. Also, shown are ways cache sets and cache blocks can be selected via a memory address, such as memory address 102*e* or 102*b* as well as memory address 102*a*, 102*c*, or 102*d* (shown in FIG. 1).

Both examples in FIGS. 16 and 17 use set associativity, and can implement cache systems using set associativity—such as cache systems 600 and 1000. In FIG. 16, set associativity is implicitly defined (e.g., defined through an algorithm that can be used to determine which tag should be in which cache set for a given execution type). In FIG. 17, set associativity is implemented via the bits of cache set index in the memory address. Also, the functionality illustrated in FIGS. 16 and 17 can be implemented without use of set associativity (although this is not depicted), such as implement through cache systems 200 and 400 shown in FIGS. 2 and 4 respectively.

In FIGS. 16 and 17, a block index (e.g., see block indexes 106e and 106b) can be used as an address within individual cache sets (e.g., see cache sets 1610a, 1610b, 1710a, and 1710b) to identify particular cache blocks (e.g., see cache blocks 1624a, 1624b, 1628a, 1628b, 1724a, 1724b, 1728a, and 1728b) in a cache set. And, the extended tags (e.g., extended tags 1640a, 1640b, 1740a, 1740b, 1650, and 1750) can be used as addresses for the cache sets. A block index (e.g., see block indexes 106e and 106b) of a memory address (e.g., see memory address 102e and 102b) can be used for each cache set (e.g., see cache sets 1610a, 1610b, 1710a, and 1710b) to get a cache block (e.g., see cache blocks 1624a, 1624b, 1628a, 1628b, 1724a, 1724b, 1728a, and 1728b) and a tag associated with the cache block (e.g., see corresponding tags 1622a, 1622b, 1626a, 1626b, 1722a, 1722b, 1726a, and 1726b).

Also, as shown in FIGS. 16 and 17, tag compare circuits (e.g., tag compare circuits 1660a, 1660b, 1760a, and 1760b) can compare the extended tags generated from the cache sets (e.g., extended tags 1640a, 1640b, 1740a, and 1740b) with the extended cache tag (e.g., extended tag 1650) from a memory address (e.g., see memory address 102e and 102b) and a current execution type (e.g., see execution types 110e and 110b) to determine a cache hit or miss. The construction of the extended tags guarantee that there is at most one hit among the cache sets (e.g., see cache sets 1610a, 1610b, 1710a, and 1710b). If there is a hit, a cache block (e.g., see cache blocks 1624a, 1624b, 1628a, 1628b, 1724a, 1724b, 1728a, and 1728b) from the selected cache set provides the output. Otherwise, the data associated with the memory address (e.g., memory address 102e or 102b) is not cached in or outputted from any of the cache sets. In short, the extended tags depicted in FIGS. 16 and 17 are used to select a cache set, and the block indexes are used to select a cache block and its tag within a cache set.

Also, as shown in FIGS. 16 and 17, the memory addresses (e.g., see addresses 102e and 102b) are partitioned in different ways; and thus, control of the cache operations according to the addresses are different as well. However, there are some similarities. For example, the systems shown in FIGS. 16 and 17 control cache set use via set associativity. The control of the cache operations can include controlling whether a cache set is used for a first or second type of execution by the processor (e.g., non-speculative and speculative executions) and such control can be controlled via set associativity to some extent or completely.

In FIG. 16, extended tag 1650 for the memory address 102e has an execution type 110e and tag 104e having a cache set indicator that implements the set associativity. In FIG. 17, extended tag 1750 for the memory address 102b has an execution type 110e, cache set index 112b, and tag 104b. In such an example, the cache set index 112b implements the set associativity instead of the cache set indicator in the tag. The different partitioning of the memory address slightly changes how an extended tag (e.g., extended tags 1640a, 1640b, 1650, 1740a, and 1740b and 1750) controls the cache operations via set associativity.

With the memory address partitioning, in the examples, the extended tag from the memory address and the execution type (e.g., see extended tags 1650 and 1750) are compared with an extended tag for a cache set (e.g., see extended tags 1640a, 1640b, 1740a, and 1740b) for controlling cache operations implemented via the cache set. The tag compare circuits (e.g., tag compare circuits 1660a, 1660b, 1760a, and 1760b) can output a hit or miss depending on if the extended tags inputted into the compare circuits match or not. The extended tags for the cache sets (e.g., see extended tags 1640a, 1640b, 1740a, and 1740b) can be derived from an execution type (e.g., see the execution types 1632a, 1632b, 1732a, and 1732b) held in a register (e.g., see registers 1612a, 1612b, 1712a, and 1712b) and a block tag (e.g., see tags 1622a, 1622b, 1626a, 1626b, 1722a, 1722b, 1726a, and 1726b) from a first cache set (e.g., see cache sets 1610a, 1610b, 1710a, and 1710b). And, as shown in FIGS. 16 and 17, the execution types are different in each register of the cache sets. For the examples shown, the first cache set (e.g., cache set 1610a or 1710a) can be used for the first type of execution (e.g., non-speculative execution) and the second cache set (e.g., cache set 1610b or 1710b) can be used for the second type of execution (e.g., speculative execution).

In FIG. 17, the combination of tag 104b and cache set index 112b provides similar functionality as tag 104e shown in FIG. 16. However, in FIG. 17, by separating tag 104b and cache set index 112b, a cache set does not have to store redundant copies of the cache set index 112b since a cache set (e.g., see cache sets 1710a and 1710b) can be associated with a cache set register (e.g., see registers 1732a and 1732b) to hold cache set indexes (e.g., see cache set indexes 1732a and 1732b). Whereas, in FIG. 16, a cache set (e.g., see cache sets 1610a and 1610b) does need to store redundant copies of a cache set indicator in each of its blocks (e.g., see blocks 1624a, 1624b, 1628a, and 1628b) since the cache set's associated register is not configured to hold a cache set index.

In other words, since tags 1622a, 1622b, etc., have the same cache set indicator, the indicator could be stored once in a register for the cache set (e.g., see cache set registers 1712a and 1712b). This is one of the benefits of the arrangement depicted in FIG. 17 over the arrangement depicted in FIG. 16. Also, the lengths of the tags 1722a, 1722b, 1726a, and 1726b in FIG. 17 are shorter in comparison with the implementation of the tags shown in FIG. 16 (e.g., see 1622a, 1622b, 1626a, and 1626b), since the cache set registers depicted in FIG. 17 (e.g., registers 1710a and 1710b) store both the cache set index and the execution type.

When the execution type is combined with the cache set index to form an extended cache set index, the extended cache set index can be used to select one of the cache sets. Then, the tag from the selected cache set is compared to the tag in the address to determine hit or miss. The two-stage selection can be similar to a conventional two-stage selection using a cache set index or can be used to be combined with the extended tag to support more efficient interchanging of cache sets for different execution types (such as speculative and non-speculative execution types).

In some embodiments, a cache system (such as the cache system 600 or 1000) can include a plurality of cache sets (such as cache sets 610a to 610c, 1010a to 1010c, 1310a to 1310d, 1610a to 1610b, or 1710a to 1710b). The plurality of cache sets can include a first cache set and a second cache set (e.g., see cache sets 1610a to 1610b and sets 1710a to 1710b). The cache system can also include a plurality of registers associated with the plurality of cache sets respectively (such as registers 612a to 612c, 1012a to 1012c, 1312a to 1312d, 1612a to 1612b, or 1712a to 1712b). The plurality of registers can include a first register associated with the first cache set and a second register associated with the second cache set (e.g., see registers 1612a to 1612b and registers 1712a to 1712b).

The cache system can also include a connection (e.g., see connection 604a) to a command bus (e.g., see command bus 605a) coupled between the cache system and a processor (e.g., see processors 601 and 1001). The cache system can also include a connection (e.g., see connection 604b) to an address bus (e.g., see address bus 605b) coupled between the cache system and the processor.

The cache system can also include a logic circuit (e.g., see logic circuits 606 and 1006) coupled to the processor to control the plurality of cache sets according to the plurality of registers. When the connection to the address bus receives a memory address (e.g., see memory addresses 102a to 102e shown in FIG. 1 and the addresses 102e and 102b show in FIGS. 16 and 17 respectively) from the processor, the logic circuit can be configured to generate an extended tag from at least the memory address (e.g., see extended tags 1650 and 1750). Also, when the connection to the address bus receives the memory address from the processor, the logic circuit can be configured to determine whether the generated extended tag (e.g., see extended tags 1650 and 1750) matches with a first extended tag (e.g., see extended tags 1640a and 1740a) for the first cache set (e.g., see cache sets 1610a and 1710a) or a second extended tag (e.g., see extended tags 1640b and 1740b) for the second cache set (e.g., see cache sets 1610b and 1710b).

The logic circuit (e.g., see logic circuits 606 and 1006) can also be configured to implement a command received in the connection (e.g., see connection 604a) to the command bus (e.g., see command bus 605a) via the first cache set (e.g., see cache sets 1610a and 1710a) in response to the generated extended tag (e.g., see extended tags 1650 and 1750) matching with the first extended tag (e.g., see extended tags 1640a and 1740a) and via the second cache set (e.g., see cache sets 1610b and 1710b) in response to the generated extended tag matching with the second extended tag (e.g., see extended tags 1640b and 1740b).

The logic circuit (e.g., see logic circuits 606 and 1006) can also be configured to generate the first extended tag (e.g., see extended tags 1640a and 1740a) from a cache address (e.g., see the blocks labeled 'Tag' in extended tags 1640a and 1740a, as well as the tags 1622a, 1622b, 1722a, 1722b, etc.) of the first cache set (e.g., see cache sets 1610a and 1710a) and content (e.g., see the blocks labeled 'Execution Type' in extended tags 1640a and 1740a and the block labeled 'Cache Set Index' in extended tag 1740a, as well as execution type 1632a and cache set index 1732a) stored in the first register (e.g., see registers 1612a and 1712a). The logic circuit can also be configured to generate the second extended tag (e.g., see extended tags 1640b and 1740b) from a cache address (e.g., see the blocks labeled 'Tag' in extended tags 1640b and 1740b, as well as the tags 1626a, 1626b, 1726a, 1726b, etc.) of the second cache set (e.g., see cache sets 1610b and 1710b) and content (e.g., see the blocks labeled 'Execution Type' in extended tags 1640b and 1740b and the block labeled 'Cache Set Index' in extended tag 1740b, as well as execution type 1632b and cache set index 1732b) stored in the second register (e.g., see registers 1612b and 1712b).

In some embodiments, the cache system (such as the cache system 600 or 1000) can further include a connection (e.g., see connection 604d) to an execution-type signal line (e.g., see execution-type signal line 605d) from the processor (e.g., see processors 601 and 1001) identifying an execution type. In such embodiments, the logic circuit (e.g., see logic circuits 606 and 1006) can be configured to generate the extended tag (e.g., see extended tags 1650 and 1750) from the memory address (e.g., see memory addresses 102e and 102b shown in FIGS. 16 and 17 respectively) and an execution type (e.g., see execution type 110e shown in FIGS. 16 and 17) identified by the execution-type signal line. Also, in such embodiments, the content stored in each of the first register and the second register (e.g., see registers 1612a, 1612b, 1712a, and 1712b) can include an execution type (e.g., see first execution type 1632a and second execution type 1632b).

In some embodiments, for the determination of whether the generated extended tag (e.g., see extended tags 1650 and 1750) matches with the first extended tag for the first cache set (e.g., see extended tags 1640a and 1740a) or the second extended tag for the second cache set (e.g., see extended tags 1640b and 1740b), the logic circuit (e.g., see logic circuits 606 and 1006) can be configured to compare the first extended tag (e.g., see extended tags 1640a and 1740a) with the generated extended tag (e.g., see extended tags 1650 and 1750) to determine a cache hit or miss for the first cache set (e.g., see cache sets 1610a and 1710a). Specifically, as shown in FIGS. 16 and 17, a first tag compare circuit (e.g., see tag compare circuits 1660a and 1760a) is configured to receive as input the first extended tag (e.g., see extended tags 1640a and 1740a) and the generated extended tag (e.g., see extended tags 1650 and 1750). The first tag compare circuit (e.g., see tag compare circuits 1660a and 1760a) is also configured to compare the first extended tag with the generated extended tag to determine a cache hit or miss for the first cache set. The first tag compare circuit (e.g., see tag compare circuits 1660a and 1760a) is also configured to output the determined cache hit or miss for the first cache set (e.g., see outputs 1662a and 1762a).

Also, for the determination of whether the generated extended tag matches with the first extended tag for the first cache set or the second extended tag for the second cache set, the logic circuit can be configured to compare the second extended tag (e.g., see extended tags 1640b and 1740b) with the generated extended tag (e.g., see extended tags 1650 and 1750) to determine a cache hit or miss for the second cache set (e.g., see cache sets 1610b and 1710b). Specifically, as shown in FIGS. 16 and 17, a second tag compare circuit (e.g., see tag compare circuits 1660b and 1760b) is configured to receive as input the second extended tag (e.g., see extended tags 1640b and 1740b) and the generated extended tag (e.g., see extended tags 1650 and 1750). The second tag compare circuit (e.g., see tag compare circuits 1660b and 1760b) is also configured to compare the second extended tag with the generated extended tag to determine a cache hit or miss for the second cache set. The second tag compare circuit (e.g., see tag compare circuits 1660b and 1760b) is also configured to output the determined cache hit or miss for the second cache set (e.g., see outputs 1662b and 1762b).

In some embodiments, the logic circuit (e.g., see logic circuits 606 and 1006) can be further configured to receive output from the first cache set (e.g., see cache sets 1610a and 1710a) when the logic circuit determines the generated extended tag (e.g., see extended tags 1640a and 1740a) matches with the first extended tag for the first cache set (e.g., see extended tags 1640a and 1740a). The logic circuit can also be further configured to receive output from the second cache set (e.g., see cache sets 1610b and 1710b) when the logic circuit determines the generated extended tag (e.g., see cache sets 1610a and 1710a) matches with the second extended tag for the second cache set (e.g., see extended tags 1640a and 1740a).

In some embodiments, the cache address of the first cache set includes a first tag (e.g., see tags 1622a, 1622b, 1722a, and 1722b) of a cache block (e.g., see cache block 1624a, 1624*b*, 1724*a*, and 1724*b*) in the first cache set (e.g., see cache sets 1610*a* and 1710*a*). In such embodiments, the cache address of the second cache set includes a second tag (e.g., see tags 1626*a*, 1626*b*, 1726*a*, and 1726*b*) of a cache block (e.g., see cache block 1628*a*, 1628*b*, 1728*a*, and 1728*b*) in the second cache set (e.g., see cache sets 1610*b* and 1710*b*). Also, in such embodiments, in general, the block index is used as an address within individual cache sets. For instance, in such embodiments, the logic circuit (e.g., see logic circuits 606 and 1006) can be configured to use a first block index from the memory address (e.g., see block indexes 106*e* and 106*b* from memory addresses 102*e* and 102*b* shown in FIGS. 16 and 17 respectively) to get a first cache block in the first cache set and a tag associated with the first cache block (e.g., see cache block 1624*a*, 1624*b*, 1724*a*, and 1724*b* and respective associated tags 1622*a*, 1622*b*, 1722*a*, and 1722*b*). Also, the logic circuit (e.g., see logic circuits 606 and 1006) can be configured to use a second block index from the memory address (e.g., see block indexes 106*e* and 106*b* from memory addresses 102*e* and 102*b* shown in FIGS. 16 and 17 respectively) to get a second cache block in the second cache set and a tag associated with the second cache block (e.g., see cache block 1628*a*, 1628*b*, 1728*a*, and 1728*b* and respective associated tags 1626*a*, 1626*b*, 1726*a*, and 1726*b*).

In some embodiments, such as the embodiments illustrated in FIG. 16, when the first and second cache sets (e.g., see cache sets 1610*a* and 1610*b*) are in a first state, the cache address of the first cache set (e.g., see tags 1622*a*, 1622*b*, etc.) includes a first cache set indicator associated with the first cache set. The first cache set indicator can be a first cache set index. In such embodiments, when the first and second cache sets are in a first state, the cache address of the second cache set (e.g., see tags 1626*a*, 1626*b*, etc.) includes a second cache set indicator associated with the second cache set. The second cache set indicator can be a second cache set index.

Also, in the embodiments shown in FIG. 16, when the first and second cache sets (e.g., see cache sets 1610*a* and 1610*b*) are in a second state (which is not depicted in FIG. 16), the cache address of the first cache set includes the second cache set indicator associated with the second cache set. Further, when the first and second cache sets are in the second state, the cache address of the second cache set includes the first cache set indicator associated with the first cache set. This changing of the content within the cache addresses can implement the interchangeability between the cache sets.

With the embodiments shown in FIG. 16, cache set indicators are repeated in the tags of each cache block in the cache sets and thus, the tags are longer than the tags of each cache block in the cache sets depicted in FIG. 17. In FIG. 17, instead of repeating the cache set indexes in the tags of each cache block, the set indexes are stored in the cache set registers associated with cache sets (e.g., see registers 1712*a* and 1712*b*).

In some embodiments, such as the embodiments illustrated in FIG. 17, when the first and second cache sets (e.g., see cache sets 1710*a* and 1710*b*) are in a first state, the cache address of the first cache set (e.g., see tags 1722*a*, 1722*b*, etc.) may not include a first cache set indicator associated with the first cache set. Instead, the first cache set indicator is shown being stored in the first cache set register 1712*a* (e.g., see the first cache set index 1732*a* held in cache set register 1712*a*). This can reduce the size of the tags for the cache blocks in the first cache set since the cache set indicator is stored in a register associate with the first cache set. Also, when the first and second cache sets are in the first state, the cache address of the second cache set (e.g., see tags 1726*a*, 1726*b*, etc.) may not include a second cache set indicator associated with the second cache set. Instead, the second cache set indicator is shown being stored in the second cache set register 1712*b* (e.g., see the second cache set index 1732*b* held in cache set register 1712*b*). This can reduce the size of the tags for the cache blocks in the second cache set since the cache set indicator is stored in a register associate with the second cache set.

Also, in the embodiments shown in FIG. 17, when the first and second cache sets (e.g., see cache sets 1710*a* and 1710*b*) are in a second state (which is not depicted in FIG. 17), the cache address of the first cache set (e.g., see tags 1722*a*, 1722*b*, etc.) may not include a second cache set indicator associated with the second cache set. Instead, the second cache set indicator would be stored in the first cache set register 1712*a*. Also, when the first and second cache sets are in the second state, the cache address of the second cache set (e.g., see tags 1726*a*, 1726*b*, etc.) may not include a first cache set indicator associated with the first cache set. Instead, the first cache set indicator would be stored in the second cache set register 1712*b*. This changing of the content of the cache set registers can implement the interchangeability between the cache sets.

In some embodiments, as shown in FIG. 17, when the first and second registers (e.g., see registers 1712*a* and 1712*b*) are in a first state, the content stored in the first register (e.g., see register 1712*a*) can include a first cache set index (e.g., see cache set index 1732*a*) associated with the first cache set (e.g., see cache set 1710*a*). And, the content stored in the second register (e.g., see register 1712*b*) can include a second cache set index (e.g., see cache set index 1732*b*) associated with the second cache set (e.g., see cache set 1710*a*). In such embodiments, although not depicted in FIG. 17, when the first and second registers are in a second state, the content stored in the first register can include the second cache set index associated with the second cache set, and the content stored in the second register can include the first cache set index associated with the first cache set.

In some embodiments, such as embodiments as shown in FIG. 16 and such as embodiments having the connection to the execution-type signal line identifying an execution type, the cache system (e.g., see cache system 1000) can further include a connection (e.g., see connection 1002) to a speculation-status signal line (e.g., see speculation-status signal line 1004) from the processor (e.g., see processor 1001) identifying a status of a speculative execution of instructions by the processor. In such embodiments, the connection to the speculation-status signal line can be configured to receive the status of a speculative execution. The status of a speculative execution can indicate that a result of a speculative execution is to be accepted or rejected. When the execution type changes from the speculative execution to a non-speculative execution, the logic circuit can be configured to change the state of the first and second cache sets (e.g., see caches sets 1610*a* and 1610*b*), if the status of speculative execution indicates that a result of speculative execution is to be accepted. And, when the execution type changes from the speculative execution to a non-speculative execution, the logic circuit can be configured to maintain the state of the first and second cache sets (e.g., see caches sets 1610*a* and 1610*b*) without changes, if the status of speculative execution indicates that a result of speculative execution is to be rejected.

Somewhat similarly, in some embodiments, such as embodiments as shown in FIG. 17 and such as embodiments having the connection to the execution-type signal line identifying an execution type, the cache system can further include a connection to a speculation-status signal line from the processor identifying a status of a speculative execution of instructions by the processor. In such embodiments, the connection to the speculation-status signal line can be configured to receive the status of a speculative execution. The status of a speculative execution can indicate that a result of a speculative execution is to be accepted or rejected. When the execution type changes from the speculative execution to a non-speculative execution, the logic circuit can be configured to change the state of the first and second cache sets (e.g., see caches sets 1610a and 1610b), if the status of speculative execution indicates that a result of speculative execution is to be accepted. And, when the execution type changes from the speculative execution to a non-speculative execution, the logic circuit can be configured to change the state of the first and second registers (e.g., see registers 1712a and 1712b), if the status of speculative execution indicates that a result of speculative execution is to be accepted. And, when the execution type changes from the speculative execution to a non-speculative execution, the logic circuit can be configured to maintain the state of the first and second registers (e.g., see registers 1712a and 1712b) without changes, if the status of speculative execution indicates that a result of speculative execution is to be rejected.

In some embodiments, a cache system can include a plurality of cache sets, including a first cache set and a second cache set. The cache system can also include a plurality of registers associated with the plurality of cache sets respectively, including a first register associated with the first cache set and a second register associated with the second cache set. The cache system can further include a connection to a command bus coupled between the cache system and a processor, a connection to an address bus coupled between the cache system and the processor, and a logic circuit coupled to the processor to control the plurality of cache sets according to the plurality of registers. The logic circuit can be configured to generate the first extended tag from a cache address of the first cache set and content stored in the first register, and to generate the second extended tag from a cache address of the second cache set and content stored in the second register. The logic circuit can also be configured to determine whether the first extended tag for the first cache set or the second extended tag for the second cache set matches with a generated extended tag generated from a memory address received from the processor. And, the logic circuit can be configured to implement a command received in the connection to the command bus via the first cache set in response to the generated extended tag matching with the first extended tag and via the second cache set in response to the generated extended tag matching with the second extended tag.

In such embodiments, cache system can also include a connection to an address bus coupled between the cache system and the processor. When the connection to the address bus receives the memory address from the processor, the logic circuit can be configured to generate the extended tag from at least the memory address. Also, the cache system can include a connection to an execution-type signal line from the processor identifying an execution type. In such examples, the logic circuit can be configured to generate the extended tag from the memory address and an execution type identified by the execution-type signal line. Also, the content stored in each of the first register and the second can include an execution type.

Further, for the determination of whether the generated extended tag matches with the first extended tag for the first cache set or the second extended tag for the second cache set, the logic circuit can be configured to: compare the first extended tag with the generated extended tag to determine a cache hit or miss for the first cache set; and compare the second extended tag with the generated extended tag to determine a cache hit or miss for the second cache set. Also, the logic circuit can be configured to: receive output from the first cache set when the logic circuit determines the generated extended tag matches with the first extended tag for the first cache set; and receive output from the second cache set when the logic circuit determines the generated extended tag matches with the second extended tag for the second cache set. In such embodiments and others, the cache address of the first cache set can include a first tag of a cache block in the first cache set, and the cache address of the second cache set can include a second tag of a cache block in the second cache set.

In some embodiments, a cache system can include a plurality of cache sets, including a first cache set and a second cache set. The cache system can also include a plurality of registers associated with the plurality of cache sets respectively, including a first register associated with the first cache set and a second register associated with the second cache set. And, the cache system can include a connection to a command bus coupled between the cache system and a processor, a connection to an execution-type signal line from a processor identifying an execution type, a connection to an address bus coupled between the cache system and the processor, and a logic circuit coupled to the processor to control the plurality of cache sets according to the plurality of registers. When the connection to the address bus receives a memory address from the processor, the logic circuit can be configured to: generate an extended tag from the memory address and an execution type identified by the execution-type signal line; and determine whether the generated extended tag matches with a first extended tag for the first cache set or a second extended tag for the second cache set. Also, the logic circuit can be configured to implement a command received in the connection to the command bus via the first cache set in response to the generated extended tag matching with the first extended tag and via the second cache set in response to the generated extended tag matching with the second extended tag.

Figure 18:
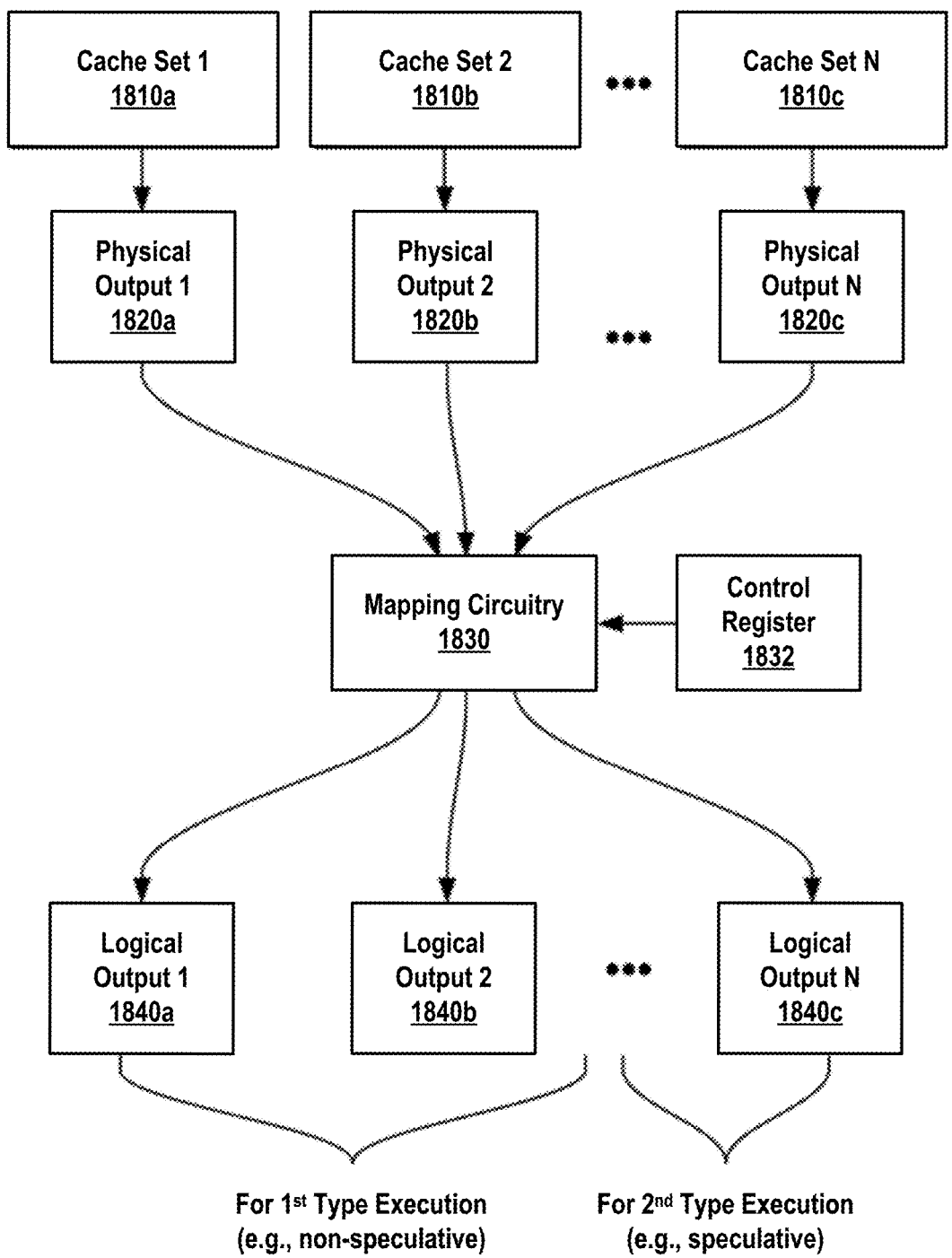
FIG. 18 shows example aspects of example computing device having a cache system having interchangeable cache sets utilizing a circuit to map physical cache set outputs to logical cache set outputs, in accordance with some embodiments of the present disclosure.

FIG. 18 shows example aspects of an example computing device having a cache system (e.g., see cache systems 600 and 1000 shown in FIGS. 6 and 10 respectively) having interchangeable cache sets (e.g., see cache sets 1810a, 1810b, and 1810c) utilizing a mapping circuit 1830 to map physical cache set outputs (e.g., see physical outputs 1820a, 1820b, and 1820c) to logical cache set outputs (e.g., see logical outputs 1840a, 1840b, and 1840c), in accordance with some embodiments of the present disclosure.

As shown, the cache system can include a plurality of cache sets (e.g., see cache sets 1810a, 1810b, and 1810c). The plurality of cache sets includes a first cache set (e.g., see cache set 1810a) configured to provide a first physical output (e.g., see physical output 1820a) upon a cache hit and a second cache set (e.g., see cache set 1810b) configured to provide a second physical output (e.g., see physical output 1820b) upon a cache hit. The cache system can also include a connection (e.g., see connection 605a depicted in FIGS. 6 and 10) to a command bus (e.g., see command bus 605a) coupled between the cache system and a processor (e.g., see processors 601 and 1001). The cache system can also include a connection (e.g., see connection 605b) to an address bus (e.g., see address bus 605b) coupled between the cache system and the processor.

Shown in FIG. 18, the cache system includes a control register 1832 (e.g., a physical-to-logical-set-mapping (PLSM) register 1832), and mapping circuit 1830 coupled to the control register to map respective physical outputs (e.g., see physical outputs 1820a, 1820b, and 1820c) of the plurality of cache sets (e.g., see cache sets 1810a, 1810b, and 1810c) to a first logical cache (e.g., a normal cache) and a second logical cache (e.g., a shadow cache) as corresponding logical cache set outputs (e.g., see logical outputs 1840a, 1840b, and 1840c). The mapping, by the mapping circuit 1830, of the physical outputs (e.g., see physical outputs 1820a, 1820b, and 1820c) to logical cache set outputs (e.g., see logical outputs 1840a, 1840b, and 1840c) is according to a state of the control register 1832. As shown in FIG. 18, at least the logical outputs 1840a and 1840b are mapped to the first logical cache for the first type of execution, and at least the logical output 1840c is mapped to the second logical cache for the second type of execution. Not shown, the cache system can be configured to be coupled between the processor and a memory system (e.g., see memory system 603).

When the connection (e.g., see connection 605b) to the address bus (e.g., see address bus 605b) receives a memory address (e.g., see memory address 102b) from the processor (e.g., see processors 601 and 1001) and when the control register 1832 is in a first state (shown in FIG. 18), the mapping circuit 1830 can be configured to map the first physical output (e.g., see physical output 1820a) to the first logical cache for a first type of execution by the processor (e.g., see logical output 1840a) to implement commands received from the command bus (e.g., see command bus 605a) for accessing the memory system (e.g., see memory system 603) via the first cache set (e.g., cache set 1820a) during the first type of execution (e.g., non-speculative execution).

Also, when the connection (e.g., see connection 605b) to the address bus (e.g., see address bus 605b) receives a memory address (e.g., see memory address 102b) from the processor (e.g., see processors 601 and 1001) and when the control register 1832 is in a first state (shown in FIG. 18), the mapping circuit 1830 can be configured to map the second physical output (e.g., see physical output 1820b) to the second logical cache for a second type of execution by the processor (e.g., see logical output 1840b) to implement commands received from the command bus (e.g., see command bus 605a) for accessing the memory system (e.g., see memory system 603) via the second cache set (e.g., cache set 1820b) during the second type of execution (e.g., speculative execution).

When the connection (e.g., see connection 605b) to the address bus (e.g., see address bus 605b) receives a memory address (e.g., see memory address 102b) from the processor (e.g., see processors 601 and 1001) and when the control register 1832 is in a second state (not shown in FIG. 18), the mapping circuit 1830 is configured to map the first physical output (e.g., see physical output 1820a) to the second logical cache (e.g., see logical output 1840b) to implement commands received from the command bus (e.g., see command bus 605a) for accessing the memory system (e.g., see memory system 603) via the first cache set (e.g., cache set 1820a) during the second type of execution (e.g., speculative execution).

Also, when the connection (e.g., see connection 605b) to the address bus (e.g., see address bus 605b) receives a memory address (e.g., see memory address 102b) from the processor (e.g., see processors 601 and 1001) and when the control register 1832 is in the second state (not shown in FIG. 18), the mapping circuit 1830 is configured to map the second physical output (e.g., see physical output 1820b) to the first logical cache (e.g., see logical output 1840a) to implement commands received from the command bus (e.g., see command bus 605a) for accessing the memory system (e.g., see memory system 603) via the second cache set (e.g., cache set 1820b) for the first type of execution (e.g., non-speculative execution).

In some embodiments, the first logical cache is a normal cache for non-speculative execution by the processor, and the second logical cache is a shadow cache for speculative execution by the processor.

The mapping circuit 1830 solves the problem related to the execution type. Mapping circuit 1830 provides a solution to the how the execution type relates to mapping physical to logical cache sets. If the mapping circuit 1830 is used, a memory address (e.g., see address 102b) can be applied in each cache set (e.g., see cache sets 1810a, 1810b, and 1810c) to generate a physical output (e.g., see physical outputs 1820a, 1820b, and 1820c). The physical output (e.g., see physical outputs 1820a, 1820b, and 1820c) includes the tag and the cache block that are looked up using a block index of the memory address (e.g., see block index 106b). The mapping circuit 1830 can reroute the physical output (e.g., see physical outputs 1820a, 1820b, and 1820c) to one of the logical output (e.g., see logical outputs 1840a, 1840b, and 1840c). The cache system can do a tag compare at the physical output or at the logical output. If the tag compare is done at the physical output, the tag hit or miss of the physical output is routed through the mapping circuit 1830 to generate a hit or miss of the logical output. Otherwise, the tag itself is routed through the mapping circuit 1830; and a tag compare is performed at the logical output to generate the corresponding tag hit or miss result.

As illustrated in FIG. 18, the logical outputs are pre-defined for speculative execution and non-speculative execution. Therefore, the current execution type (e.g., see execution type 110e) can be used to select which part of the logical outputs is to be used. For example, since it is pre-defined that the logical output 1840c is for speculative execution in FIG. 18, it results can be discarded if the current execution type is normal execution. Otherwise, if the current execution type is speculative, the results from the first part of the logical outputs in FIG. 18 (e.g., outputs 1840a and 1840b) can be blocked.

In the embodiment shown in FIG. 18, if the current execution type is speculative, the hit or miss results from the logical outputs for the non-speculative execution can be AND'ed with '0' to force a cache "miss"; and the hit or miss results from the logical outputs for the non-speculative execution can be AND'ed with '1' to keep the results unaltered. Execution type 110e can be configured such that speculative execution=0 and non-speculative execution=1, and the tag hit or miss results from non-speculative outputs 1840a to 1840b can be AND'ed with execution type (e.g., execution type 110e) to generate the hit or miss that includes the consideration of matching both the tag and the execution type. And, the tag hit or miss results from 1840c can be AND'ed with the inverse of the execution type 110e to generate the hit or miss.

Figure 19:
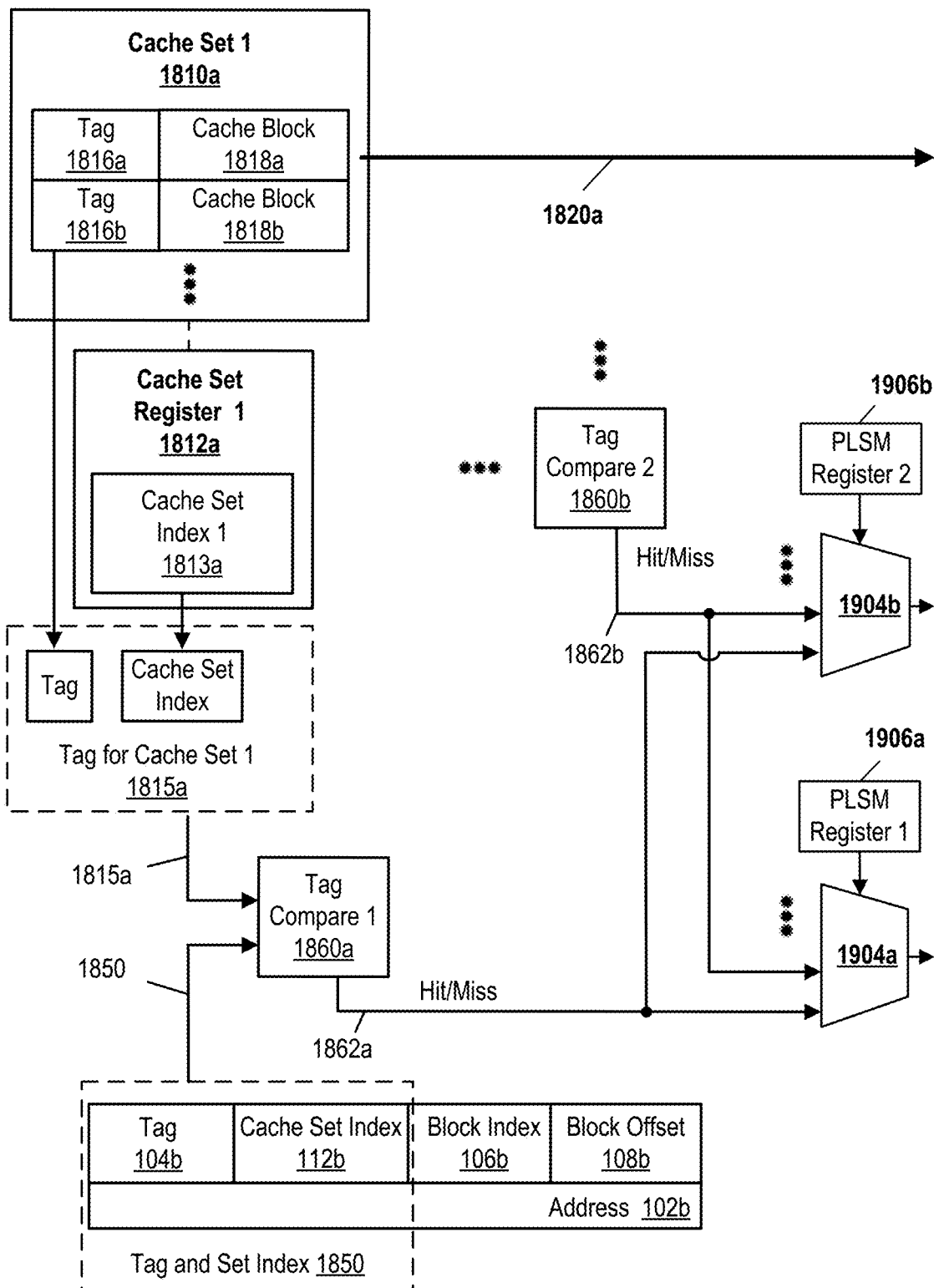
FIGS. 19, 20, and 21 show example aspects of example computing devices having cache systems having interchangeable cache sets utilizing the circuit shown in FIG. 18 to map physical cache set outputs to logical cache set outputs, in accordance with some embodiments of the present disclosure.
Figure 20:
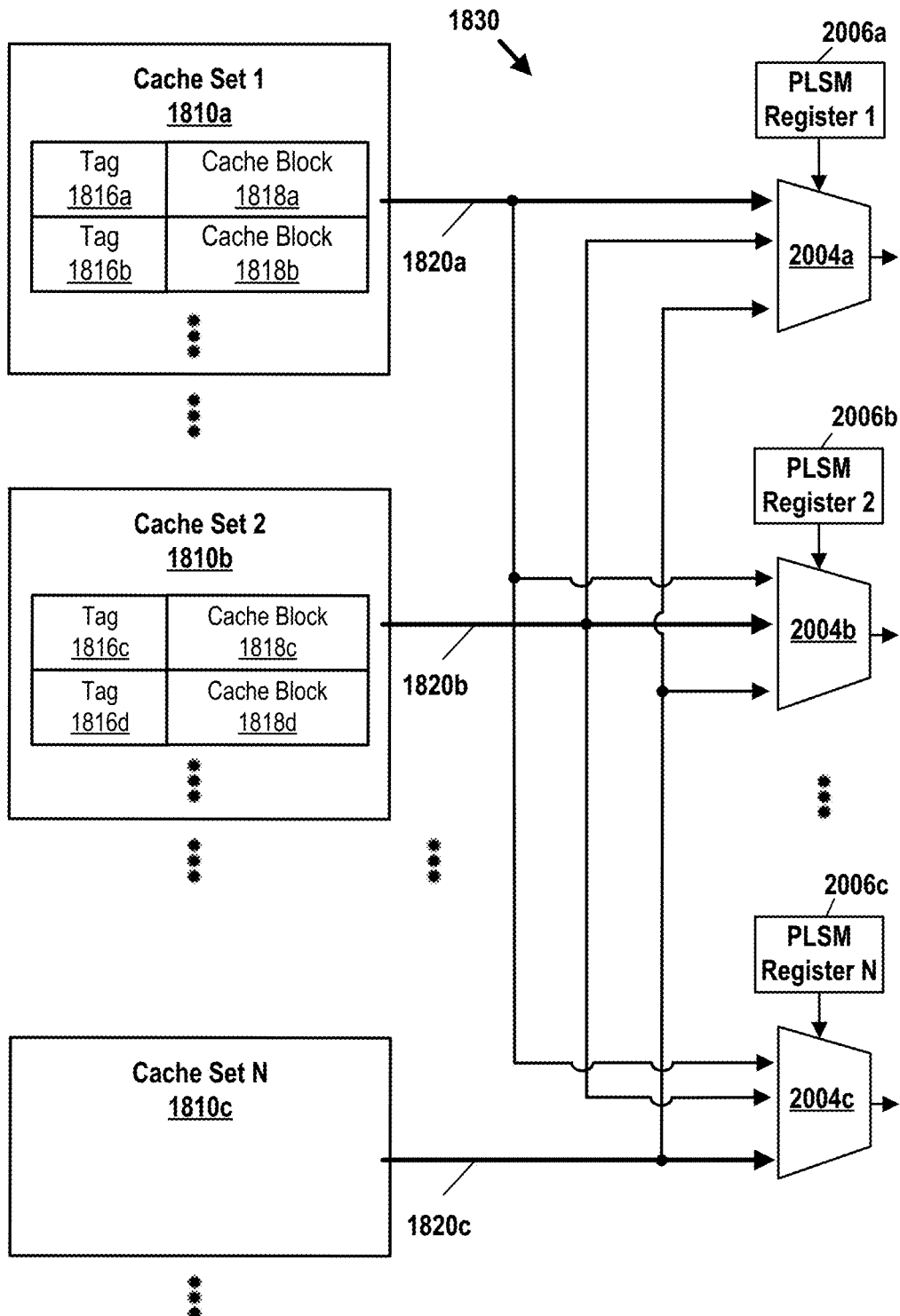

FIGS. 19 and 20 show example aspects of example computing devices having cache systems (e.g., see cache systems 600 and 1000 shown in FIGS. 6 and 10 respectively) having interchangeable cache sets (e.g., see cache sets 1810a, 1810b, and 1810c depicted in FIGS. 18 to 21) utilizing the circuit shown in FIG. 18, the mapping circuit 1830, to map physical cache set outputs (e.g., see physical outputs 1820a, 1820b, and 1820c depicted in FIG. 18 as well as physical output 1820a shown in FIG. 19) to logical cache set outputs (e.g., see logical outputs 1840a, 1840b, and 1840c), in accordance with some embodiments of the present disclosure.

In particular, FIG. 19 shows the first cache set 1810a, the first cache set register 1812a, the tag 1815a for the first cache set (which includes a current tag and cache set index), the tag and set index 1850 from the address 102b (which includes a current tag 104b and a current cache set index 112b from memory address 102b), and the tag compare circuit 1860a for the first cache set 1810a. Also, FIG. 19 shows the first cache set 1810a having cache blocks and associated tags (e.g., see cache blocks 1818a and 1818b and tags 1816a and 1816b) as well as the first cache set register 1812a holding a cache set index 1813a for the first cache set. Further, FIG. 19 shows the tag compare circuit 1860b for the second cache set 1810b. The figure shows the physical output 1820a from the first cache set 1810a being outputted to the mapping circuit 1830. The second cache set 1810b and other cache sets of the system can provide their respective physical outputs to the mapping circuit 1830 as well (although this is not depicted in FIG. 19).

FIG. 20 shows an example of multiple cache sets of the system providing physical outputs to the mapping circuit 1830 (e.g., see physical outputs 1820a, 1820b, and 1820c provided by cache sets 1810a, 1810b, and 1810c, respectively, as shown in FIG. 20). FIG. 20 also depicts parts of the mapping circuit 1830 (e.g., see multiplexors 2004a, 2004b, and 2004c as well as PLSM registers 2006a, 2006b, and 2006c). FIG. 20 also shows the first cache 1810a having at least cache blocks 1818a and 1818b and associated tags 1816a and 1816b. And, the second cache 1810b is also shown having at least cache blocks 1818c and 1818d and associated tags 1816c and 1816d.

FIG. 19 also shows multiplexors 1904a and 1904b as well as PLSM registers 1906a and 1906b, which can be parts of a logic circuit (e.g., see logic circuits 606 and 1006) and/or a mapping circuit (e.g., see mapping circuit 1830). Each of the multiplexors 1904a and 1904b receive at least hit or miss results 1862a and 1862b from tag compare circuits 1860a and 1860b which each compare respective tags for cache sets (e.g., see tag for the first cache set 1815a) against the tag and set index from the memory address (e.g., see tag and set index 1850). In some examples, there can be equivalent multiplexors for each tag compare for each cache set of the system. Each of the multiplexors (e.g., see multiplexors 1904a and 1904b) can output a selected hit or miss result based on the state of the multiplexor's respective PLSM register (e.g., see PLSM registers 1906a and 1906b). The PLSM registers controlling the selection of the multiplexors for outputting the cache hits or misses from the cache set comparisons can be controlled by a master PLSM register such as control register 1832 when such registers are a part of the mapping circuit 1830.

Figure 21:
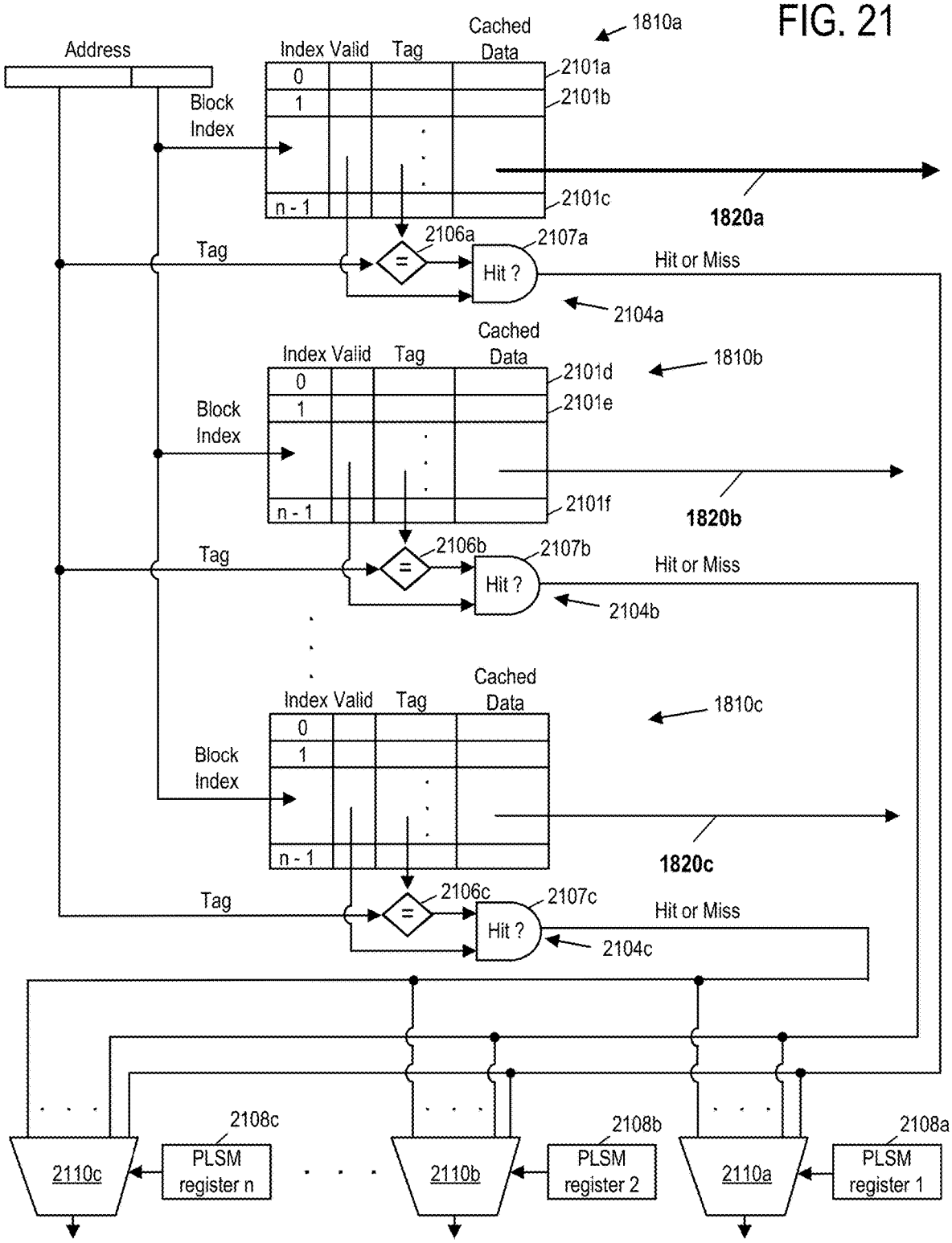

In some embodiments, each of the PLSM registers (e.g., see PLSM registers 1906a and 1906b as well as PLSM registers 2110a, 2110b, and 2110c depicted in FIG. 21) can be a one-, two-, or three-bit register or any bit length register depending on the specific implementation. Such PLSM registers can be used (such as used by a multiplexor) to select the appropriate physical tag compare result or the correct result of one of logic units outputting hits or misses.

For the case of the PLSM registers 2006a, 2006b, and 2006c depicted in FIG. 20, such registers can be used (such as used by a multiplexor) to select the appropriate physical outputs (e.g., see physical outputs 1820a, 1820b, and 1820c shown in FIG. 20) of cache sets (e.g., see cache sets 1810a, 1810b, and 1810c as shown in FIG. 20). Such PLSM registers can also each be a one-, two-, or three-bit register or any bit length register depending on the specific implementation. Also, the control register 1832 can be a one-, two-, or three-bit register or any bit length register depending on the specific implementation.

In some embodiments, selections of physical outputs from cache sets or selections of cache hits or misses are by multiplexors that can be arranged in the system to have at least one multiplexor per type of output and per logic unit or per cache set (e.g., see multiplexors 1904a and 1904b shown in FIG. 19, multiplexors 2004a, 2004b, and 2004c shown in FIG. 20, and multiplexors 2110a, 2110b, and 2110c shown in FIG. 21). As shown in the figures, in some embodiments, where there is an n number of cache sets or logic compare units, there are an n number of n-to-1 multiplexors.

As shown in FIG. 19, the computing device can include a first multiplexor (e.g., multiplexor 1904a) configured to output, to the processor, the first hit-or-miss result or the second hit-or-miss result (e.g., see hit or miss outputs 1862a and 1862b as shown in FIG. 19) according to the content received by the first PLSM register (e.g., see PLSM register 1906a). The computing device can also include a second multiplexor (e.g., multiplexor 1904b) configured to output, to the processor, the second hit-or-miss result or the first hit-or-miss result (e.g., see hit or miss outputs 1862b and 1862a as shown in FIG. 19) according to the content received by the second PLSM register (e.g., see PLSM register 1906b).

In some embodiments, the contents of the PLSM registers can be received from a control register such as control register 1832 shown in FIG. 18. For example, in some embodiments, when the content received by the first PLSM register indicates a first state, the first multiplexor outputs the first hit-or-miss result, and when the content received by the first PLSM register indicates a second state, the first multiplexor outputs the second hit-or-miss result. Also, when the content received by the second PLSM register indicates the first state, the second multiplexor can output the second hit-or-miss result. And, when the content received by the second PLSM register indicates the second state, the second multiplexor can output the first hit-or-miss result.

As shown in FIG. 20, the computing device can include a first multiplexor (e.g., multiplexor 2004a) configured to output, to the processor, the first physical output of the first cache set 1820a or the second physical output of the second cache set 1820b according to the content received by the first PLSM register (e.g., PLSM register 2006a). The computing device can include a second multiplexor (e.g., multiplexor 2004b) configured to output, to the processor, the first physical output 1820a of the first cache set or the second physical output 1820b of the second cache set according to the content received by the second PLSM register (e.g., PLSM register 2006b).

In some embodiments, the contents of the PLSM registers can be received from a control register such as control register 1832 shown in FIG. 18. For example, in some embodiments, when the content received by the first PLSM register indicates a first state, the first multiplexor outputs the first physical output 1820a, and when the content received by the first PLSM register indicates a second state, the first multiplexor outputs the second physical output 1820b. Also, when the content received by the second PLSM register indicates the first state, the second multiplexor can output the second physical output 1820*b*. And, when the content received by the second PLSM register indicates the second state, the second multiplexor can output the first physical output 1820*a*.

In some embodiments, block selection can be based on a combination of a block index and a main or shadow setting. Such parameters can control the PLSM registers.

In some embodiments, such as the example shown in FIGS. 19 and 20, only one address (e.g., tag and index) are fed into the interchangeable cache sets (e.g., cache sets 1810*a*, 1810*b* and 1810*c*). In such embodiments, there is a signal controlling which cache set is updated according to memory if that cache set produces a miss.

Multiplexor 1904*a* is controlled by the PLSM register 1906*a* to provide hit or miss output of cache set 1810*a* and thus the hit or miss status of the cache set for the main or normal execution, when the cache sets are in a first state. Multiplexor 1904*b* is controlled by the PLSM register 1906*b* to provide hit or miss output of cache set 1810*b* and thus the hit or miss status of the cache set for the speculative execution, when the cache sets are in the first state. On the other hand, multiplexor 1904*a* is controlled by the PLSM register 1906*a* to provide hit or miss output of cache set 1810*b* and thus the hit or miss status of the cache set for the main or normal execution, when the cache sets are in a second state. Multiplexor 1904*b* is controlled by the PLSM register 1906*b* to provide hit or miss output of cache set 1810*a* and thus the hit or miss status of the cache set for the speculative execution, when the cache sets are in the second state.

Similar to the selection of hit or miss signals, the data looked up from the interchangeable caches can be selected to produce one result for the processor (such as if there is a hit), for example see physical outputs 1820*a*, 1820*b*, and 1820*c* shown in FIG. 20.

For example, in a first state of the cache sets, when cache set 1810*a* is used as main cache set and cache set 1810*b* is used as shadow cache set, the multiplexor 2004*a* is controlled by the PLSM register 2006*a* to select the physical output 1820*a* of cache set 1810*a* for the main or normal logical cache used for non-speculative executions. Also, for example, in a second state of the cache sets, when cache set 1810*b* is used as main cache set and cache set 1810*a* is used as shadow cache set, then the multiplexor 2004*a* is controlled by the PLSM register 2006*a* to select the physical output 1820*b* of cache set 1810*b* for the main or normal logical cache used for non-speculative executions. In such examples, in the first state of the cache sets, when cache set 1810*a* is used as main cache set and cache set 1810*b* is used as shadow cache set, then the multiplexor 2004*b* is controlled by the PLSM register 2006*b* to select the physical output 1820*b* of cache set 1810*b* for the shadow logical cache used for speculative executions. Also, for example, in the second state of the cache sets, when cache set 1810*a* is used as main cache set and cache set 1810*b* is used as shadow cache set, then the multiplexor 2004*b* is controlled by the PLSM register 2006*b* to select the physical output 1820*a* of cache set 1810*a* for the shadow logical cache used for speculative executions.

In some embodiments, the cache system can further include a plurality of registers (e.g., see register 1812*a* as shown in FIG. 19) associated with the plurality of cache sets respectively (e.g., see cache sets 1810*a*, 1810*b*, and 1810*c* as shown in FIGS. 18 to 21). The registers can include a first register (e.g., see register 1812*a*) associated with the first cache set (e.g., see cache set 1810*a*) and a second register (not depicted in FIGS. 18 to 21 but depicted in FIGS. 6 and 10) associated with the second cache set (e.g., see cache set 1810*b*). The cache system can also include a logic circuit (e.g., see logic circuits 606 and 1006) coupled to the processor (e.g., see logic circuits 601 and 1001) to control the plurality of cache sets according to the plurality of registers. When the connection (e.g., see connection 604*b*) to the address bus (e.g., see address bus 605*b*) receives a memory address from the processor, the logic circuit can be configured to generate a set index from at least the memory address and determine whether the generated set index matches with a content stored in the first register or with a content stored in the second register. And, the logic circuit can be configured to implement a command received in the connection (e.g., see connection 604*a*) to the command bus (e.g., see command bus 605*a*) via the first cache set in response to the generated set index matching with the content stored in the first register and via the second cache set in response to the generated set index matching with the content stored in the second register.

In some embodiments, the mapping circuit (e.g., see mapping circuit 1830) can be a part of or connected to the logic circuit and the state of the control register (e.g., see control register 1832) can control a state of a cache set of the plurality of cache sets. In some embodiments, the state of the control register can control the state of a cache set of the plurality of cache sets by changing a valid bit for each block of the cache set (e.g., see FIGS. 21 to 23).

Also, in some examples, the cache system can further include a connection (e.g., see connection 1002) to a speculation-status signal line (e.g., see speculation-status signal line 1004) from the processor identifying a status of a speculative execution of instructions by the processor. The connection to the speculation-status signal line can be configured to receive the status of a speculative execution, and the status of a speculative execution can indicate that a result of a speculative execution is to be accepted or rejected. When the execution type changes from the speculative execution to a non-speculative execution, the logic circuit (e.g., see logic circuits 606 and 1006) can be configured to change, via the control register (e.g., see control register 1832), the state of the first and second cache sets, if the status of speculative execution indicates that a result of speculative execution is to be accepted. And, when the execution type changes from the speculative execution to a non-speculative execution, the logic circuit can be configured to maintain, via the control register, the state of the first and second cache sets without changes, if the status of speculative execution indicates that a result of speculative execution is to be rejected.

In some embodiments, the mapping circuit (e.g., see mapping circuit 1830) is part of or connected to the logic circuit (e.g., see logic circuits 606 and 1006) and the state of the control register (e.g., see control register 1832) can control a state of a cache register of the plurality of cache registers (e.g., see register 1812*a* as shown in FIG. 19) via the mapping circuit. In such examples, the cache system can further include a connection (e.g., see connection 1002) to a speculation-status signal line (e.g., see speculation-status signal line 1004) from the processor identifying a status of a speculative execution of instructions by the processor. The connection to the speculation-status signal line can be configured to receive the status of a speculative execution, and the status of a speculative execution indicates that a result of a speculative execution is to be accepted or rejected. When the execution type changes from the speculative execution to a non-speculative execution, the logic circuit can be configured to change, via the control register, the state of the first and second registers, if the status of speculative execution indicates that a result of speculative execution is to be accepted. And, when the execution type changes from the speculative execution to a non-speculative execution, the logic circuit can be configured to maintain, via the control register, the state of the first and second registers without changes, if the status of speculative execution indicates that a result of speculative execution is to be rejected.

FIG. 21 shows example aspects of example computing device having a cache system having interchangeable cache sets (such as the cache sets shown in FIG. 18, including cache sets 1810a, 1810b, and 1810c), in accordance with some embodiments of the present disclosure. The cache sets (e.g., cache sets 1810a, 1810b, and 1810c) are shown utilizing the circuit shown in FIG. 18, mapping circuit 1830, to map physical cache set outputs to logical cache set outputs.

The parts depicted in FIG. 21 are part of a computing device that includes memory, such as main memory, a processor, e.g., see processor 1001, and at least three interchangeable cache sets (e.g., see interchangeable cache sets 1810a, 1810b, and 1810c). The processor is configured to execute a main thread and a speculative thread.

As shown in FIG. 21, a first cache set (e.g., cache set 1810a) can be coupled in between the memory and the processor, and can include a first plurality of blocks (e.g., see blocks 2101a, 2101b, and 2101c shown in FIG. 21) for the main thread, in a first state of the cache set. Each block of the first plurality of blocks can include cached data, a first valid bit, and a block address including an index and a tag. And, the processor, solely or in combination with a cache controller, can be configured to change each first valid bit from indicating valid to invalid when a speculation of the speculative thread is successful so that the first plurality of blocks becomes accessible for the speculative thread and blocked for the main thread, in the first state of the cache set, in a second state of the cache set.

As shown in FIG. 21, a second cache set (e.g., cache set 1810b) can be coupled in between the main memory and the processor, and can include a second plurality of blocks (e.g., see blocks 2101d, 2101e, and 2101f shown in FIG. 21) for the speculative thread, in a first state of the cache set. Each block of the second plurality of blocks can include cached data, a second valid bit, and a block address including an index and a tag. And, the processor, solely or in combination with the cache controller, can be configured to change each second valid bit from indicating invalid to valid when a speculation of the speculative thread is successful so that the second plurality of blocks becomes accessible for the main thread and blocked for the speculative thread, in a second state of the cache set.

In some embodiments, as shown in FIG. 21, a block of the first plurality of blocks can correspond to a respective block of the second plurality blocks. And, the block of the first plurality of blocks can correspond to the respective block of the second plurality blocks by having a same block address as the respective block of the second plurality of blocks.

Also, as shown in FIG. 21, the computing device can include a first physical-to-logical-mapping-set-mapping (PLSM) register (e.g., PLSM register 1 2108a) configured to receive a first valid bit of a block of the first plurality of blocks. The first valid bit can be indicative of the validity of the cached data of the block of the first plurality of blocks. It can also be indicative of whether to use, in the main thread, the block of the first plurality of blocks or the corresponding block of the second plurality of blocks.

Also, as shown in FIG. 21, the computing device can include a second PLSM register (e.g., PLSM register 2 2108b) configured to receive a second valid bit of a block of the second plurality of blocks. The second valid bit being indicative of the validity of the cached data of the block of the second plurality of blocks. It can also be indicative of whether to use, in the main thread, the block of the second plurality of blocks or the corresponding block of the first plurality of blocks.

Also, as shown in FIG. 21, the computing device can include a logic unit 2104a for the first cache set, which is configured to determine whether a block of the first plurality of blocks hits or misses. The logic unit 2104a is shown including a comparator 2106a and an AND gate 2107a. The comparator 2106a can determine whether there is a match between the tag of the block and a corresponding tag of the address in memory. And, if the tags match and the valid bit for the block is valid, then the AND gate 2107a outputs an indication that the block hits. Otherwise, the AND gate 2107a outputs an indication that the block misses. To put it another way, the logic unit 2104a for the first cache is configured to output a first hit-or-miss result according to the determination at the logic unit.

Also, as shown in FIG. 21, the computing device can include a logic unit 2104b for the second cache set, which is configured to determine whether a block of the second plurality of blocks hits or misses. The logic unit 2104b is shown including a comparator 2106b and an AND gate 2107b. The comparator 2106b can determine whether there is a match between the tag of the block and a corresponding tag of the address in memory. And, if the tags match and the valid bit for the block is valid, then the AND gate 2107b outputs an indication that the block hits. Otherwise, the AND gate 2107b outputs an indication that the block misses. To put it another way, the logic unit 2104b for the second cache is configured to output a second hit-or-miss result according to the determination at the logic unit.

Also, as shown in FIG. 21, the computing device can include a first multiplexor (e.g., multiplexor 2110a) configured to output, to the processor, the first hit-or-miss result or the second hit-or-miss result according to the first valid bit received by the first PLSM register. The computing device can also include a second multiplexor (e.g., multiplexor 2110b) configured to output, to the processor, the second hit-or-miss result or the first hit-or-miss result according to the second valid bit received by the second PLSM register. In some embodiments, when the first valid bit received by the first PLSM register indicates valid, the first multiplexor outputs the first hit-or-miss result, and when the first valid bit received by the first PLSM register indicates invalid, the first multiplexor outputs the second hit-or-miss result. Also, when the second valid bit received by the second PLSM register indicates valid, the second multiplexor outputs the second hit-or-miss result. And, when the second valid bit received by the second PLSM register indicates invalid, the second multiplexor outputs the first hit-or-miss result.

In some embodiments, block selection can be based on a combination of a block index and a main or shadow setting.

In some embodiments, only one address (e.g., tag and index) are fed into the interchangeable cache sets (e.g., cache sets 1810a, 1810b and 1810c). In such embodiments, there is a signal controlling which cache set is updated according to memory if that cache set produces a miss. Similar to the selection of hit or miss signals, the data looked up from the interchangeable caches can be selected to produce one result for the processor (such as if there is a hit). For example, in a first state of the cache sets, if cache set 1810a is used as main cache set and cache set 1810b is used as shadow cache set, then the multiplexor 2110a is controlled by the PLSM register 2108a to select the hit or miss output of cache set 1804a and hit or miss status of the main cache set. And, multiplexor 2110b is controlled by the PLSM register 2108b to provide hit or miss output of cache set 1810b and thus the hit or miss status of the shadow cache set.

In such embodiments, when the cache sets are in a second state, when cache set 1810a is used as shadow cache and cache set 1810b is used as main cache, the multiplexor 2110a can be controlled by the PLSM register 2108b to select the hit or miss output of cache set 1810b and hit or miss status of the main cache. And, multiplexor 2110b can be controlled by the PLSM register 2108b to provide hit or miss output of cache set 1810a and thus the hit or miss status of the shadow cache.

Thus, multiplexor 2110a can output whether the main cache has hit or miss in the cache for the address; and the multiplexor 2110b can output whether a shadow cache has hit or miss in the cache for the same address. Then, depending on whether or not the address is speculative, the one of the output can be selected. When there is a cache miss, the address is used in the memory to load data to a corresponding cache. The PLSM registers can similarly enable the update of the corresponding cache set 1810a or set 1810b.

In some embodiments, in the first state of the cache sets, during speculative execution of a first instruction by the speculative thread, effects of the speculative execution are stored within the second cache set (e.g., cache set 1810b). During the speculative execution of the first instruction, the processor can be configured to assert a signal indicative of the speculative execution which is configured to block changes to the first cache set (e.g., cache set 1810a). When the signal is asserted by the processor, the processor can be further configured to block the second cache set (e.g., cache set 1810b) from updating the memory.

When the state of the cache sets changes to the second state, in response to a determination that execution of the first instruction is to be performed with the main thread, the second cache set (instead of the first cache set) is used with the first instruction. In response to a determination that execution of the first instruction is not to be performed with the main thread, the first cache set is used with the first instruction.

In some embodiments, in the first state, during the speculative execution of first instruction, the processor accesses the memory via the second cache set (e.g., cache set 1810b). And, during the speculative execution of one or more instructions, access to content in the second cache is limited to the speculative execution of the first instruction by the processor. During the speculative execution of the first instruction, the processor can be prohibited from changing the first cache set (e.g., cache set 1810a).

In some embodiments, the content of the first cache set (e.g., cache set 1810a) and/or the second cache set (e.g., cache set 1810b) can be accessible via a cache coherency protocol.

Figure 22:
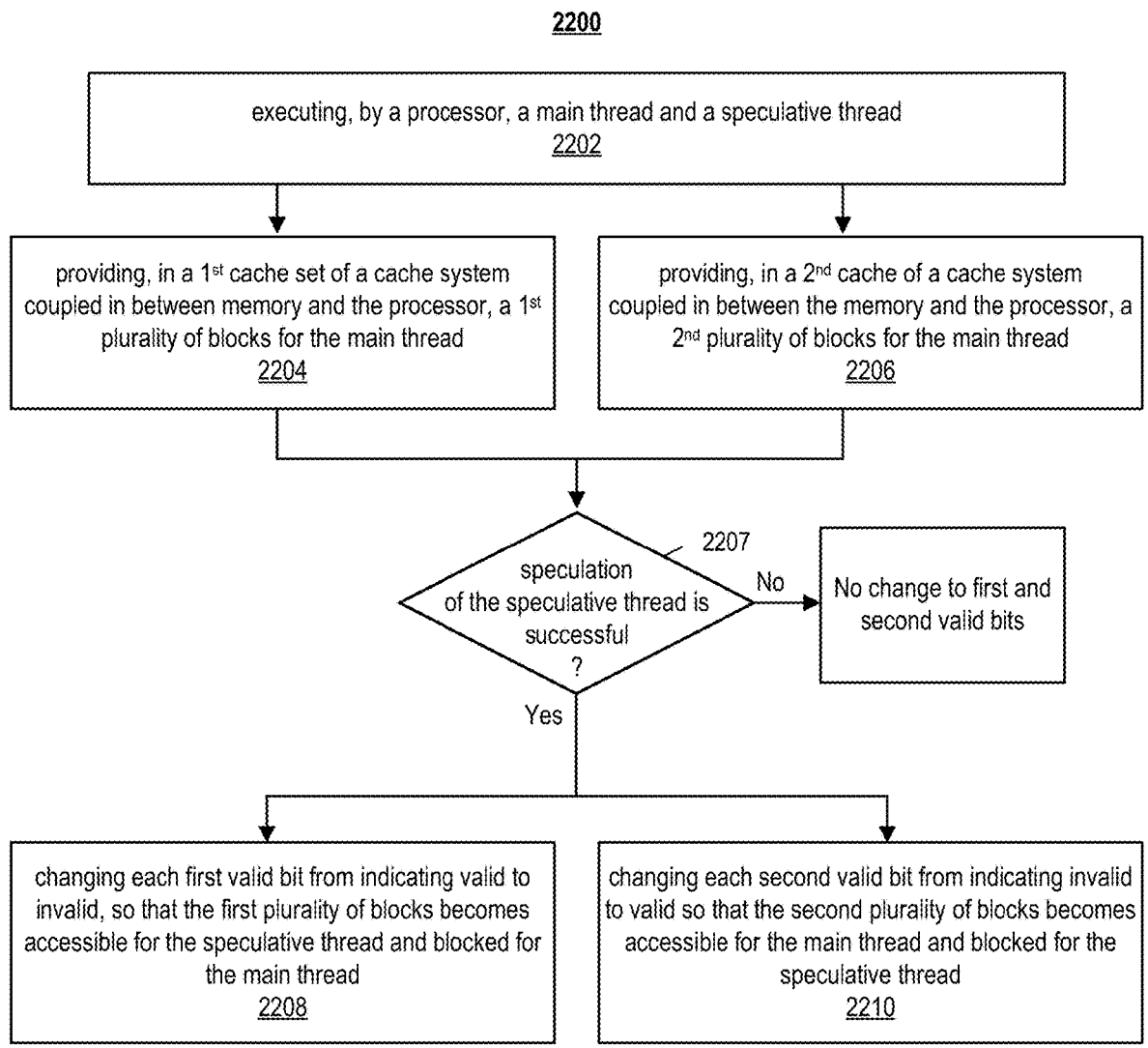
FIGS. 22 and 23 show methods for using interchangeable cache sets for speculative and non-speculative executions by a processor, in accordance with some embodiments of the present disclosure.
Figure 23:
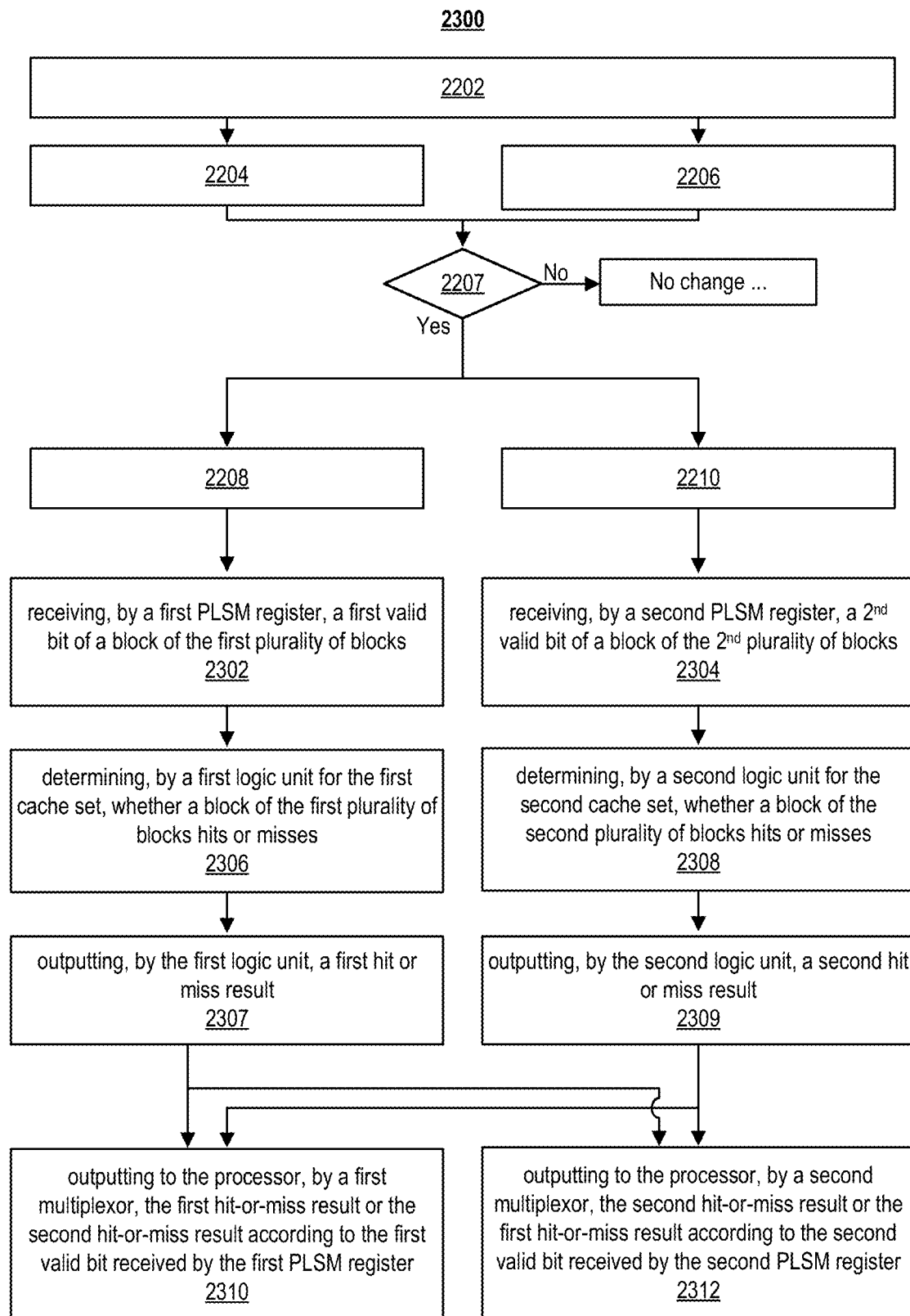

FIGS. 22 and 23 show methods 2200 and 2300, respectively, for using interchangeable cache sets for speculative and non-speculative executions by a processor, in accordance with some embodiments of the present disclosure. In particular, the methods 2200 and 2300 can be performed by a computing device illustrated in FIG. 21. Also, somewhat similar methods could be performed by the computing device illustrated in FIGS. 18-20 as well as any of the computing devices disclosed herein; however, such computing devices would control cache state, cache set state, or cache set register state via another parameter besides the valid bit of a block address. For example, in FIG. 16 a state of the cache set is controlled via a cache set indicator within the tag of a block of the cache set. And, for example, in FIG. 17, a state of the cache set is controlled via the state of the cache set register associated with the cache set. In such an example, the state is controlled via the cache set index stored in the cache set register. On the other hand, for the embodiments disclosed through FIGS. 21 to 23, the state of a cache set is controlled via the valid bit of a block address within the cache set.

Method 2200 includes, at block 2202, executing, by a processor processor 1001), a main thread and a speculative thread. The method 2200, at block 2204, includes providing, in a first cache set of a cache system coupled in between a memory system and the processor (e.g., cache set 1810a as shown in FIG. 21), a first plurality of blocks for the main thread (e.g., blocks 2101a, 2101b, and 2101c depicted in FIG. 21). Each block of the first plurality of blocks can include cached data, a first valid bit, and a block address having an index and a tag. The method 2200, at block 2206, includes providing, in a second cache set of the cache system coupled in between the memory system and the processor (e.g., cache set 1810b), a second plurality of blocks for the speculative thread (e.g., blocks 2101d, 2101e, and 2101f). Each block of the second plurality of blocks can include cached data, a second valid bit, and a block address having an index and a tag.

At block 2207, the method 2200 continues with identifying, such as by the processor, whether a speculation of the speculative thread is successful so that the first plurality of blocks becomes accessible for the speculative thread and blocked for the main thread and so that the second plurality of blocks becomes accessible for the main thread and blocked for the speculative thread. As shown in FIG. 22, if the speculation of the speculative thread fails, then validity bits of the first and second plurality of blocks are not changed by the processor and remain with the same validity values as prior to the determination of whether the speculative thread was successful at block 2207. Thus, the state of the cache sets does not change from a first state to a second state.

At block 2208, the method 2200 continues with changing, by the processor solely or in combination with a cache controller, each first valid bit from indicating valid to invalid when a speculation of the speculative thread is successful so that the first plurality of blocks becomes accessible for the speculative thread and blocked for the main thread. Also, at block 2210, the method 2200 continues with changing, by the processor solely or in combination with the cache controller, each second valid bit from indicating invalid to valid when a speculation of the speculative thread is successful so that the second plurality of blocks becomes accessible for the main thread and blocked for the speculative thread. Thus, the state of the cache sets does change from the first state to the second state.

In some embodiments, during speculative execution of a first instruction by the speculative thread, effects of the speculative execution are stored within the second cache set. In such embodiments, during the speculative execution of the first instruction, the processor can assert a signal indicative of the speculative execution which can block changes to the first cache. Also, when the signal is asserted by the processor, the processor can block the second cache from updating the memory. This occurs while the cache sets are in the first state.

Also, in such embodiments, in response to a determination that execution of the first instruction is to be performed with the main thread, the second cache set (instead of the first cache set) is used with the first instruction. In response to a determination that execution of the first instruction is not to be performed with the main thread, the first cache is used with the first instruction. This occurs while the cache sets are in the second state.

In some embodiments, during the speculative execution of first instruction, the processor accesses the memory via the second cache. And, during the speculative execution of one or more instructions, access to content in the second cache is limited to the speculative execution of the first instruction by the processor. In such embodiments, during the speculative execution of the first instruction, the processor is prohibited from changing the first cache.

In some embodiments, content of the first cache is accessible via a cache coherency protocol.

In FIG. 23, method 2300 includes the operations at blocks 2202, 2204, 2206, 2207, 2208, and 2210 of method 2200.

Method 2300, at block 2302, includes receiving, by a first physical-to-logical-mapping-set-mapping (PLSM) register (e.g., PLSM register 2108a shown in FIG. 21), a first valid bit of a block of the first plurality of blocks. The first valid bit can be indicative of the validity of the cached data of the block of the first plurality of blocks. Also, the method 2300, at block 2304, includes receiving, by a second PLSM register (e.g., PLSM register 2108b), a second valid bit of a block of the second plurality of blocks. The second valid bit can be indicative of the validity of the cached data of the block of the second plurality of blocks.

At block 2306, the method 2300 includes determining, by a first logic unit (e.g., logic unit 2104a depicted in FIG. 21) for the first cache set, whether a block of the first plurality of blocks hits or misses. At block 2307, the method 2300 continues with outputting, by the first logic unit, a first hit-or-miss result according to the determination. Also, at block 2308, the method 2300 includes determining, by a second logic unit for the second cache set (e.g., logic unit 2104b), whether a block of the second plurality of blocks hits or misses. At block 2309, the method 2300 continues with outputting, by the second logic unit, a second hit-or-miss result according to the determination.

At block 2310, the method 2300 continues with outputting to the processor, by a first multiplexor (e.g., multiplexor 2110a depicted in FIG. 21), the first hit-or-miss result or the second hit-or-miss result according to the first valid bit received by the first PLSM register. In some embodiments, when the first valid bit received by the first PLSM register indicates valid, the first multiplexor outputs the first hit-or-miss result, and when the first valid bit received by the first PLSM register indicates invalid, the first multiplexor outputs the second hit-or-miss result.

And, at block 2312, outputting to the processor, by a second multiplexor (e.g., multiplexor 2110b), the second hit-or-miss result or the first hit-or-miss result according to the second valid bit received by the second PLSM register. In some embodiments, when the second valid bit received by the second PLSM register indicates valid, the second multiplexor outputs the second hit-or-miss result. And, when the second valid bit received by the second PLSM register indicates invalid, the second multiplexor outputs the first hit-or-miss result.

Some embodiments can include a central processing unit having processing circuitry configured to execute a main thread and a speculative thread. The central processing unit can also include or be connected to a first cache set of a cache system configured to couple in between a main memory and the processing circuitry, having a first plurality of blocks for the main thread. Each block of the first plurality of blocks can include cached data, a first valid bit, and a block address including an index and a tag. The processing circuitry, solely or in combination with a cache controller, can be configured to change each first valid bit from indicating valid to invalid when a speculation of the speculative thread is successful, so that the first plurality of blocks becomes accessible for the speculative thread and blocked for the main thread. The central processing unit can also include or be connected to a second cache set of the cache system coupled in between the main memory and the processing circuitry, including a second plurality of blocks for the speculative thread. Each block of the second plurality of blocks can include cached data, a second valid bit, and a block address having an index and a tag. The processing circuitry, solely or in combination with the cache controller, can be configured to change each second valid bit from indicating invalid to valid when a speculation of the speculative thread is successful, so that the second plurality of blocks becomes accessible for the main thread and blocked for the speculative thread. And, a block of the first plurality of blocks corresponds to a respective block of the second plurality blocks by having a same block address as the respective block of the second plurality of blocks.

The techniques disclosed herein can be applied to at least to computer systems where processors are separated from memory and processors communicate with memory and storage devices via communication buses and/or computer networks. Further, the techniques disclosed herein can be applied to computer systems in which processing capabilities are integrated within memory/storage. For example, the processing circuits, including executing units and/or registers of a typical processor, can be implemented within the integrated circuits and/or the integrated circuit packages of memory media to perform processing within a memory device. Thus, a processor (e.g., see processor 201, 401, 601, and 1001) as discussed above and illustrated in the drawings is not necessarily a central processing unit in the von Neumann architecture. The processor can be a unit integrated within memory to overcome the von Neumann bottleneck that limits computing performance as a result of a limit in throughput caused by latency in data moves between a central processing unit and memory configured separately according to the von Neumann architecture.

The description and drawings of the present disclosure are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

In the foregoing specification, the disclosure has been described with reference to specific exemplary embodiments thereof. It will be evident that various modifications can be made thereto without departing from the broader spirit and scope as set forth in the following claims. The specification and drawings are, accordingly, to be regarded in an illustrative sense rather than a restrictive sense.

What is claimed is:

1. A system, comprising:
   a first cache and a second cache; and
   a logic circuit to control the first cache and the second cache based on a configurable data bit;

wherein when the configurable data bit is in a first state, the logic circuit is configured to:
implement commands received from a first command bus for accessing a memory system via the first cache, when an execution type is a non-speculative execution of instructions by a processor; and
implement commands received from the first command bus for accessing the memory system via the second cache, when the execution type is a speculative execution of instructions by the processor; and
wherein when the configurable data bit is in a second state, the logic circuit is configured to:
implement commands received from the first command bus for accessing the memory system via the second cache, when the execution type is the non-speculative execution of instructions by the processor; and
implement commands received from the first command bus for accessing the memory system via the first cache, when the execution type is the speculative execution of instructions by the processor.

2. The system of claim 1, further comprising:
a connection to a speculation-status signal line from the processor identifying a status of the speculative execution of instructions by the processor;
wherein the connection to the speculation-status signal line is configured to receive the status of the speculative execution of instructions, and
wherein the status is configured to indicate whether a result of the speculative execution of instructions is to be accepted or rejected.

3. The system of claim 2, wherein when the execution type changes from the speculative execution of instructions to the non-speculative execution of instructions, the logic circuit is configured to:
toggle the configurable data bit, if the status indicates that the result of the speculative execution of instructions is to be accepted; and
maintain the configurable data bit without changes, if the status indicates that the result of the speculative execution of instructions is to be rejected.

4. The system of claim 1, wherein when the execution type changes from the speculative execution of instructions to the non-speculative execution of instructions, the logic circuit is configured to toggle the configurable data bit.

5. The system of claim 1, further comprising:
wherein when the configurable data bit is in the first state, the logic circuit is configured to:
provide commands to a second command bus for accessing the first cache, when the execution type is the non-speculative execution of instructions; and
provide commands to the second command bus for accessing the second cache, when the execution type is the speculative execution of instructions; and
wherein when the configurable data bit is in the second state, the logic circuit is configured to:
provide commands to the second command bus for accessing the second cache, when the execution type is the non-speculative execution of instructions; and
provide commands to the second command bus for accessing the first cache, when the execution type is the speculative execution of instructions.

6. The system of claim 1, wherein:
a connection to the first command bus is configured to receive a read command or a write command from the processor for accessing the memory system;
a connection to an address bus is configured to receive a memory address from the processor for accessing the memory system for the read command or the write command; and
a connection to a data bus is configured to:
communicate data to the processor in response to the read command; and
receive data from the processor to be written in the memory system for the write command.

7. The system of claim 1, wherein a connection to an execution-type signal line is configured to receive an identification of the execution type from the processor.

8. The system of claim 1, wherein the logic circuit is configured to:
select the first cache for a memory access request from the processor, when the configurable data bit is in the first state and a connection to an execution-type signal line receives an indication of a first type of the non-speculative execution of instructions;
select the second cache for a memory access request from the processor, when the configurable data bit is in the first state and the connection to the execution-type signal line receives an indication of a second type of the speculative execution of instructions;
select the second cache for a memory access request from the processor, when the configurable data bit is in the second state and the connection to the execution-type signal line receives an indication of the first type; and
select the first cache for a memory access request from the processor, when the configurable data bit is in the second state and the connection to the execution-type signal line receives an indication of the second type.

9. A cache system, comprising:
a first cache;
a second cache;
a register configured to store a configurable data bit; and
a logic circuit, configured to:
select the first cache for use by a processor, based on the configurable data bit being in a first state, when an execution-type signal line receives an indication of a first type of execution;
select the second cache for use by the processor, based on the configurable data bit being in the first state, when the execution-type signal line receives an indication of a second type of execution;
select the second cache for use by the processor, based on the configurable data bit being in a second state, when the execution-type signal line receives an indication of the first type of execution; and
select the first cache for use by the processor, based on the configurable data bit being in the second state, when the execution-type signal line receives an indication of the second type of execution.

10. The cache system of claim 9, wherein the execution-type signal line is configured to receive an identification of an execution type from the processor, wherein the execution type is either the first execution type or the second execution type, wherein the first type of execution is a speculative execution of instructions by the processor, and wherein the second type of execution is a non-speculative execution of instructions by the processor.

11. The cache system of claim 9, further comprising:
a connection to a command bus, configured to receive a read command or a write command from the processor connected to the cache system, for reading from or writing to a memory system;

a connection to an address bus, configured to receive a memory address from the processor for accessing the memory system for the read command or the write command; and a connection to a data bus, configured to:
communicate data to the processor in response to the read command; and
receive data from the processor to be written in the memory system for the write command.

12. The cache system of claim 11, further comprising a connection to a speculation-status signal line, configured to receive speculation status from the processor, wherein the speculation status is either an acceptance or a rejection of a condition with nested instructions that are executed initially by a speculative execution of the processor and subsequently by a normal execution of the processor when the speculation status is the acceptance of the condition.

13. The cache system of claim 12, wherein the logic circuit is configured to switch the configurable data bit from the first state to the second state, when the speculation status received by the speculation-status signal line is the acceptance of the condition.

14. The cache system of claim 12, wherein the logic circuit is configured to maintain a state of the configurable data bit, when the speculation status received by the speculation-status signal line is the rejection of the condition.

15. The cache system of claim 11, further comprising:
a connection to a second command bus, configured to communicate a second read command or a second write command to the memory system, wherein the second read command or the second write command is received from the processor by the cache system;
a connection to a second address bus, configured to communicate a second memory address to the memory system, wherein the memory address is received from the processor by the cache system; and
a connection to a second data bus, configured to:
communicate data to the memory system to be written in the memory system; and
receive data from the memory system to be communicated to the processor to be read by the processor.

16. The cache system of claim 15, wherein when the configurable data bit is in the first state, the logic circuit is configured to:
provide commands to the second command bus for accessing the memory system via the first cache, when an execution type identified by the execution-type signal line is the first type; and
provide commands to the second command bus for accessing the memory system via the second cache, when the execution type is the second type;
wherein when the configurable data bit is in the second state, the logic circuit is configured to:
provide commands to the second command bus for accessing the memory system via the second cache, when the execution type is the first type; and
provide commands to the second command bus for accessing the memory system via the first cache, when the execution type is the second type.

17. A system, comprising:
a processor;
a memory system; and
a cache system coupled between the processor and the memory system, comprising:
a first cache;
a second cache;
a configurable data bit;
a logic circuit coupled to the processor to control the first cache and the second cache based on the configurable data bit;
wherein when the configurable data bit is in a first state, the logic circuit is configured to:
implement commands received for accessing the memory system via the first cache, in response to the processor performing a speculative execution of instructions; and
implement commands received for accessing the memory system via the second cache, in response to the processor performing a non-speculative execution of instructions; and
wherein when the configurable data bit is in a second state, the logic circuit is configured to:
implement commands received for accessing the memory system via the second cache, in response to the processor performing the speculative execution of instructions; and
implement commands received for accessing the memory system via the first cache, in response to the processor performing the non-speculative execution of instructions.

18. The system of claim 17, further comprising:
a connection to a command bus coupled between the cache system and the processor;
a connection to an address bus coupled between the cache system and the processor;
a connection to a data bus coupled between the cache system and the processor; and
a connection to an execution-type signal line from the processor identifying whether the processor is performing the speculative execution of instructions or the non-speculative execution of instructions.

19. The system of claim 17, further comprising:
a connection to a speculation-status signal line from the processor identifying a status of the speculative execution of instructions by the processor;
wherein the connection to the speculation-status signal line is configured to receive the status, and
wherein the status is configured to indicate whether a result of the speculative execution is to be accepted or rejected.

20. The system of claim 19, wherein when the processor changes from performing the speculative execution of instructions to the non-speculative execution of instructions, the logic circuit is configured to:
toggle the configurable data bit, if the status indicates that the result of the speculative execution of instructions is to be accepted; and
maintain the configurable data bit without changes, if the status indicates that the result of the speculative execution of instructions is to be rejected.

* * * * *